US006188535B1

(12) United States Patent
Lemke et al.

(10) Patent No.: US 6,188,535 B1
(45) Date of Patent: Feb. 13, 2001

(54) ARCUATE SCANNING TAPE DRIVE WITH A SERVO MECHANISM RESPONSIVE TO SERVO PATTERNS IN ARCUATE TRACKS ON A MOVING TAPE

(75) Inventors: James U. Lemke, 4251 10th Ave., San Diego, CA (US) 92103; A. Bruce Manildi, La Jolla, CA (US); James C. Crosby, Rancho Santa Fe, CA (US); Charles J. Spatafore, Poway, CA (US)

(73) Assignee: James U. Lemke, San Diego, CA (US)

( * ) Notice: Under 35 U.S.C. 154(b), the term of this patent shall be extended for 0 days.

(21) Appl. No.: 08/193,179

(22) PCT Filed: Jun. 10, 1993

(86) PCT No.: PCT/US93/05655

§ 371 Date: Feb. 9, 1994

§ 102(e) Date: Feb. 9, 1994

(87) PCT Pub. No.: WO93/26005

PCT Pub. Date: Dec. 23, 1993

Related U.S. Application Data

(63) Continuation-in-part of application No. 07/898,296, filed on Jun. 12, 1992, now abandoned.

(51) Int. Cl.⁷ .............................. G11B 21/04; G11B 5/584

(52) U.S. Cl. ........................... 360/70; 360/77.12; 360/75

(58) Field of Search .................................. 360/70, 107, 2, 360/22, 84, 85, 77.13, 15, 48, 71, 77.12, 0.2, 72.2, 78.02; 369/44.18, 30; 242/333.2, 338.2, 338.4, 343.2, 347, 347.1

(56) References Cited

U.S. PATENT DOCUMENTS

| | | | |
|---|---|---|---|
| 2,750,449 | 6/1956 | Thompson | 380/22 |
| 2,772,328 | 11/1956 | Lyon | 360/70 |
| 2,859,973 | 11/1958 | Runge | 360/84 |
| 2,924,668 | 2/1960 | Hoshino | 360/2 |
| 2,941,741 | 6/1960 | Bilsback | 242/338.4 |
| 3,320,371 | 5/1967 | Bach | 360/84 |
| 3,576,553 | * 4/1971 | Hertricli | 360/77.12 |
| 3,652,808 | * 3/1972 | Esterly et al. | 360/15 |

(List continued on next page.)

FOREIGN PATENT DOCUMENTS

| | | |
|---|---|---|
| 351 116 | 9/1958 | (CH) . |
| 0 113 986 | 12/1983 | (EP) . |
| 0 257 974 | 8/1987 | (EP) . |

OTHER PUBLICATIONS

Patent Abstracts of Japan, vol. 16, No. 12(P–1297) Jan. 13, 1992 & JP,A,32 30 383. (Yamaha Corp.) Oct. 14, 1991.
Notification Concerning the Result of the Partial International Search, International Application No. PCT/US93/05655 (with references as noted above), 3 pages.
Patent Abstracts of Japan, vol. 14, No. 561 (P–1142) Dec. 13, 1990 & JP,A,22 40 855 (Matsushita Electric Ind Co Ltd.) Sep. 25, 1990.
Patent Abstracts of Japan, vol. 10, No. 229 (P–485) Aug. 8, 1986 & JP,A,61 063 913 (Yuugou Giken K.K. et al) Apr. 2, 1986.
Patent Abstracts of Japan, vol. 9, No. 109 (P–355) May 14, 1985 & JP,A,59 231 703 (TDK K.K.) Dec. 1984.

*Primary Examiner*—Hoa T. Nguyen
*Assistant Examiner*—K. Wong
(74) *Attorney, Agent, or Firm*—Baker & Maxham

(57) ABSTRACT

A tape drive includes a rotary head assembly for recording and playing back a series of arcuate tracks on a moving tape where the tracks are transverse to the longitudinal axis of the tape. The tape drive includes a servo mechanism for correcting track misregistration by adjusting the position of the rotary head assembly with respect to the tape in response to servo information in the arcuate tracks. A close transducing engagement between the tape and the rotary head assembly is provided by creation of a low ambient pressure between the assembly and the tape when the assembly rotates.

56 Claims, 26 Drawing Sheets

U.S. PATENT DOCUMENTS

| | | | |
|---|---|---|---|
| 3,692,255 | 9/1972 | Von Behren | 242/343.2 |
| 3,735,939 | 5/1973 | Inaga | 242/347 |
| 3,900,172 | 8/1975 | Kamaya | 242/338.2 |
| 3,980,255 | 9/1976 | Serizawa | 242/347.1 |
| 4,044,388 | 8/1977 | Metzger | 360/70 |
| 4,120,008 | 10/1978 | Metzger | 360/70 |
| 4,166,283 * | 8/1979 | van Slaggren | 360/71 X |
| 4,173,319 | 11/1979 | Umeda | 242/333.2 |
| 4,482,928 | 11/1984 | Moriya | 360/77.13 |
| 4,519,054 * | 5/1985 | Jewer | 369/30 |
| 4,532,616 | 7/1985 | Jewer | 369/44 |
| 4,534,031 | 8/1985 | Jewer | 371/38 |
| 4,571,713 | 2/1986 | Ackerman et al. | 369/44 |
| 4,636,836 | 1/1987 | Schwartz | 360/84 |
| 4,646,175 * | 2/1987 | Sokolik et al. | 360/78.02 |
| 4,647,993 | 3/1987 | Schwartz | 360/84 |
| 4,731,681 | 3/1988 | Ogata | 360/85 |
| 4,851,940 | 7/1989 | Saito | 360/84 |
| 5,206,771 * | 4/1993 | Katou et al. | 360/71 |
| 5,422,762 * | 6/1995 | Jerbic | 360/48 |

* cited by examiner

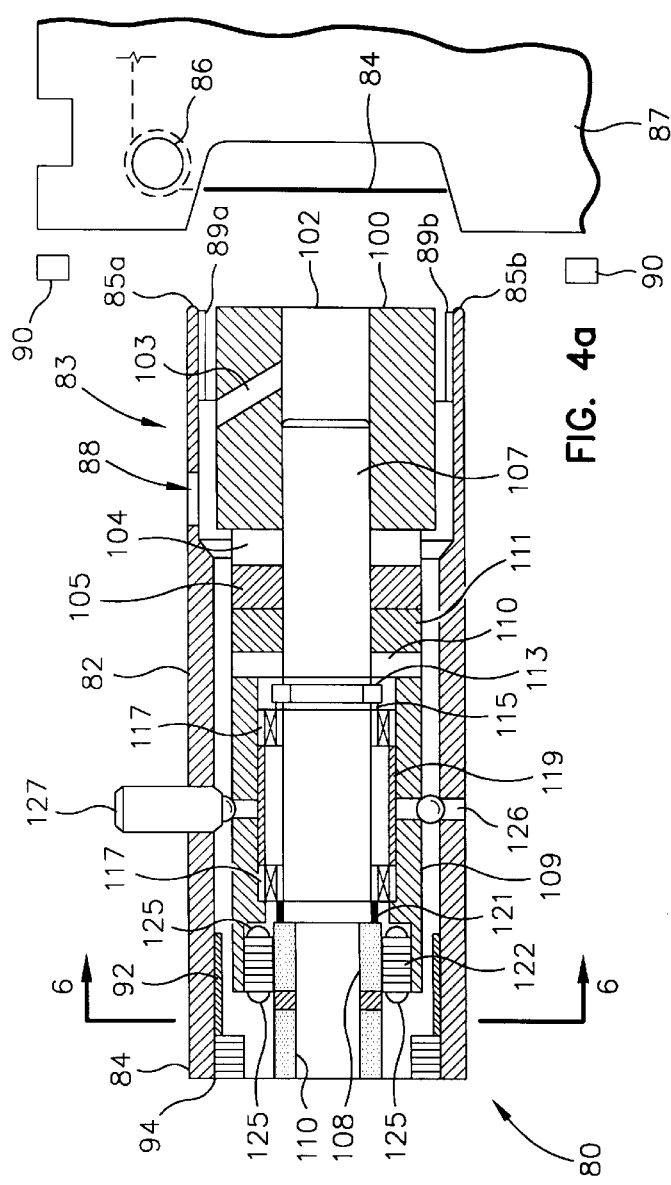
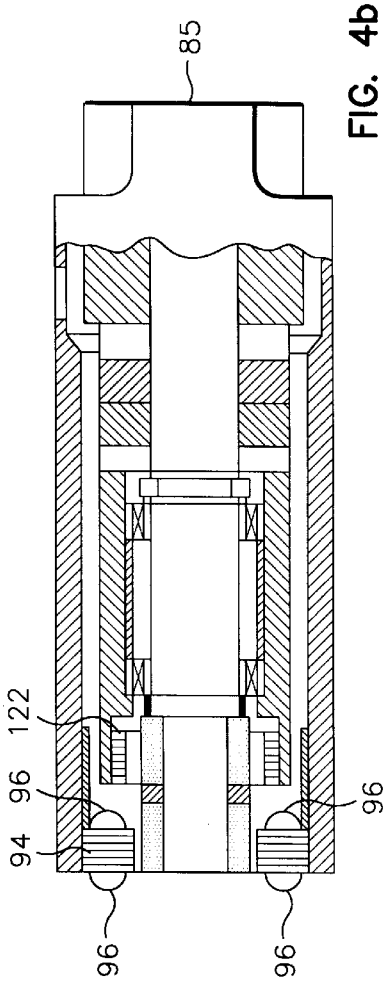
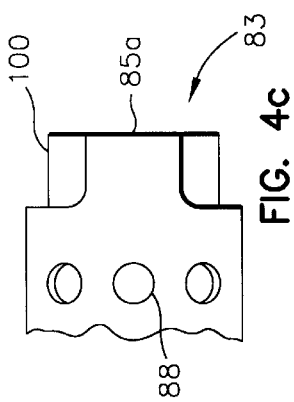
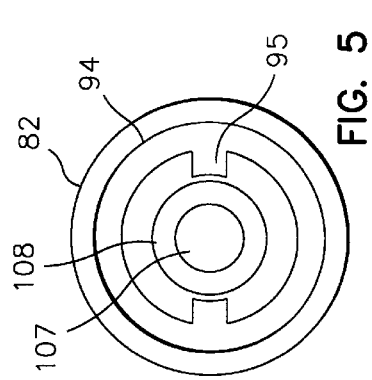
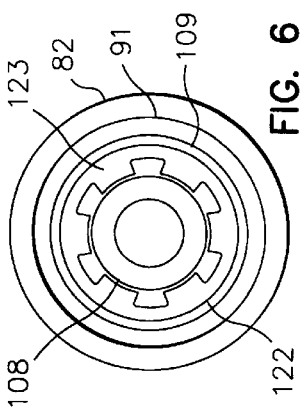

ARCUATE SCANNING TAPE DRIVE WITH A SERVO MECHANISM RESPONSIVE TO SERVO PATTERNS IN ARCUATE TRACKS ON A MOVING TAPE

This is a Continuation-In-Part of application Ser. No. 07/898,296, filed Jun. 12, 1992, now abandoned.

BACKGROUND OF THE INVENTION

The invention relates to magnetic recording, and in particular to an apparatus for recording and reading data on magnetic tape in the form of a sequence of arcuate tracks which are transverse to the longitudinal axis of the magnetic tape.

The standard configuration of an information storage subsystem for a modern computer installation includes internal and direct access memory. Typically, the information storage subsystem also includes a magnetic tape drive for backup storage of information in the internal and direct access components. Two important trends in storage technology are found in the miniaturization of all storage subsystem components, and a significant increase in the information storage capacity of the internal and direct access components. The tape drive component has been miniaturized by accommodation of the quarter inch tape cartridge which has emerged as a standard in the industry. However, the storage capacity (areal density) of the tape drive has not kept pace with the increased capacities of the other storage components. Accordingly, there is an urgent need to increase the amount of information which can be recorded on a magnetic tape, which can only be realized by increasing the density of information which is stored on the tape.

Most commercially important magnetic tape drive systems are based on the reel-to-reel transport of magnetic tape past a fixed recording/reading location where a stationary single- or multiple-track head is positioned. Recording and playback in such a system is done longitudinally with respect to the tape by moving the tape on its longitudinal axis past a record/playback location where a head mechanism is located. In a stationary head tape drive, the head mechanism consists of a plurality of transversely-aligned heads which are fixedly positioned with respect to the tape during record and playback. Information is placed on the tape in the form of a plurality of parallel, longitudinally-extending tracks; the areal density of information stored on the tape is increased by reducing the dimensions of the heads and the inter-head spacing on the head mechanism. However, small head size and minimal inter-head spacing demand great precision in the manufacture of head components. As a result, the manufacturing tolerances of the tape drive, primarily the mechanical tolerances of the head assemblies, have become increasingly stringent and more difficult and expensive to achieve. Of course, the proliferation of heads is reflected in additional read and write channel electronics for each head which also adds to the expense of these drives.

As is known, in the video recording art, modern high-capacity, high-quality tape drives employ head mechanisms which rotate magnetic heads with respect to a moving tape. The high rotational speed of the "rotary head" recorders steps away from the requirement in stationary head technology for a plurality of transversely-aligned heads and associated electronics and, therefore, obviates the problems attendant with manufacture and assembly of stationary head mechanisms. Servoing is employed in the dominant classes of rotary head tape drives to align rotating heads with tracks on the tape. The servoing techniques developed for these classes of tape drives enhance head/track alignment and result in substantial reduction in track width and inter-track spacing. Consequently, rotary head tape drives enjoy a significant advantage over stationary head tape drives in areal density.

The most widely employed rotary head technology is known as transverse linear or "helical" scanning technology. In transverse linear scanning, one or more transducers (heads) are mounted on the side cylindrical surface of a head carrier drum which is rotated on an axis parallel to, but spaced from, the longitudinal path of tape travel. A succession of linear tracks is laid down transverse to the longitudinal axis of the tape. In helical scan video recorders, a tape is wrapped around a tilted drum on whose outer surface are mounted (usually two) heads. The resulting tracks are substantially straight, but have an angle to the longitudinal axis of the tape. In helical scanning, servoing information included in the tracks or in separate servo tracks is used to vary the speed of the scanner and tape in order to align the tracks with the heads.

Upon an initial consideration, helical scanning would, therefore, promise to provide an increase in areal density which would match the amplified storage capacity of the internal and direct access components of a computer storage subsystem. However, the application of helical scanning to magnetic tape drives for computer systems is limited by two significant factors. First, the tape drive mechanism must have a means for closely engaging the tape and the side cylindrical surface of the head carrier. As is known, head/tape engagement mechanisms in helical scan tape drives are large, complex, and relatively slow acting. They would, therefore, add significantly to the size of a tape drive and to the difficulty and expense of manufacture and would require a significant amount of time to change a tape cartridge. The second drawback of helical scan tape drives is that the head/tape engagement mechanism imposes a high-pressure contact between head and tape, resulting in increased wear on the head parts and decreased lifetime of tapes.

Another type of rotary head technology has been described in which the heads are mounted near the periphery of a circular planar surface and rotated thereon about an axis passing through the center of the circular surface and through the plane of a longitudinally-moving tape. This rotary head technology results in the writing of a sequence of arcuately-shaped tracks which are transverse to the longitudinal axis of the tape. Use of an arcuate scanning tape drive implies an inherently small and simple head/tape interface in which the planar circular transducer-bearing surface is brought against the plane of the longitudinally-moving tape. This interface does not require the elaborate engagement mechanisms of helical scanning tape drives in which the tape is either wound around a tilted drum or conformed to a portion of the curved surface of a straight drum. However, two significant limitations and one erroneous perception have kept this technology from being widely used. The two limitations include the lack of an adequate servoing scheme and the absence of an acceptable low-pressure head/tape interface mechanism. The misperception is that arcuate scanning provides an inherently low storage density.

Prior art arcuate scanning tape drives are described, for example, in: U.S. Pat. No. 2,750,449 of Thompson, et al; U.S. Pat. No. 2,924,668, of Hoshino, et al; U.S. Pat. No. 3,320,371 of Bach; U.S. Pat. No. 4,636,886 of Schwarz; U.S. Pat. No. 4,647,993 of Schwarz, et al; and U.S. Pat. No. 4,731,681 of Ogata. The arcuate scanning mechanism and technique described in the Thompson et al patent concerns a low speed, low density audio recorder for logging communications on two-inch wide tapes Servoing is not considered, probably because the tracks are wide, information density is low, and the signal can be tracked manually during playback. This appears to be the case as well in the Hoshino and Bach references. The rotary head recording systems of Schwarz and Schwarz et al are evidently directed to high data rate applications in which a high head rotation velocity maximizes data density at moderate tape speeds; the Ogata reference describes a magnetic recording playback apparatus in which the relatively high rotational velocity of a head with respect to a tape is used to advantage in the recording of high frequency video signals; none of these references discloses a servoing technique.

The failure of these prior art arcuate scanning references to consider servoing is significant. In fact, head track alignment in arcuate scanning is a difficult challenge because of the geometry of the arcuately scanned tracks. At the edges of the scan, the tracks converge, while in the middle of the scan there is an unavoidable divergence of the tracks. The challenge to the servoing mechanism in an arcuate scan tape drive is then to maintain a head in alignment with a track which is not linear and which does not have a constant linear geometrical relationship with adjacent tracks. The failure to provide such a servoing mechanism in the early development of rotating head technology led to the conclusion that the arcuate scanning technique was inferior to the helical scanning technique and resulted in the abandonment of arcuate scanning in favor of helical scanning for reliable, high data rate, high density recording.

In helical scanning, the head traverses the width of a tape at a shallow angle, with its travel being primarily along the longitudinal axis of the tape. Dimensional changes of as much as 0.003 inches per inch may occur in the tape due to normal shrinkage relaxation, humidity, and temperature. These changes can be corrected to a first order in helical scanning by servoing the tape tension and, thereby, the stretched length of the tape around the tilted head drum. In arcuate scanning, such a servo would be ineffective since the scan is primarily transverse to the longitudinal axis of the tape, and there is no practical method for servoing the width of the tape.

The other significant deterrent to the use of prior art arcuate scanning technology in modern computer tape drives is the great amount of wear undergone by the heads as a result of head-to-tape contact. For example, in the Thompson et al patent, a solid backing plate is compliantly urged against the tape above the rotating head. This permits very high local pressures to develop during the passage of an asperity, thereby posing a significant danger of damage to the heads and tape, and leading to head clogging. For very high density, high speed recording, such a pressure plate is impractical because intimate contact between the head and medium on the order of microinches is required, but is impossible to achieve with a solid backing plate.

Last, the common wisdom has held that the divergence of arcuate tracks results in reduced areal density because useable tape surface between adjacent tracks does not pass beneath the scanning heads and, therefore, cannot be written to or read from. Since helical tracks are parallel, they can be written with no space between them and virtually the entire surface of the tape will be used to the fullest extent possible. Thus, the assumption is that helical scanning has a higher areal density than arcuate scanning. However, helical tracks are so long that tape distortions invariably result in shape variations from track to track which limit track density and, consequently, areal density.

The inventor has also observed that shorter arcuate tracks potentially provide a higher servo sampling rate than long helically-scanned tracks, which should result in faster detection of head/track misalignment and speedier correction of head position.

SUMMARY OF THE INVENTION

The invention significantly advances arcuate scanning technology by providing a novel servoing technique for head/track alignment and by eliminating the need for a pressure plate to bring the tape into contact with the rotating head assembly.

By servoing the speed of the tape in playback to align a rotating scanning head with the beginnings of the arcuate tracks and by servoing the position of the rotational axis of head scanning with respect to the longitudinal center line of the tape to achieve alignment of the head at the respective ends of the tracks, all of the aberrations of tape distortion present in helical scanning are removed to a first order. As a consequence, very narrow tracks can be employed without track misalignment due to tension variations, tape distortions, and tape-to-tape misalignment.

The unique servoing process provides an unexpected increase in the density of arcuate scan recording relative to what is possible with helical scanning as a result of the insensitivity of an arcuately scanned tape to longitudinal stretch, the short length of the scan, and the high rate of servo samples. For example, in helical recording employing a 62 mm drum of the VHS type, the scan length is about 3.8 inches. Since corrections for distortions in such helical scanning mechanisms can be accomplished only at the beginning and end of a scan by servoing the tape tension, the differential stretch of the tape in mid-scan is uncorrectable and considerable due to the well-known brake band formula. Corrections are applied after the long scan length in helical recorders, but after every about 0.25 inches in the arcuate scan recording technique of this invention, using quarter inch tape. Some degree of tracking correction is possible in helical scan recorders by servoing the position of the heads along an axis transverse to the scan direction, but such solutions are costly and only partially successful.

In the invention, servoing supports densities of 2,000 tracks and more per inch of tape, which compares with present helical scan recorders.

The invention further obviates the problem of head/tape engagement by the use of self-generated low pressure at the face of the rotary head carrier, which induces head/tape contact without a backing plate, with the surprising result that head wear is significantly reduced.

Accordingly, the invention concerns an apparatus for recording and reading information on a magnetic tape. The apparatus includes:

a frame;

a receiver mechanism in the frame for receiving a container holding a magnetic tape and for positioning the magnetic tape at a recording location;

a transport mechanism in the frame for engaging the magnetic tape and for advancing the magnetic tape longitudinally past the recording location;

a rotating transducer carrier;

at least on transducer on the transducer carrier for recording and reading information on the magnetic tape;

a positioning mechanism for positioning the rotating transducer carrier adjacent the recording location to rotate the transducer carrier on an axis of rotation which passes through the recording location, said axis of rotation corresponding substantially to a center of a circular transducing path followed by the at least one transducer when the transducer carrier rotates;

a motor mechanism for rotating the transducer carrier to record and read a sequence of arcuate information tracks on the magnetic tape; and a control mechanism connected to the transducer, to the transport mechanism, and to the positioning mechanism and responsive to servo information in the arcuate information tracks for aligning the at least one transducer with the arcuate information tracks by adjusting:

the speed of advancement of a magnetic tape; and the location of the transducer carrier with respect to a magnetic tape at the recording location.

Advantageously, the recording and reading apparatus also includes a mechanism on the transducer carrier for engaging the rotating transducer carrier with the tape at the recording location in response to rotation of the transducer carrier by production of a low ambient pressure acting between the transducer carrier and the tape.

Two principal embodiments of the invention are described. The first embodiment is based upon a servoing architecture in which at least one of a plurality of rotating heads is dedicated to reading servo information at the beginning and ending of each arcuate track in a sequence of arcuate tracks. In the second embodiment, every other track in the sequence of arcuate tracks includes servo information segments at its head and tail. Servo information readback is provided by read transducers on the transducer carrier.

Accordingly, a significant objective of this invention is to provide an apparatus and technique for servoing the position of rotating heads with respect to arcuate tracks on a magnetic tape.

An important advantage is provided by the invention in achieving such alignment by controlling the speed of advancement of the magnetic tape and the location of the transducer carrier with respect to the magnetic tape in response to servoing information in the arcuate information tracks.

A further objective of this invention is to effectively engage a moving magnetic tape with a rotating head assembly in an arcuate scanning tape transport by creating a low ambient pressure acting between the rotating transducer carrier and the tape.

The reader will appreciate that the invention achieves these and other significant objectives and advantages when reading the following detailed description with reference to the below-described drawings.

BRIEF DESCRIPTION OF THE DRAWINGS

FIGS. 4A–4C are section drawings illustrating structural details of a rotary head assembly according to the first embodiment of the invention.

FIG. 5 is an elevational end view of the rotary head assembly of FIGS. 4A–4C.

FIG. 6 is an elevational sectional view of the rotary head assembly of FIGS. 4A–4C taken along section 6—6 in FIG. 4A.

DETAILED DESCRIPTION OF THE PREFERRED EMBODIMENTS

Figure 1:
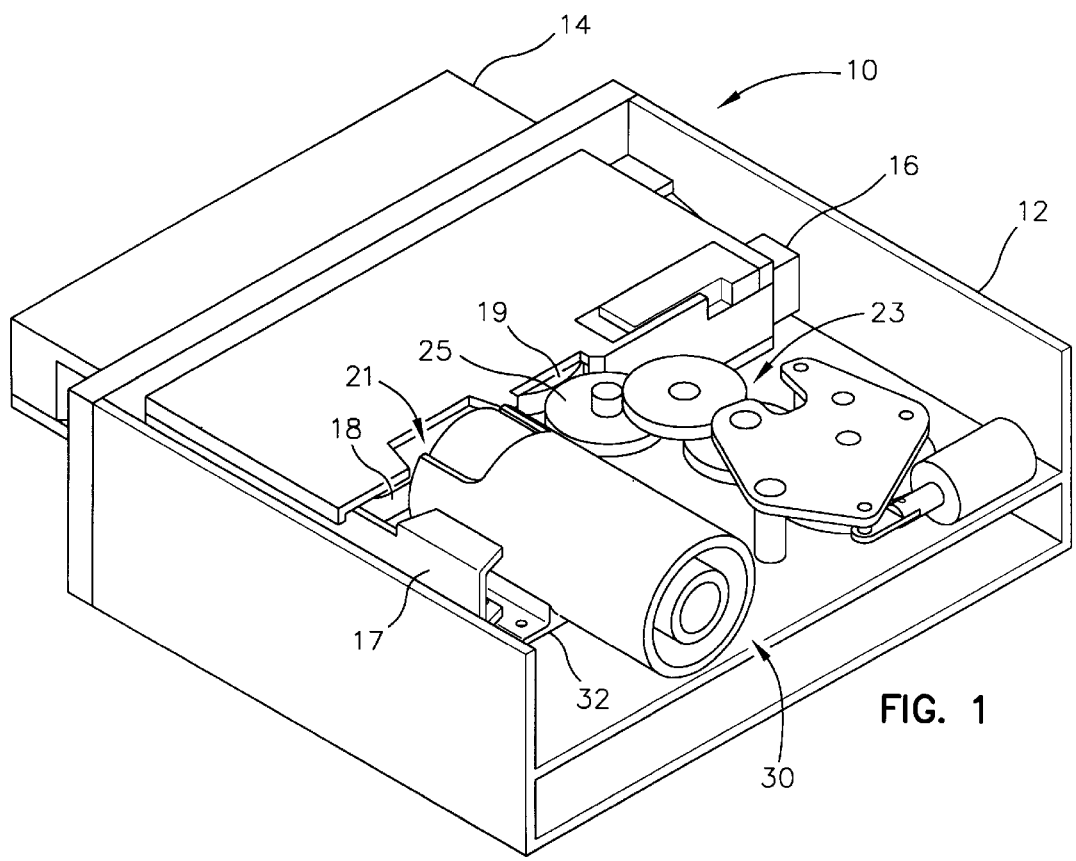
FIG. 1 is a perspective view of an arcuate scanning tape drive according to a first embodiment of the invention.

The invention concerns a tape drive used to back up the internal and direct access storage of a computer system or for general purpose recording of information signals that can be handled on a piecewise basis. As is known, such a tape drive is used to record data from the internal and direct access storage facilities so that such data can be used in the event of a malfunction of those facilities or a loss of data in the computer system. The process of "backing-up" involves the copying of data onto a tape for safekeeping.

The most commonly-used direct access storage device in portable and desktop computer systems is the Winchester disk of three and one-half or less. The three and one-half inch Winchester disk has a capacity of storing in excess of 40 megabytes of data. Prudent computer system management requires that the data on a Winchester disk be periodically copied (backed-up) so that it will not be lost in the event of a head crash. Further, it may be desirable to preserve Winchester-stored data in an archive or library or in a medium which can be manually transported to another computer system. Last, security requirements may necessitate erasing a disk and/or storage of transportable media in secure locations. Magnetic tape is widely used for these purposes.

For ease and convenience of handling, magnetic tapes are usually provided in containers such as cartridges. A cartridge typically consists of a housing containing magnetic tape would on supply and take-up reels. The cartridge is receivable in a mechanism called a "tape drive" which has the capacity to record or readback data on the cartridge tape. Currently, cartridges are used in miniature tape drives of portable and desktop computer systems. Commercially available cartridges are manufactured by, or under license from, Minnesota Mining and Manufacturing Company (3M) and are identified as DC1000, DC2000, and so on. A cartridge of this type is disclosed in U.S. Pat. No. 3,692,255, assigned to 3M and incorporated herein by reference. This cartridge includes a narrow tape which is approximately one-quarter of an inch wide. The cartridge body has a flat, rectangular configuration measuring approximately 9/16ths of an inch by approximately 2 and 3/8ths inches in width by approximately 3 and 3/16ths inches in length. The cartridge has a metal base plate which inhibits warpage and supports precision alignment of the cartridge in a tape drive. The magnetic tape in the cartridge is wound between a supply and take-up reel rotatably mounted between the base plate and a plastic top cover. The winding is accomplished utilizing a belt capstan roller which may be engaged by a capstan drive roller of the tape drive. The belt capstan roller drives the belt which engages the tape pack on each of the tape reels. The cartridge further has a hinged tape access door which is opened upon insertion into a tape drive in order to expose the tape for recording and playback by a read/write head assembly.

The invention which is described below was conceived in order to take advantage of the small size of a cartridge while enhancing the storage capacity of the tape beyond that achievable in conventional stationary head drives. Rotary head technology of the arcuate scan type is employed by the invention for this purpose in the manner illustrated in FIGS. 1–3.

The disclosure of the invention in combination with a belt-driven cartridge notwithstanding, the invention is intended to be used with any tape advancing mechanism. Thus, the inventor contemplates its use in combination with non-belt-driven cartridges, reel-to-reel setups, and a single length of tape, property tracked, for example.

Moreover, although the principal motivation for making the invention was to better serve the backup function, the inventor does not intend this to be the sole use to which it is put.

ARCUATE SCANNING TAPE DRIVE (FIRST EMBODIMENT)

The following is a description of the first embodiment of an arcuate scanning tape drive according to the invention in which head position and tape speed are controlled by a servo architecture which responds to servo information and the beginning and end of each track in a sequence of arcuate tracks.

Figure 2:
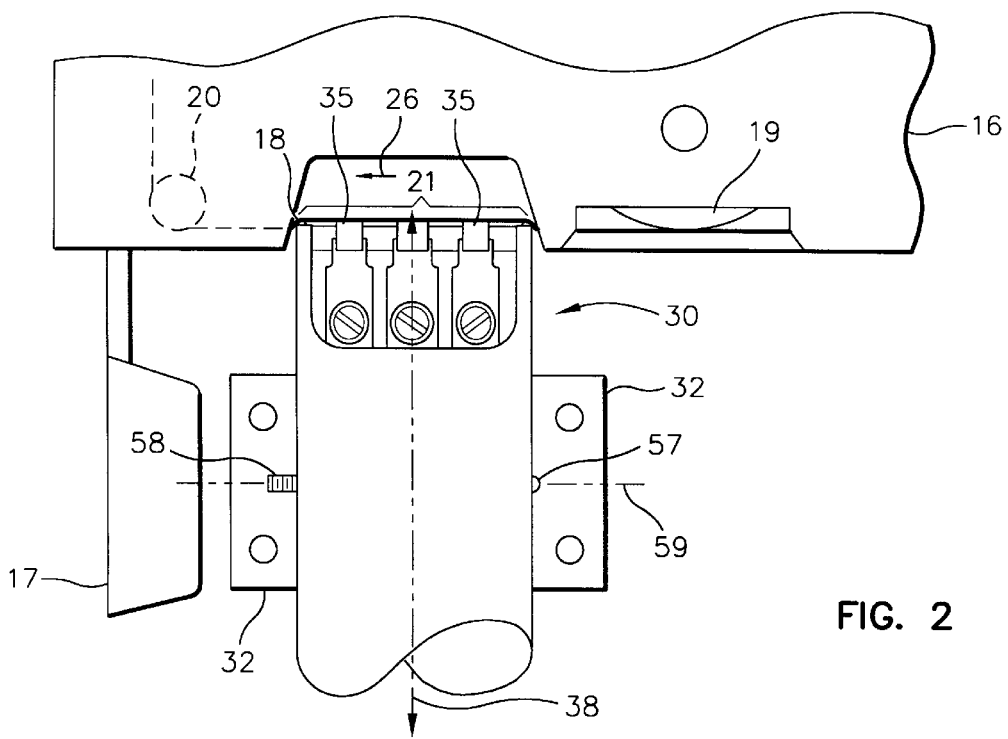
FIG. 2 is a top view of a rotary head assembly showing its engagement with a magnetic tape at a recording location in the first embodiment.
Figure 3:
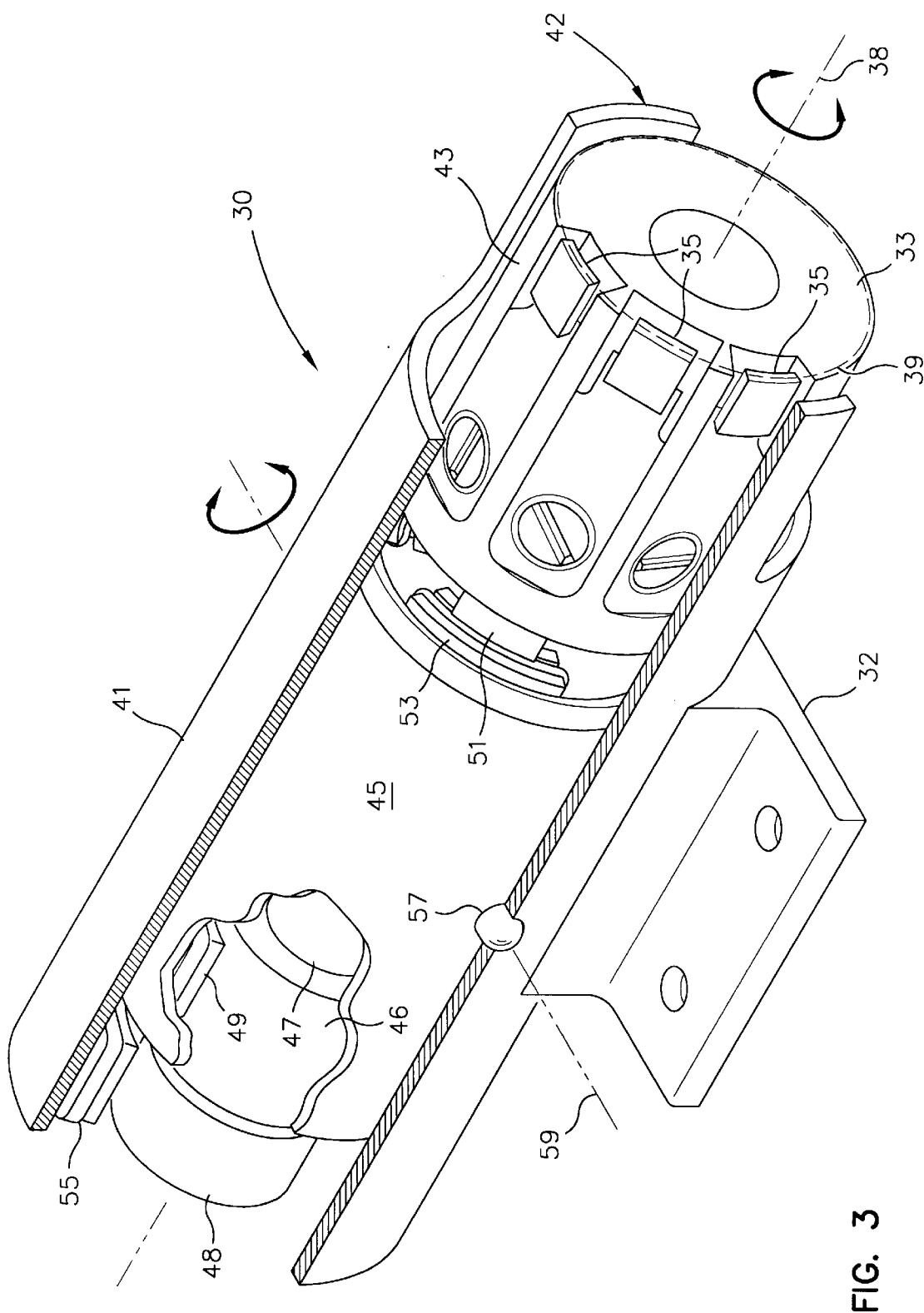
FIG. 3 is an enlarged perspective partial cutaway view of the rotary head assembly of FIG. 2.

In FIGS. 1–3, a miniature tape drive 10 having a frame 12 receives a cartridge 14 of the double-reel type. The tape drive 10 includes a conventional cartridge loading mechanism 16 which receives the cartridge 14, opens the tape cover 17 to expose the tape 18, and positions the tape for record and playback. The tape is driven longitudinally when a rotary force is applied to the tape capstan roller 19. The cartridge includes a stationary main guide pin 20. The main guide pin 20 is attached to the metal base plate of the cartridge adjacent the tape cover 17. The cartridge mechanism positions the tape 18 on the guide pin 20; the tape then travels right to left through a substantially planar record/playback location 21. The rotary force for longitudinally advancing the tape is applied, through the capstan roller 19, by means of a transmission assembly 23. For the purposes of this description, the transmission mechanism 23 includes a capstan drive roller 25 which engages the tape capstan 19 and, when rotated, causes the tape 18 to advance longitudinally through the record/playback location 21. Alternatively, the transmission mechanism can be eliminated and the drive roller 25 can be directly connected to the drive shaft of a multi-speed motor.

As the tape 18 advances longitudinally in the direction indicated by the arrow 26 through the record/playback location, data is recorded ("written") on or read ("played back") from the tape by means of a rotary head transducer assembly 30 (also, "scanner"). The rotary head transducer assembly 30 is fixed to the frame 12 by means of frame mounting flanges 32. The forward end of the rotary head assembly 32 includes a circular, substantially planar surface 33 at which are mounted one or more transducers 35. The circular surface is rotated on an axis of rotation 38 which extends through the center of the circular surface. When the circular surface 33 rotates, the transducers 35 are rotated on a circular transducing path 39. The rotary head assembly 30 is positioned such that the circular planar surface 33 is positioned at the record/playback location through which the axis of rotation 38 passes so that as the transducers 35 rotate on the circular transducing path 39, they trace out ("scan") a sequence of arcuately-shaped tracks across the tape 18. The sequence of tracks extends longitudinally along the tape and each arcuate track of the sequence is scanned transversely to the longitudinal axis of the tape, beginning near one edge of the tape and ending near the opposite edge.

The rotary head assembly 30 includes an outer shroud 41, essentially an elongate, hollow cylinder contoured at its forward end 42. Disposed in the shroud is a cylindrical transducer drum 43. The transducer drum 43 is a solid cylindrical piece whose forward end surface is the circular surface 33 at which the transducers 35 are mounted. The transducer drum 43 is connected through a stationary, tubular midsection 45 to a solid annular motor piece 46 and to a solid annular positioning piece 48. The transducer drum 43, motor piece 46, and positioning piece 48 are connected by a shaft 47 which extends through the stationary midsection 45.

Preferably, the motor piece 46 is fabricated from a magnetizable material such as Alnico 5 in a manner to provide a plurality of NS pole pairs which form the rotor pieces of an electric motor. Stator windings for the electric motor are mounted around the rear inner surface of the midsection 45. One stator winding is indicated by reference numeral 49. Thus, with the application of an electrical current to the stator windings 49, the motor piece 46, the shaft 47, and transducer drum 43 will rotate as one unit.

The transducers 35 are enabled to record or read data by means of rotary transformers which are explained in more detail later. In FIG. 3, a rotary transformer pair includes a rotor-mounted winding 51 which is connected to one of the transducers 35 and which is magnetically coupled once each rotation of the transducer drum 43 with a stator-mounted winding 53. Application of an electrical signal to the stator-mounted winding 53 is coupled to the rotor-mounted winding 51 and from rotor-mounted winding 51 to one of the transducers 35 for recording an arcuate track on the tape 18. On playback, the transducers 35 are rotated to scan arcuate tracks written on the tape 18 and each responds electromagnetically to information in those tracks by generating a current which induces the magnetic field in one of the rotor-mounted windings 51. That field is coupled to a stator-mounted winding 53, inducing a current which is conducted from the winding to data channel circuitry (not shown in FIGS. 1–3) and converted therein to a standard data format.

The rotary transducer assembly 30 also includes an important positioning feature which is employed in servo control of the circular surface 33 with respect to the tape 18. The positioning control feature includes a pair of scanner position adjustment windings 55 which are mounted in diametrical opposition on the rear inner surface of the shroud 41 adjacent the positioning piece 48. Preferably, the positioning piece is formed from a highly conductive material (such as copper) which responds to a field applied from either or both of the adjustment windings 55. The stationary midsection 45 is pivotally mounted within the shroud 41 by means of a spherical pivot ball 57 and a vlier 58. The pivot ball 57 and vlier 58 are aligned so that the midsection 45 can pivot about a pivot axis 59 which is parallel to the bottom of the frame 12 and perpendicular to the axis of rotation 38. As discussed below, the shaft 47 connecting the transmission drum 43 and the motor piece 46 is rotationally mounted within the midsection 45 by bearing assemblies so that the pieces 43, 45, 46, 47, and 48 all pivot as a single unit about the axis 59. The axis 59 is selected to be at the static balance point of the unit. Pivoting force is supplied by the scanner position adjustment windings 55. When these windings are energized in a complementary fashion, as discussed below, the fields which they set up interact with the positioning piece 46 to apply a pivoting force thereto. As discussed below, the pivoting force is developed in response to servo information contained in the arcuate tracks and has a magnitude necessary to align the transducers 35 with the arcuate tracks on the tape 18 by pivoting the portion of the rotary transducer assembly which is contained pivotally within the shroud 41. As can be appreciated with reference to FIG. 3, pivoting of the inner portion of the rotary transducer assembly moves the point where the axis of rotation 38 intersects the record/playback location, thereby adjusting the position of the circular surface 33 with respect to the tape 18 at the record/playback location 21.

ROTARY HEAD ASSEMBLY (FIRST EMBODIMENT)

Refer now to FIGS. 4A–4C and FIGS. 5 and 6 for an understanding of the construction of the rotary head assembly. In FIG. 4A, a rotary head assembly 80 is shown slightly offset from a tape cartridge 87 in order to illustrate certain construction details while preserving the sense of orientation which the assembly has with respect to a tape 84 in the cartridge. The rotary head assembly 80 (equivalent to the rotary head assembly 30 illustrated in FIGS. 1–3) includes a shroud 82, which is a shaped, cylindrical piece of aluminum having a generally tubular configuration and front and rear ends, 83 and 93, respectively. The front end 83 of the shroud 82 is shaped to form a pair of diametrically-opposed tape engagement projections 85a and 85b. These projections are hard anodized for resistance to wear. The ends of the projections are slightly rounded in order to engage a tape 84 of a cartridge 87 at a record/readback location. FIG. 4A shows the projection 85a aligned with the guide pin 86. When incorporated into a tape drive, the rotary head assembly is mounted so that the projection 85a is in close proximity to the guide pin 86 of a cartridge received in the tape drive. The rotary head assembly is mounted to a tape drive so that the projections 85a and 85b are aligned with reference blocks 90, which are mounted on the drive to position the cartridge when it is inserted.

FIG. 4C shows the front end 83 of the rotary head assembly rotated by 90° from FIG. 4A to illustrate the contour of the front end around projection 85a. As shown in FIGS. 4A and 4C, vent holes 88 are cut near the front end 83 to the rear of the tape engagement projection 85a and extends through the shroud 82. An aerodynamic insert 89 is applied forward of the vent holes 88 on the inside surface of the front end 83 on the back of the upper tape engagement projection 85a.

Refer now to the rear end 93 of the shroud 82 where a concentric stack of scanner position adjustment winding assembly rings is mounted on the inner surface of the shroud 82. Reference numeral 94 indicates the planar shape of one of the rings in FIG. 5. Each ring has a pair of diametrically-opposed winding projections 95. When the projections 95 are wound as indicated by the winding envelope 96 illustrated in FIG. 4B, the scanner position adjustment windings are formed. As shown in FIG. 4A, an annular limit pad 92 is mounted on the inner surface of the rear end 84 just behind the scanner position adjustment winding assembly rings 94.

The moving parts of the rotary head assembly 80 include a transducer drum 100, a shaft 107, a motor piece 108, a positioning piece 110, and a midsection 109.

The transducer drum 100 is a shaped cylindrical piece with a center hole 102 only partially filled by the forward end of the shaft 107. A transverse opening 103 connects the center hole 102 with the interior of the shroud 82 at the first end. The center hole 102 and the opening 103 form a centrifugal pump which operates as follows. Rotation of the transducer drum moves air through the vent 88. When the transducer drum 100 rotates, the velocity of air passing by the opening 103 is sufficiently high to create a vacuum reaching through the opening 103 and acting through the center hole 102 to draw a tape into intimate physical engagement with the circular surface on the front end of the drum 100.

The air flow from the opening 103 is encouraged to exit through the holes 88 in the shroud 82 by an aerodynamic insert 89a having a slanted texture. The slanted texture of the aerodynamic insert 89a in cooperation with the air which circularly rotates around the outer surface of the drum 100, causes air to flow toward the holes 88. This creates a low pressure region at one side of the recording location acting between the transducer drum 100 and the projection 85a. This draws the tape against the end face of the transducer drum in the region around the projection 85a. Similarly, an aerodynamic insert 89b having a slanted texture in the direction opposite that of the aerodynamic insert 89a, causes a high pressure region to occur between the transducer drum 100 and the projection 85b, thereby reducing head-to-tape contact in the annular region around the projection 85b.

With reference to FIG. 4A, assume that the rotating transducer assembly 80 is positioned so that the circular surface on the face of the transducer drum 100 physically contacts the tape 84. Assume now that the transducer drum 100 rotates. The tape 84, which is already generally in contact with the circular surface on the face of the drum, is drawn against this circular surface by the vacuum created in the center hole 102. The principle upon which this feature is based is that the magnetic tape is compliant such that it will respond to any force impinging on it. While a vacuum is the preferred means for engaging the tape against the base of the drum, air or fluid pressure can be directed against the back (unrecorded) side of the tape to push it against the drum face. This is a significant improvement over the method of assuring head/tape engagement used in the above-referenced Thompson et al patent. Thompson discloses the strictly mechanical device which contacts the backside of the tape. Even though the tape is compliant, the mechanical "press" of the Thompson mechanism is rigid. Thus, contamination on the tape could be compressed between the head and the tape embedding itself in the tape to cause permanent dropout at that point and causing unnecessary wear on the rotating head assembly. The use of a fluid (air or gas pressure) allows the tape to engage the head with a low friction interface and to compliantly respond to particles by moving slightly away from the face of the transducer drum.

An annular rotor winding carrier 104 is fixed to the rear end of the transducer drum 100 to provide a surface upon which are mounted the rotary transformer rotor-mounted windings 105 which connect with the transducers (not shown) on the front face of the transducer drum 100.

The shaft 107 is attached in the lower portion of the center hole 102 of the transducer drum and has affixed to it the annular rotor winding carrier 104, and then the cylindrical motor piece 108. The motor piece 108 is fabricated as disclosed above from a magnetized material.

The positioning piece 110 is fixedly mounted at the rear end of the shaft 107, spaced from the motor piece 108. The positioning piece is fabricated as disclosed above from a conductive material.

The stationary midsection 109 is formed from a tubular metal piece. An annular stator winding carrier 112 is fixed to the forward end of the midsection 109 and carries the rotary transformer stator windings 111. A retaining ring 113 and a wave washer 115 are fitted on the shaft 107 just behind the stator winding carrier 112 to preload the shaft against the carrier. A pair of bearing assemblies 117 are mounted in a spaced-apart configuration on the inner surface of the midsection 109 and receive the shaft 107 to rotatably mount it within the stationary midsection 109. The bearing assemblies 117 are separated by an annular spacer 119. A spacer 121 is mounted on the shaft 107 between the rear bearing assembly 117 and the motor piece 108 to preload the shaft 107 on the midsection 109.

A motor stator winding assembly 122 includes annular stator winding pieces mounted on the rear inner surface of the midsection 109. Each stator winding assembly piece has the planar configuration indicated by reference numeral 122 in FIG. 6 and includes six projections 123 for carrying motor stator-mounted windings. The envelopes 125 of the motor stator-mounted windings are illustrated in FIG. 4A.

The moveable portions of the rotary head assembly 80 include a rotatable member made up of the transducer drum 100, the shaft 107, the motor piece 108, and the positioning piece 110, and a pivotal member, the midsection 109, to which the rotatable member is mounted in the bearing assemblies 117. The pivotal midsection 109 is attached to the shroud 82 by the pivot ball 126 and vlier 127.

TRANSDUCTION ARCHITECTURE (FIRST EMBODIMENT)

The physical architecture of the rotary head assembly which is necessary for data storage and retrieval is illustrated in FIGS. 7 and 8A–8C. These figures exaggerate dimensions and slightly alter positions of various components for the sake of explanation and illustration. Initially, it is noted that the functions of writing, reading, and servoing could be performed by a single head, a single rotary transformer, and switched electronics with separate write, read, and servo channels. In fact, the inventors contemplate that the invention could be practiced with such an architecture. However, the single-head architecture does not support effective read-after-write operation where a track is written and immediately read for validation. With a single head, movement of the tape past the transducer drum would carry the write track beyond the transducer scanning path and prevent the head from reading the track on a subsequent revolution of the transducer drum. Of course, if the capstan drive roller were driven by a stepper motor, the tape could be incremented by one track width, written on a first scan by a bi-functional transducer and then read on the next scan, following which the tape would again be advanced by one track width. Such an arrangement would result in very slow performance, long data access time, and relatively complex and expensive electronics. Adding the functions of servoing to a single head would only amplify these disadvantages.

Therefore, in order to avoid these problems at a slight increase in manufacturing complexity for the transducer drum, the first embodiment of the invention utilizes a minimum complement of at least three transducers, one each for writing, reading, and servoing.

Figure 7:
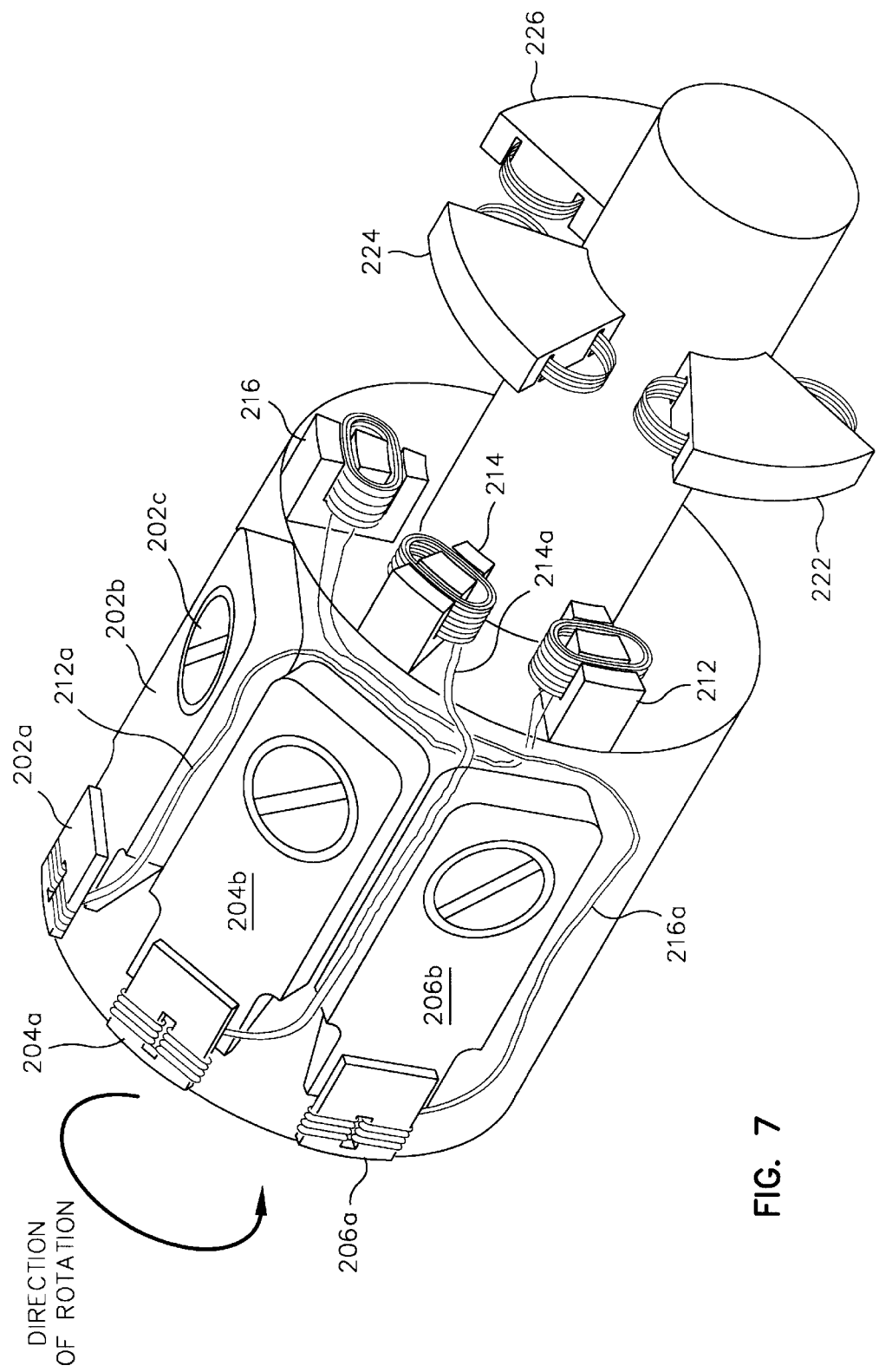
FIG. 7 is a side perspective view showing the transduction architecture of the rotary head assembly of FIG. 2.

The three-head architecture of the first embodiment is illustrated in FIG. 7, where read, write, and servo head assemblies are arranged in counterclockwise sequence on the side surface of a transducer drum 200. The three heads are substantially identically constructed in all essential respects except for width and radial position on the drum face. The write and servo transducers are slightly wider than the read transducer. In addition, each head assembly has a respective radial position with respect to the center of the transducer end face as described in more detail later. Each head assembly includes a transducer support block, such as the read support block 202b, attached to the side cylindrical surface of the transducer drum by a threaded screw, such as the screw 202c. Each transducer support block carries a two-winding transducer. The read transducer is indicated by reference numeral 202a, the write transducer by reference numeral 204a, and the servo transducer by reference numeral 206a. In practice, the drum 200 is slotted along its side to accept the transducer support blocks so that the transducers are positioned near the outer periphery of the end face of the drum. This is not shown in FIG. 7; however, the slots are clearly shown in FIGS. 2 and 3.

The transducer support blocks are positioned so that the tips of the transducers project slightly through the plane containing the front end of the transducer drum (not shown in FIG. 7). Thus, as the drum 200 rotates in a counterclockwise direction, each of the transducers traces a circular scan in a plane slightly offset from, and parallel to, the front end face of the transducer drum 200.

Although the first embodiment shown in FIG. 7 utilizes three heads, this is not intended to so limit the invention, which can be practiced with any number of heads appropriate to a particular design.

It would be possible to serve all three of the transducers of FIG. 7 by a single rotary transformer having a rotor-mounted winding and a stator-mounted winding. However, this would, again, necessitate the provision of switched electronics to provide separate write, read, and servo channels. Further, the combination of impedance effects exhibited by a single multifunctional rotary transformer and the artifacts of electronic switching would increase channel noise. Accordingly, the first embodiment utilizes a separate, dedicated rotary transformer for each head. In FIG. 7, therefore, there is provided a read head rotary transformer consisting of a rotor-mounted winding/core piece 212 and stator-mounted winding/core piece 222. The rotor piece 212 is connected to the read transducer 202a by a twin-lead signal path 212a. The write head 204 is served by a rotary transformer consisting of a write rotor-mounted winding/core piece 214 and a stator-mounted winding/core piece 224. The rotor piece 214 is connected to the write transducer 204a by a twin-lead signal path 214a. Last, the servo head is connected by twin-lead signal path 216a to a servo rotor-mounted winding/core piece 216 which operates in conjunction with a servo stator-mounted winding/core piece 226.

The stator pieces 222, 224, and 226 are stationarily mounted to the forward end of the midpiece (which is not shown in FIG. 7) as illustrated in FIG. 3. Each stator piece includes a substantially arcuately-shaped core section, which corresponds with the shape of the tracks produced and read back by the apparatus of the invention. Last, the transducer drum 200 is mounted for counterclockwise rotation on the shaft 208.

In the first embodiment, the rotary transformers are essentially equivalently constructed. In this regard, both the rotor and stator pieces are quadripole devices whose electromagnetic operation cancels any effects caused by external fields. Further, each transformer consists of rotor and stator pieces located at essentially the same radial distance but at a different circumferential location as its companion pieces. The inventor contemplates that the functions performed by the transformers could be accomplished with a set of coaxial circular transformers, one for each head. However, the cost of the coaxial configuration would be higher than the cost for the configuration illustrated in FIG. 7.

Figure 8A:
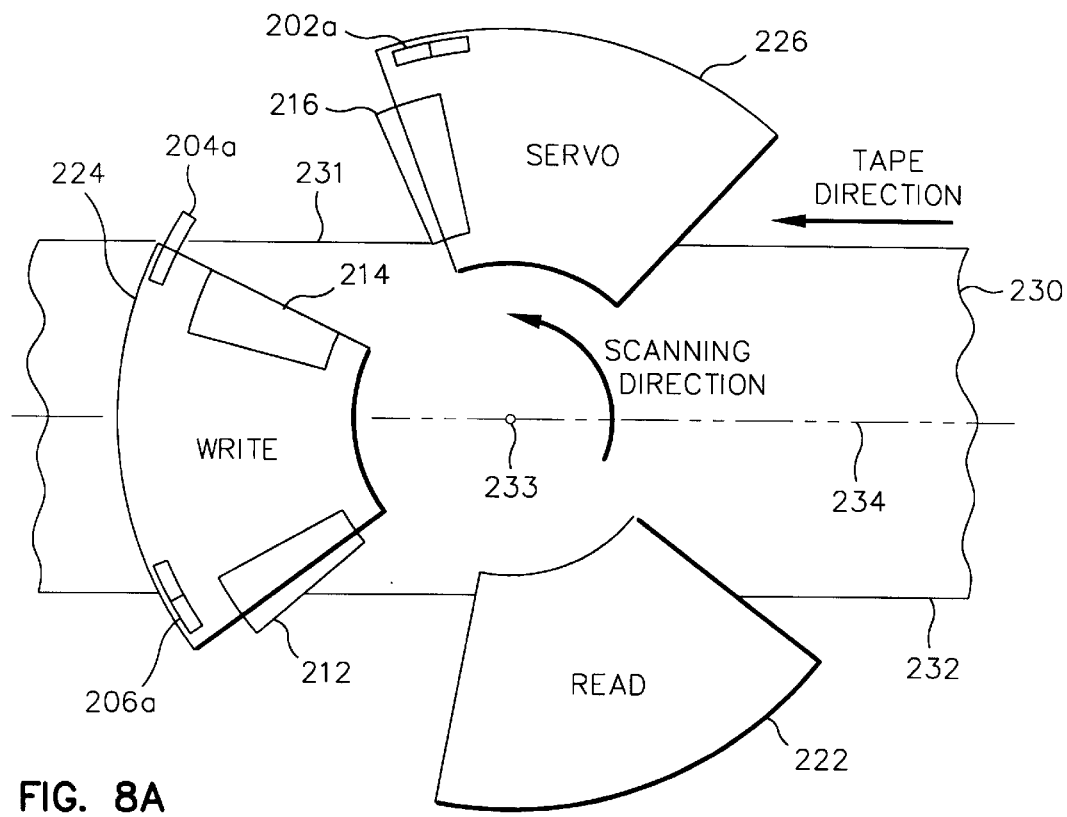
FIGS. 8A–8C are schematic drawings representing geometrical relationships of various components of the rotary head assembly of FIG. 2.
Figure 8B:
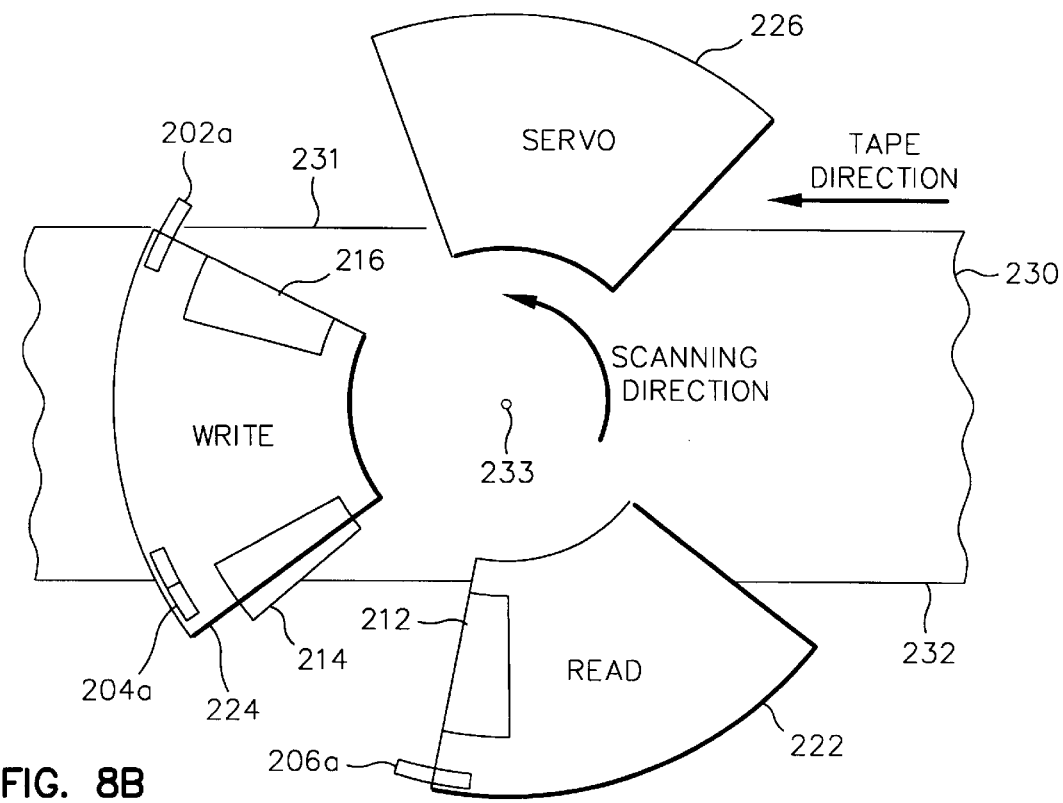
Figure 8C:
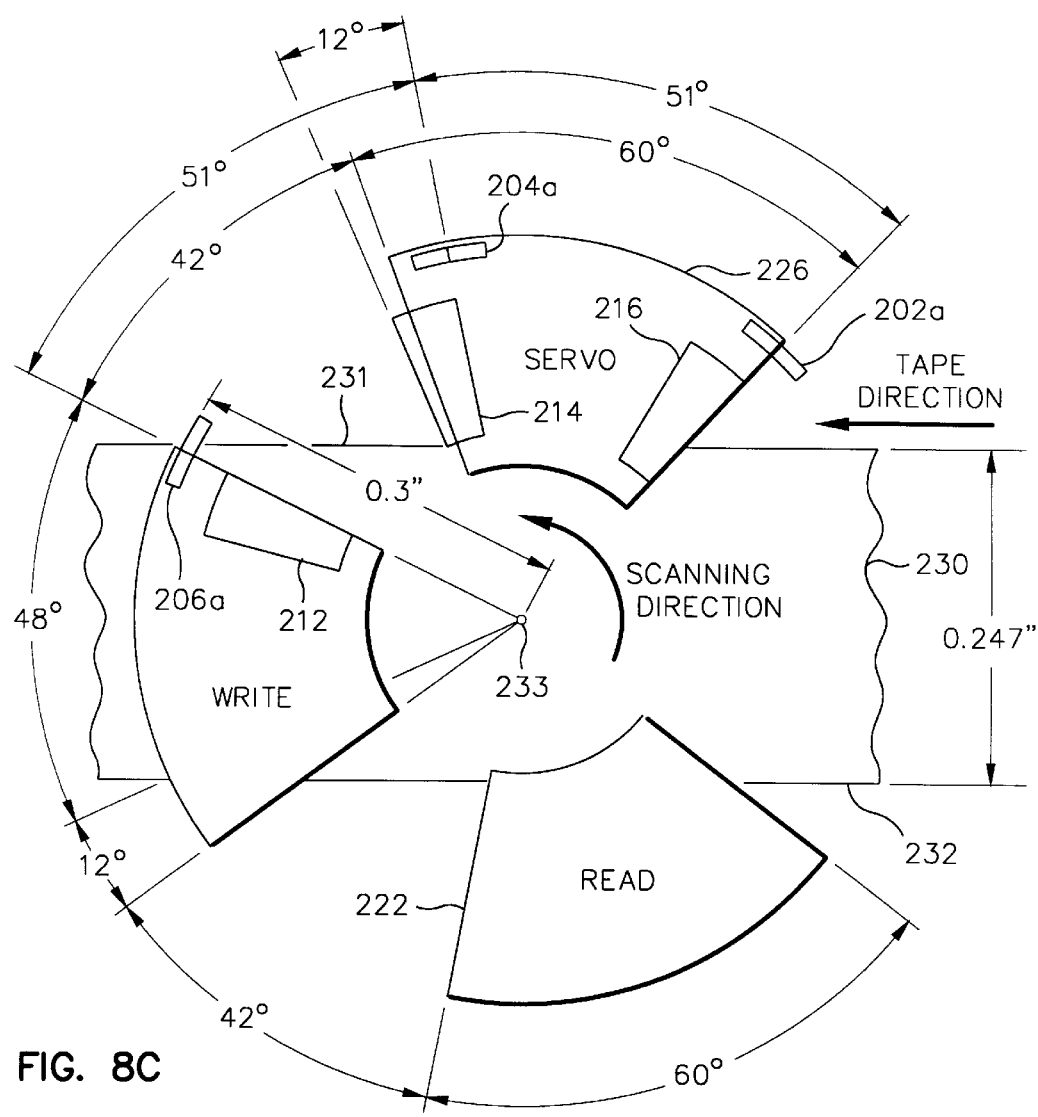

The use of separate dedicated rotary transformers with stationary windings necessitates the positional relationships illustrated in FIGS. 7 and 8A–8C. (Note that in FIG. 7, the winding/core pieces are illustrated and described; however, FIGS. 8A–8C illustrate relative core positions.) As shown, the three stator pieces 222, 224, and 226 are disposed to occupy arcuate sections of a single circular plane which is parallel to, and concentric with, respective circular planes occupied by the rotor pieces 212, 214, and 216 and the transducers 202a, 204a, and 206a. The orientation of these components with respect to a tape at the record/playback location is illustrated in FIG. 8A. In FIG. 8A, a tape 230 having an upper edge 231 and a lower edge 232 is transported from right to left, while the transducer drum with the transducers and rotary windings disposed thereon rotates in a counterclockwise direction at a center of rotation 233. Ideally, the center of rotation 233 falls on the center line 234 of the tape 230 during record/readback. The stator pieces 222, 224, and 226 are spaced arcuately from each other by distances adequate to ensure that they are not bridged by the cores of the rotary pieces. The stator pieces are permanently positioned such that the upper left corner of the stator piece 224 is substantially aligned with the upper edge 231 of the tape. The arcuate span of the write stator piece 224 extends from the upper edge 231 across the lower edge 232 of the tape 230. Assume now that as the transducer drum 200 rotates counterclockwise, the write transducer 204a and write rotor piece 214 have the positions illustrated in FIG. 8A. Application of a write current to the winding of stator piece 224 will generate a field which is coupled to the rotor piece 214, causing current to be conducted therefrom to the transducer 204a, enabling the write transducer to record an arcuately shaped track on the tape 230.

When the transducer drum has rotated in a counterclockwise direction far enough to enable the write transducer 204a to record a full track, the read transducer 202a must be positioned to begin reading the track just written in order to support read-after-write validation. This is shown in FIG. 8B. However, the physical channelization of the write and read functions in the rotary transformer prevents the use of the write stator winding 224 to couple the readback signal. Instead, this is provided in the read stator winding 222. As FIGS. 7 and 8B illustrate, the read stator winding 222 is displaced in the forward arcuate scanning direction from the write stator winding 224. Further, the read rotor winding 212 is located on the transducer drum forward of the write rotary winding 214 in the scanning direction by an arcuate distance sufficient to align it with the read stator winding 222 when the read transducer 202a is positioned at the beginning of a track.

FIG. 8C also illustrates further rotation f the transducer drum in the scanning direction by an amount sufficient to position the servo transducer 206a at the lower edge 232 of the tape 230. Further rotation of the drum will scan the servo transducer along arcuate tracks on the tape 230. The signals read back by the servo transducer 206a must be coupled to the servo stator 226 during scanning in order to develop position error signals necessary to the servoing operation. As FIG. 8C shows, this requires the location of the servo stator winding at a location which is arcuately displaced from the read stator winding 222 in the scanning direction and further requires that the servo rotor winding 216 be positioned on the transducer drum 200 at a location which is arcuately displaced in the scanning direction from the read rotor winding 212 by a distance sufficient to align it with the servo stator winding 226 when the stator transducer scans the tape 230.

GEOMETRICAL AND RADIAL RELATIONSHIPS OF THE TRANSDUCERS (FIRST EMBODIMENT)

Figure 11A:
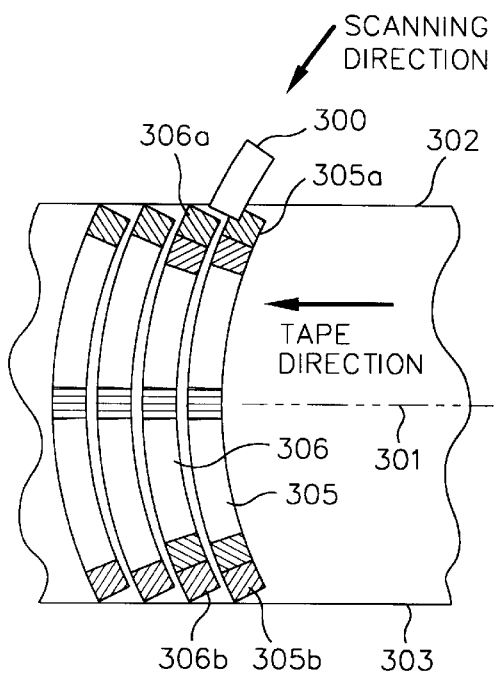
FIGS. 11A–11C illustrate the operation of a servo transducer with respect to arcuate tracks written according to the first embodiment of the invention.
Figure 11B:
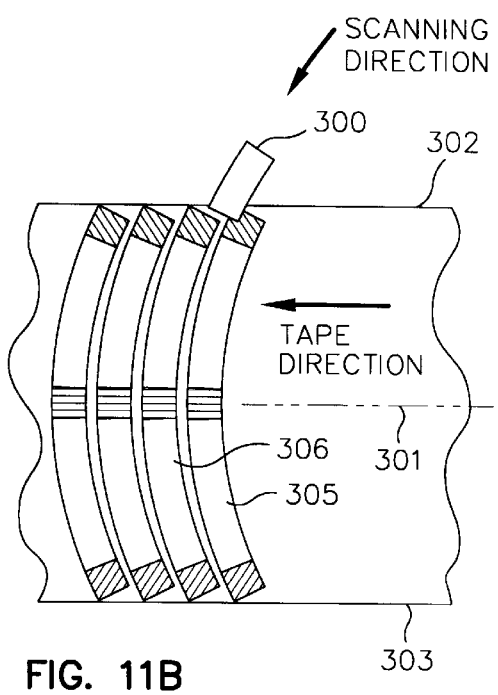
Figure 11C:
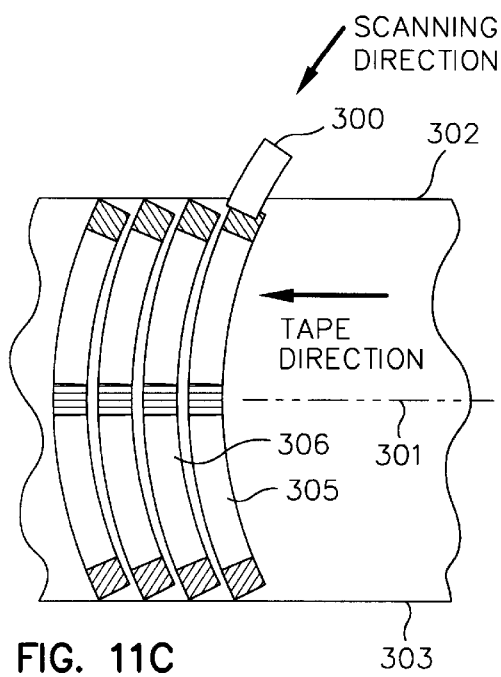

All embodiments and the best mode of the invention contemplate the use of quarter inch magnetic tape having a nominal width of 0.247 inches. With unused guard bands of 0.011 inches on each edge of the tape, the net usable width is 0.227 inches. The nominal radius of the scanning path traversed by the transducers is 0.3 inches, which is also the nominal radius of the arcuately-sectioned stator windings. Assuming a nominal tape speed of 0.0625 inches per second for reading and writing, the transducer drum with three heads must rotate at a speed which will scan exactly one track per revolution. Assuming a track pitch of 0.0005 inches, a rotational velocity of the drum of 7500 revolutions per minute (125 revolutions per second) is assumed. Under these conditions, each revolution of the drum will write or read a track substantially in the shape of an arc subtending about 44° 0 and having a radius of 0.3 inches. The time for one head to scan a track is 988 microseconds and the track length is 0.235 inches. The configuration of a sequence of arcuate tracks written by the first embodiment rotary head assembly is shown in FIGS. 11A–11C.

These conditions support the angular relationships illustrated in FIG. 8C wherein the total angle subtended by an arc extending from the upper to the lower tape edge with a radius of 0.3 inches and centered at 233 is about 480. Thus, a track having an angle of about 44° does not consume all of the space available to it. Transducers are spaced by arcs of about 51°, which is slightly larger than the span of an arcuate track. Consequently, only one head will scan a track at any one time.

Figure 9A:
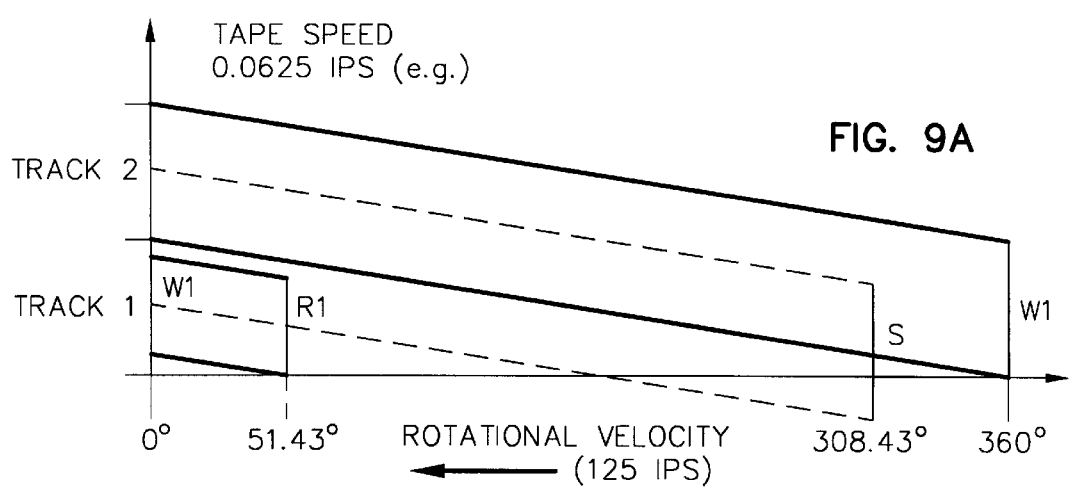
FIG. 9A is a plot showing the relationship of the geometry of a transducer drum with three transducers on the rotary head assembly with respect to the beginning of two adjacent arcuate tracks.

For read-after-write operation, the read head 202a must be arcuately spaced from the write head 204a in a direction opposite the scanning direction by an angle at least equal to the angle subtended by the arcuate track. In addition, the read head must be positioned on a radius which is slightly different than the radius of the write head. This is illustrated in FIG. 9A where the locus of the beginnings of tracks 1 and 2 are plotted with respect to the rotational sequence of the three transducers illustrated in FIGS. 7 and 8A–8C. The horizontal axis of FIG. 9A shows the angular displacement of one head with respect to another, with the write head (W1) positioned at the 0°, and the servo transducer (S) located at about 308°. As the tape moves upwardly (corresponding to the right-to-left movement in FIGS. 8A–8C) the locus of the beginning of a track moves upwardly with respect to the transducer heads. Since the tape speed is related to the rotational velocity of the transducer drum such that every revolution of the transducer drum sees the tape move one track width, by the end of one revolution, when the write transducer is at the 360° location, it is positioned at the beginning of track 2. For read-after-write operation, the read transducer must be positioned on the transducer drum at a radius equal to the radius at which the write transducer is located, plus the distance moved by the tape during the time required for the transducer drum to rotate the read transducer to the beginning of track 1. In the geometry illustrated in FIG. 8C, write and read transducers are separated by an arc length equal to 1/7th of the circle described by the end face of the transducer drum; therefore, the read head must be placed at a radius equal to the radius of the write transducer less 1/7th of a track width.

FIG. 9A illustrates the transduction geometry for the basic complement of transducers of the first embodiment: one write (W1), one read (R1), and one servo (S). The servo head (S) may be a read-only head that uses the adjacently-written tracks for position error information, as explained later. The inventor contemplates that more than one write/read transducer pair can be employed with one servo transducer. For example, the transduction geometry of FIG. 9B is based upon a transducer drum with seven transducers—three write/read pairs (W1/R1, W2/R2, and W3/R3) and one servo transducer (S)>

To facilitate overwrite of data without overly stringent alignment requirements, the read transducer is slightly narrower than the write transducer.

Figure 9B:
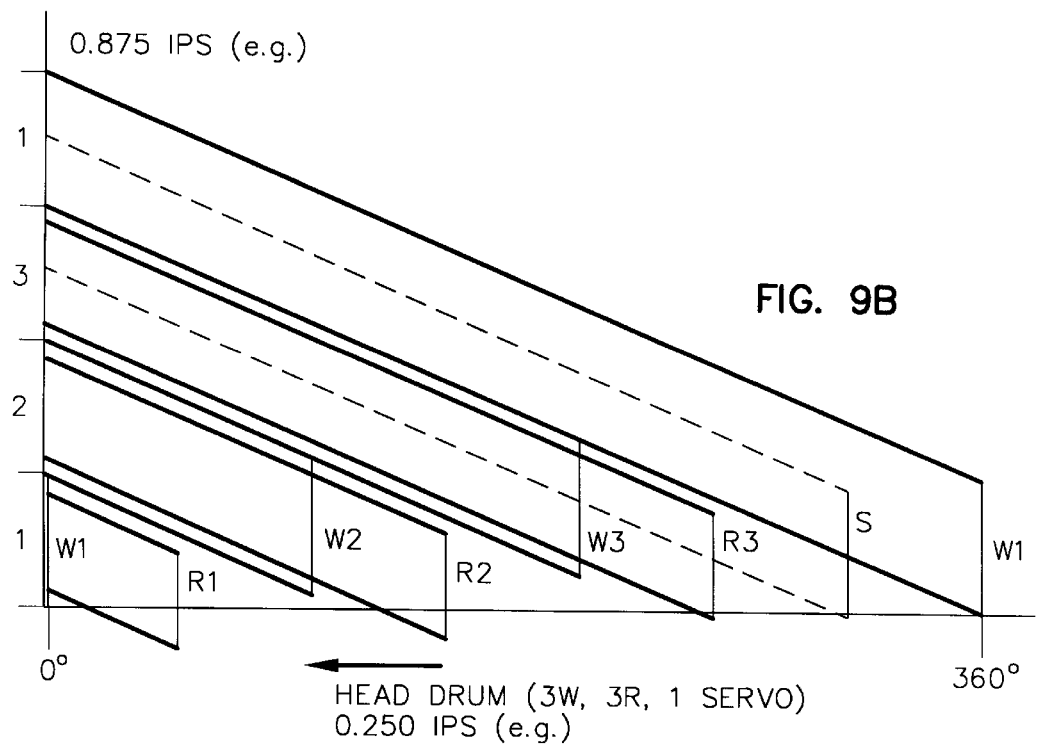
FIG. 9B shows corresponding geometry for a transducer drum with seven transducers.

In the first embodiment, the servo transducer spans the distance between the midpoints of two adjacent tracks (tracks 1 and 2 in FIG. 9A and tracks 1 and 3 in FIG. 9B). In this case, the servo transducer is on a radius equal to the radius of the write head minus the distance the tape moves in the time required for the transducer to rotate from the write to the servo transducer (6/7ths of a track width) plus ½ of a track width. Relatedly, the servo transducer has the same width as the write transducer.

TAPE INFORMATION FORMAT (FIRST EMBODIMENT)

Figure 10:
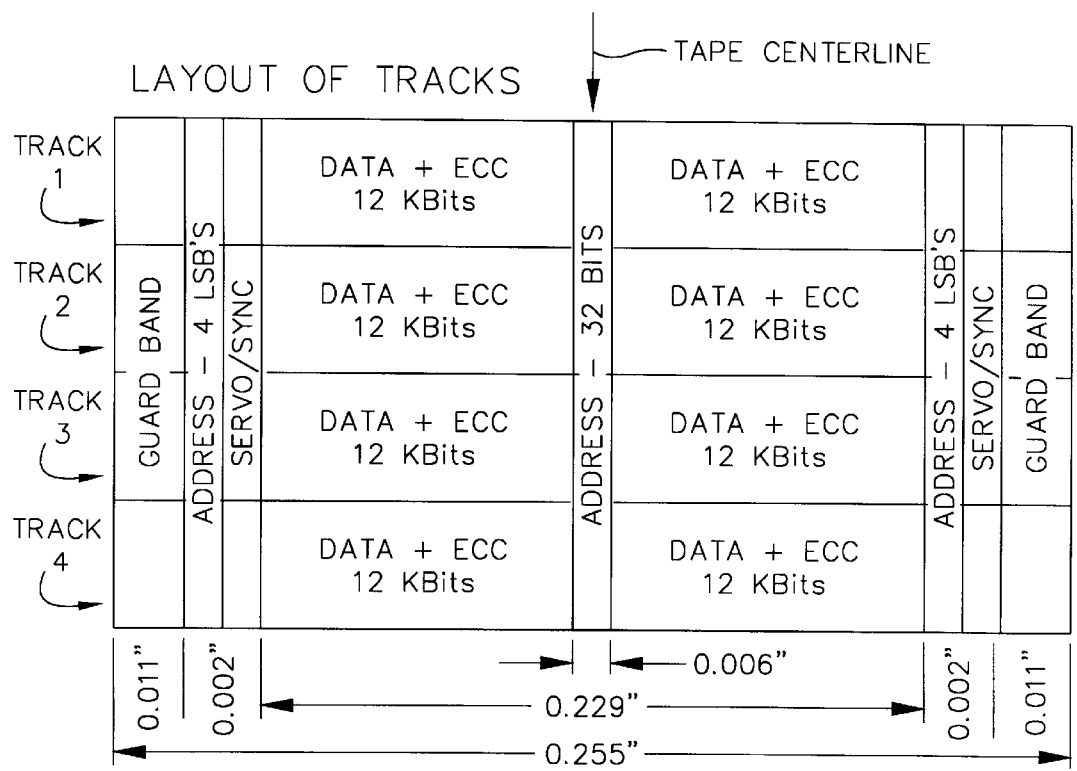
FIG. 10 is a plot showing the information layout of arcuate tracks according to the first embodiment of the invention.

As described above, information is written in a magnetized region on tape in an arc of approximately 45° whose center is nominally on the center line of the tape and whose radius is 0.3 inches. Each arc comprises a track. Each track contains servo information, data sectors, and a physical track address. The track information format is illustrated in FIG. 10. In FIG. 10, the layouts for four successive tracks are shown. In each track, an initial and terminal guard band separates the information portion of the track from respective edges of the tape. Servo signals are written near the beginning and end of each track. Preferably, servo signals consist of four bits (a maximum of eight flux reversals) at a low repetition frequency.

In each track, equally-sized information portions including user data and error correction coding are written. These data portions are symmetrically disposed on each side of a 32 bit address portion aligned with the center of the tape. The four LSB's of each track address are written again at the beginning and end of each track to be used additionally for the centering servo described below.

The servo information used in the first embodiment of the invention includes the series of single frequency bursts for tape speed linear control followed by the four LSB's of the address which servo the centering of the rotary drum with respect to a track on the tape.

The recording format employed to achieve the preferred track information structure is a matter of design consideration; for example, a longitudinal mode can be used. It should be evident that slant azimuth recording can be used if an even number of read/write transducer pairs are used on the rotary transducer assembly this will reduce track-to-track interference. However, if slant azimuth recording is employed, the wavelengths for the servo and track address information must be sufficiently long to prevent the recording azimuth from adversely affecting the signal level.

TAPE DRIVE SERVO MECHANISMS (FIRST EMBODIMENT)

There are two main servo mechanisms in the tape drive of this invention: a tape speed servo and a tilt (centering) servo.

The purpose of the tape speed servo is to keep the tape at a nominal speed when writing and to advance the tape exactly a predetermined number of tracks during each rotation of the rotary transducer assembly when reading. The tilt servo is provided to place the center of the rotary transducer mechanism at a position with respect to the tape centerline which will maintain the transducers in alignment with arcuate tracks written on the tape. These servo mechanisms compensate for tape wander in the cartridge, mechanical positioning of the cartridge, and for interchange between drives of different speeds and/or number of heads.

Both servos employ low frequency servo information detected at the beginning and end of each scan. The tilt servo also employs the LSB's at the beginning and end of each track for gross track registration. Both servos operate on the assumption that the scanning speed is some known constant value.

The low frequency servo information serves to indicate the alignment of the scanning path traced by transducers with respect to adjacent tracks. This is illustrated in FIGS. 11A–11C and in FIG. 12. In FIGS. 11A–11C, a servo transducer 300 scans a tape 301 in a counterclockwise scanning direction while the tape is moving from right to left as indicated. Previously written to the tape is a sequence of arcuately-shaped tracks which are scanned from the upper edge 302 to the lower edge 303 of the tape 301. Preferably, the servo transducer 300 passes over two adjacent tracks with each scan, and is considered to be centered when it spans the tracks from midpoint to midpoint. For example, consider the two adjacent tracks 305 and 306. During one scan, the servo transducer 300 should span equal portions of the tracks 305 and 306 in order to ensure alignment of read and write heads with the tracks which they scan. The read and write heads are offset radially from the servo head 300 by arcuate and radial distances which ensure that they will be centered on a track so long as the servo transducer 300 is centered between two tracks. In FIG. 11A, the servo transducer 300 is centered between the adjacent tracks 305 and 306 at the beginning of a scan. Thus, the low frequency servo bursts at the beginning of those tracks indicated by reference numerals 305a and 306a, respectively, will provide signal responses of equal magnitude when scanned by the servo transducer 300. In this regard, equal magnitudes of the two low frequency servo bursts indicates correct positioning of the servo transducer and, by implication, of the write and read transducers. The alignment of the transducers can be measured again at the end of the scan when the servo transducer 300 encounters the end-of-scan servo bursts 305b and 306b, respectively.

As disclosed previously, the servo bursts of any two adjacent tracks have different frequencies. Therefore, a position error signal can be developed by simply filtering the readback signal obtained from the servo transducer and subtracting the magnitudes of the separated signals. If the servo transducer spans equal portions of adjacent tracks, the magnitudes will be equal and the magnitude of the difference will be 0. If the tape is moving too fast, the readback signal generated b the servo transducer 300 in response to the servo bursts will show a greater contribution and higher magnitude from the trailing track. This is shown in FIG. 11B where the transducer 300 spans more of the track 306 than the track 305. Subtraction of the magnitudes will provide a position error signal with a non-zero magnitude and a sign corresponding to the trailing track. This may be referred to as a "positive" difference. Alternatively, if the tape is moving at a speed somewhat slower than that at which it was recorded, the position error signal will have a non-zero magnitude with a negative sign indicating that the transducer 300 is spanning a greater portion of the leading track than the trailing track.

Figure 12:
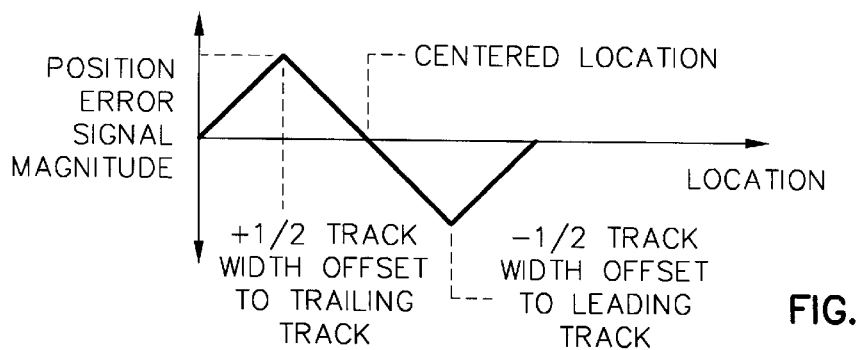
FIG. 12 shows a position error signal read back by a servo transducer on the rotary head assembly of FIG. 2.

The position error signal magnitude is illustrated in FIG. 12 in triangular form. Maximum misalignment of the servo transducer would result in detection of only a single frequency servo signal, which would maximize the error signal and indicate maximum offset of one-half of a track width. The sign of the magnitude indicates offset to the trailing track (a positive sign) or to the leading track (a negative sign). When the servo transducer is centered between two tracks, the signal magnitude of FIG. 12 falls to 0. This signal is used for control of tape speed and also as a fine alignment signal for the tilt servo.

Figure 13:
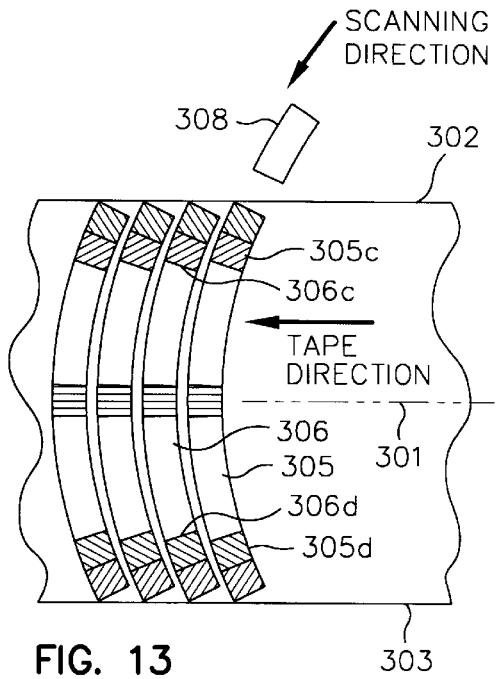
FIG. 13 illustrates the use of a read transducer to read back servo information from arcuate tracks according to the first embodiment of the invention.

As FIG. 13 shows, the LSB's of the tracks provide a coarse alignment signal which can be used in combination with the fine alignment signal of FIG. 12. In FIG. 13, the address LSB's of the tracks 305 and 306 are, respectively, in fields 305c and 306c at the beginnings of those and in fields 305d and 306d at their ends. Now, after the servo transducer 300 has scanned the tracks 305 and 306, and the transducer drum has revolved in the scanning direction far enough to place the read transducer 308 at the upper edge 302 of the tape 301, the readback signal i from the read transducer 308 can be stored so that the LSB's at the beginning and end of the read transducer scan can be compared. If equal, the transducer drum is aligned with the tracks. If unequal, both the direction and magnitude of misalignment can be determined simply by taking the difference between the beginning and ending LSB magnitudes. Relatedly, assume that the track addresses increase in magnitude as the tracks are written, implying that the magnitude of the address LSB's for track 306 is greater than for track 305. Assume that the tape 301 is advancing at a speed equal to that at which it was written. Assume further that the position error signal indicates optimum fine alignment of the servo transducer. In these circumstances, if the read transducer 308 scans the track 305 from beginning to end and the magnitude of the LSB difference is 0, no alignment is required.

Assume next that the tape 301 is advancing at a speed greater than that at which it was written so that the read transducer 308 reads LSB's at the beginning of track 305 and at the end of track 306. In this case, the difference magnitude will be non-zero and positive, indicating misalignment in the direction of the trailing track. Similarly, if the LSB magnitude is non-zero and negative, the indication is that the tape is moving at a speed slower than that at which it was written.

Figure 14A:
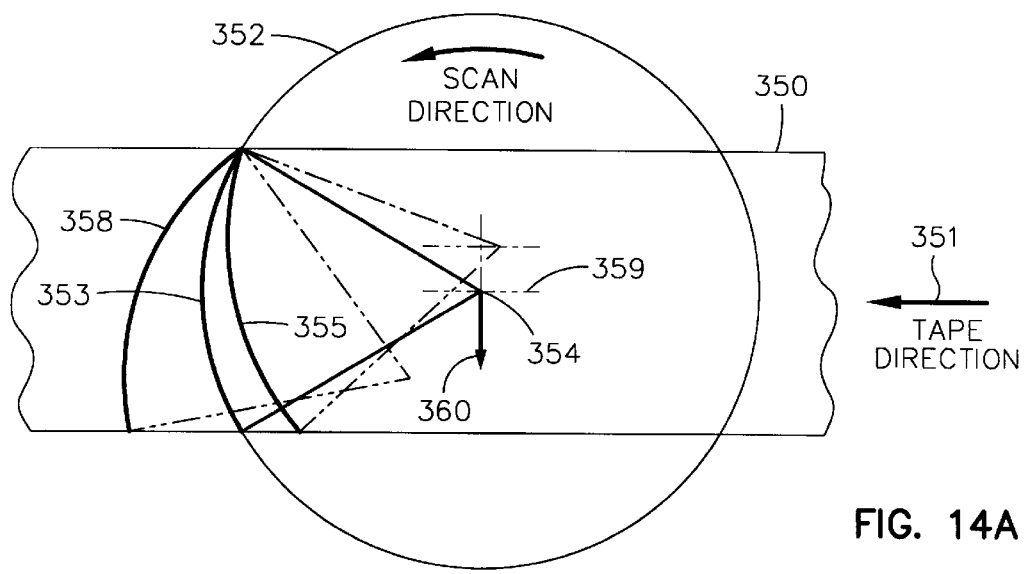
FIGS. 14A and 14B illustrate tilt servoing of the rotary head assembly according to the invention.
Figure 14B:
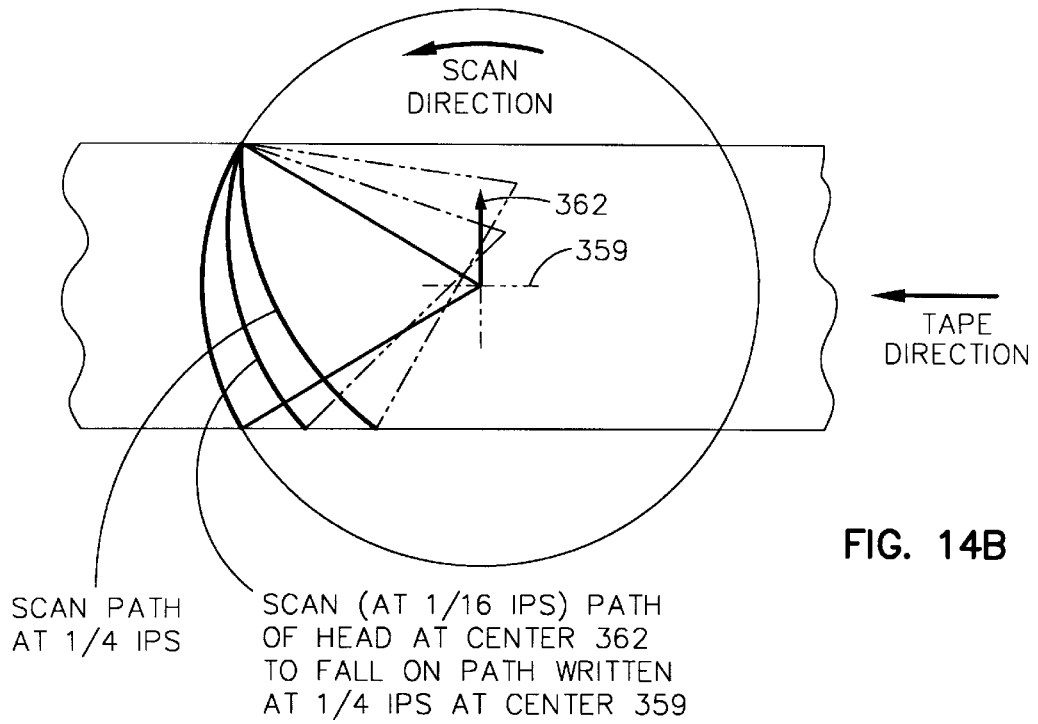

FIGS. 14A and 14B illustrate how the tilt servo operates in response to the low frequency servo and LSB signals in the arcuate tracks to adjust the position of the axis of scanning rotation when the apparent speed of a tape at readback does not equal its speed at record. This would occur, for example, if a tape moving at one speed were written by the transducer architecture of FIG. 7 and read by the same architecture while moving at another speed. The apparent speeds can also differ if differing transducing architectures are used. Again, these Figures assume a known constant scanning speed for the transducers. In FIG. 14A, consider that the tape 350 is moving in the direction indicated by the arrow 351 while servo and read transducers are scanning in the counterclockwise direction substantially on the circular path 352 about the scan center 354. If the tape 350 were stationary, while being written, each track would comprise an arcuate section such as the section 353. However, the movement of the tape tends to "drag" the end of a track beyond its beginning in the direction of the tape motion. Thus, if the tape is moving at a first speed, say ¹⁄₁₆ inches per second, the write transducer would lay down a track corresponding to the track 355. If upon playback, the tape is advanced at the speed at which it was written, the servo and read transducers would trace out arcuate paths across the tape corresponding to the written track 355. If, however, the tape is advanced at a higher speed, say, for example, ¼ inches per second, the low frequency and LSB servo magnitudes will indicate that the scanning path is misaligned in the positive direction because the increased speed of the tape will cause the transducers to scan toward the trailing tracks. Misalignment can be corrected in this instance by moving the center of scan revolution to a location which will decrease the angle at which the transducers intercept the upper edge of the tape 350 to an angle which will trace a scan path that will fall on the slower-recorded tracks at the higher playback speed. This path is parallel to the path indicated by reference numeral 358. Hence, the parallel path can be traced by moving the center of scan revolution toward the lower edge of the tape 350 to the locus of the center 359. This is shown in FIG. 14A where the center of scan revolution is moved by tilting the rotary transducer assembly so that the center of revolution moves from 354 to 360.

FIG. 14B illustrates adjustment of the rotary transducer assembly to read tracks on a tape when the tracks were written at a higher speed than that at which the tape is being played back. In this case, a upward adjustment of the center of scanning revolution from the midline lacus 359 to the location indicated by reference numeral 362 is required.

It should be evident that displacement of the center line of a written tape from the center of scanning rotation will also produce fine adjustment and LSB differences which indicate misalignment between the transducer architecture and track configuration. For example, if a tape is written in one tape drive and read in another, manufacturing tolerance variances between the drives can result in variation f the tape center line in the record/readback locations of the two drives. If the variation is great enough, fine adjustment signals and possibly LSB differences would be generated with each revolution of the transducer drum, indicating the need to align the center of scanning rotation with the centerline of the tape. In this case, center-to-centerline alignment is accomplished, as explained previously, by pivoting the rotating portion of the rotary head assembly.

Figure 15A:
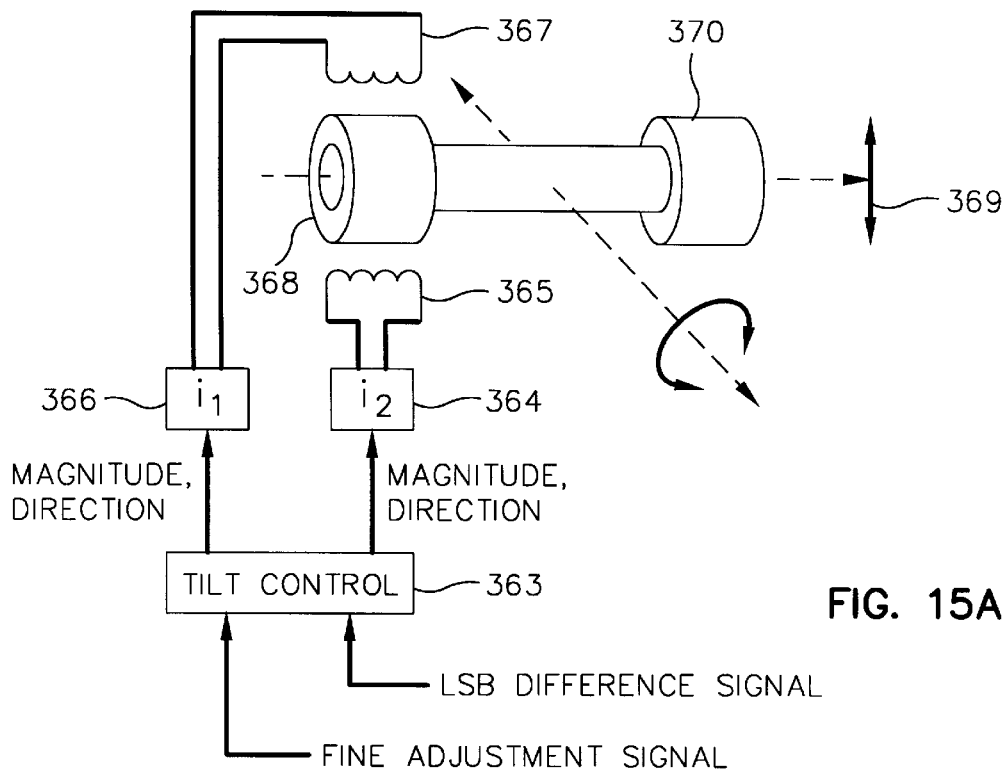
FIGS. 15A and 15B illustrate actuator mechanisms for tilt servoing according to the invention.
Figure 15B:
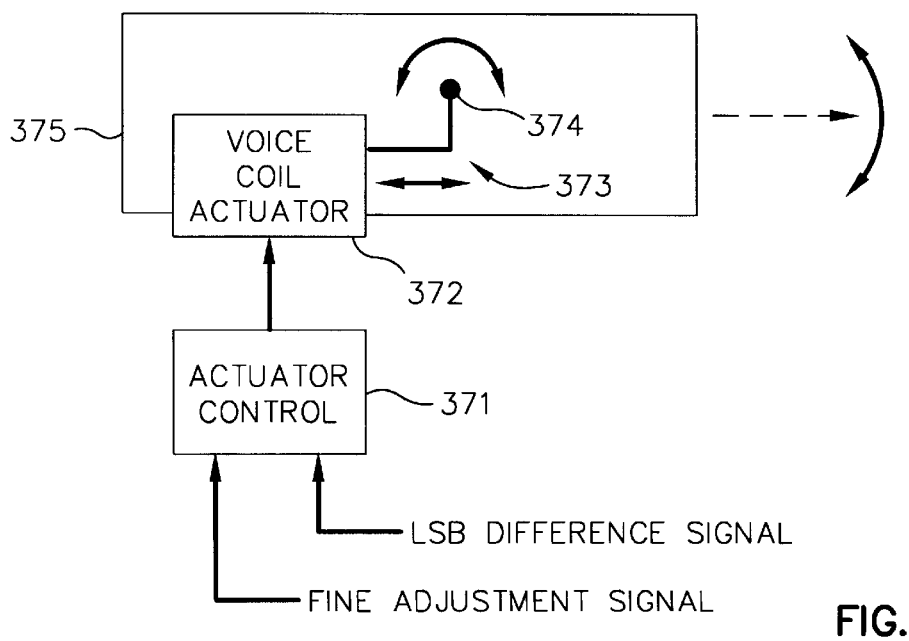

Tilt actuation of the rotary head assembly is a significant key in all embodiments of the invention to achieving the objective of using servo information in the arcuate tracks to position the center of scanning revolution of the transducer drum in order to align the transducers on the drum with the tracks on the tape. Alternative embodiments of tilt actuation are illustrated in FIGS. 15A and 15B. In FIG. 15A, the sign and magnitude of the fine adjustment and the LSB difference are provided to a tilt control circuit 363 which converts the signals into a pair of current magnitude and direction signals. A first current magnitude and direction signal is provided to a current generator 364 which generates a current having the magnitude and direction indicated by its respective input signal. The current is coupled to a first tilt adjustment winding 365 corresponding to the adjustment winding described above on the rear inside surface of the shroud enclosing the rotary transducer assembly illustrated in FIGS. 1–3. The second current magnitude and direction signal is fed to a second current generator 366 which generates a corresponding current having the magnitude and direction indicated by its input signal. The current produced by the current generator 366 is coupled to an upper adjustment winding 367 which corresponds to the adjustment winding 55 in FIG. 3. The currents produced by the generators 364 and 366 are such to induce magnetic fields in their respective adjustment windings which will act on the positioning piece 368 with a magnitude and direction necessary to adjust the center of scan rotation 369 of the transducer drum 370. Relatedly, an adjustment winding will generate a magnetic field with a strength and polarity determined by the magnitude and direction of the generating current. The field will impinge on the positioning piece, inducing a current in the piece which sets up a magnetic field opposing that of the adjustment winding. This will result in a repulsive force acting between the winding and the positioning piece. At the same time, another repulsive force will act between the positioning piece and the other adjustment winding. The repulsive forces are oppositely directed and their relative strengths will determine how much the positioning piece, shaft, and transducer drum are tilted.

In FIG. 15B, the fine adjustment and LSB difference signals are provided to an actuator control apparatus 371 which produces a voice coil actuator signal suitable to drive a conventional voice coil actuator 372. The voice coil actuator 372 is connected by a pivoted linkage 373 to a pivot pin 374. The pivot pin 374 corresponds to the pivot ball 57 in FIGS. 2 and 3. The voice coil actuator 372 is conventionally operated to move the linkage 373 in a direction appropriate to pivot the rotary transducer 375 by moving bout the pivot ball 374. The amount and direction of adjustment are determined by the magnitudes and signs of the fine adjustment and LSB difference signals.

All of the description to this point is based upon a single rotary transducer assembly and a single tape centerline. This is not intended to deter use of the invention in applications where, for example, multiple rotary transducer assemblies would be employed to write and read multiple parallel arcuate sequences on a single tape of selected width. In this case, each sequence would be located in a longitudinally-extending region with its own centerline.

TAPE DRIVE ELECTRONICS (FIRST EMBODIMENT)

Figure 16:
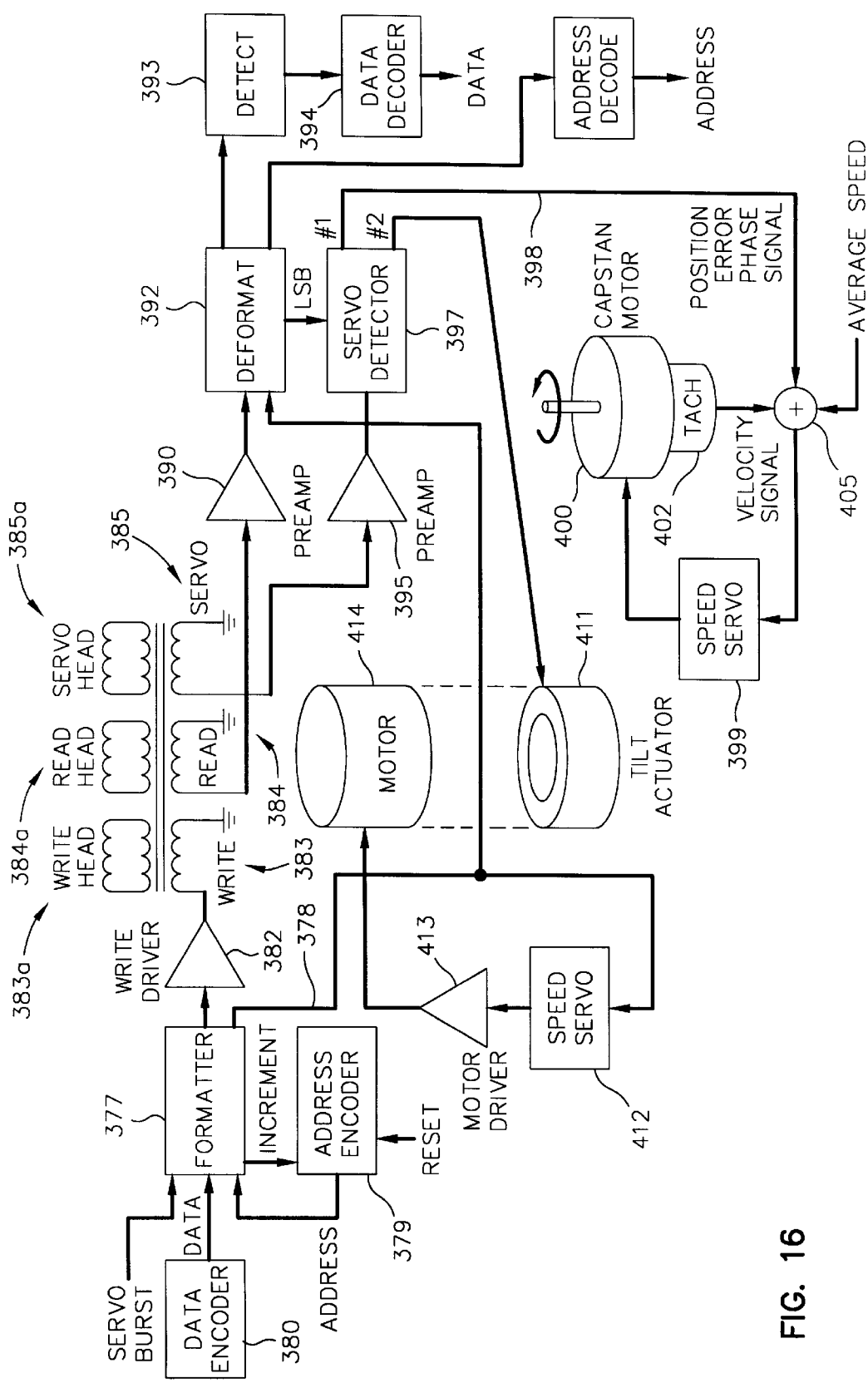
FIG. 16 is a block diagram illustrating channel and servo components of a tape drive according to the first embodiment of the invention.

FIG. 16 is a block diagram of the electronics necessary to operate the tape drive in record and playback as described above. An information formatter 377 receives servo information, data, and address bits for each track and creates the track format illustrated above in FIG. 10. The formatter 377 produces a clock signal which is output on signal line 378. For each track, an address encoder 379 increments a digitally-formatted address and provides it to the formatter 377. The data are provided from a conventional data encoder 380 and the servo bursts from a servo signal generator (not shown). Formatted track information is provided to a write driver 382 from the formatter 377 and therefrom to a write stator winding 383. Track information is coupled from the write stator winding 383 to a write head 383a as described above. Data are read from written tracks by a read head 384a and coupled to the read stator winding 384. A servo head 385a couples track information to a servo stator winding 385 as described above. The read stator winding 384 is connected through a preamp 390 to a data deformatter 392 which provides the LSB's at the beginning and end of each read head scan. The data channel includes a detector 393 receiving the output of the deformatter 392 and feeding the input of a data decoder 394. Decoded data are provided at the output of the data decoder 394.

The servo stator 385 drives a preamplifier 395 which amplifies the readback signal generated by the servo head 385a and provides it to a serve detector 397. The servo detector 397 also receives the LSB's obtained from the beginning and end of each track by the read head. The servo detector 397 includes conventional servo circuitry for generating the position error (fine-adjustment) signal illustrated in FIG. 12. The position error signal is fed on signal line 398 to drive a capstan motor speed servo 399. The servo 399 sets the speed of a capstan motor 400 that imparts motion to a tape as described above. A tachometer 402 detects the speed of the capstan motor 400 and provides a velocity signal to a summation circuit 405. During write mode, this tachometer signal is the only input to the summing junction. The following describes the additional input to the summing junction while in read mode, which input locks the servo to the tape signal. The summation circuit 405 combines the velocity signal, position error signal, and an average speed signal (whose source is not illustrated) and generates from this combination a speed control signal provided to the servo. Thus, fine adjustment of alignment between the rotary transducer assembly and the arcuate tracks on a tape is provided by adjustment of the tape speed through the capstan motor.

The servo detector 397 also includes the appropriate digital circuitry to subtract track LSB's and provide a magnitude and difference signal on line 410 to a tilt actuator which pivots the rotary transducer assembly as required for gross track alignment.

The head assembly motor is rotated at a speed appropriate for a selected data format as indicated by the clock signal repetition rate on signal line 378. Relatedly, a particular track format including tape speed is selected, with the speed being indicated on signal line 378. The speed signal is provided to a speed servo 412 and therethrough to a motor drive 413 which sets the rotational speed of the rotary head assembly 414. Thus, for a particular tape speed, the motor 414 is given a velocity which ensures that the transducers will undergo one complete revolution while the tape moves a distance equal to one track width at the selected tape speed for a single write head, or integral number of whole track widths for multiple write heads.

Figure 17:
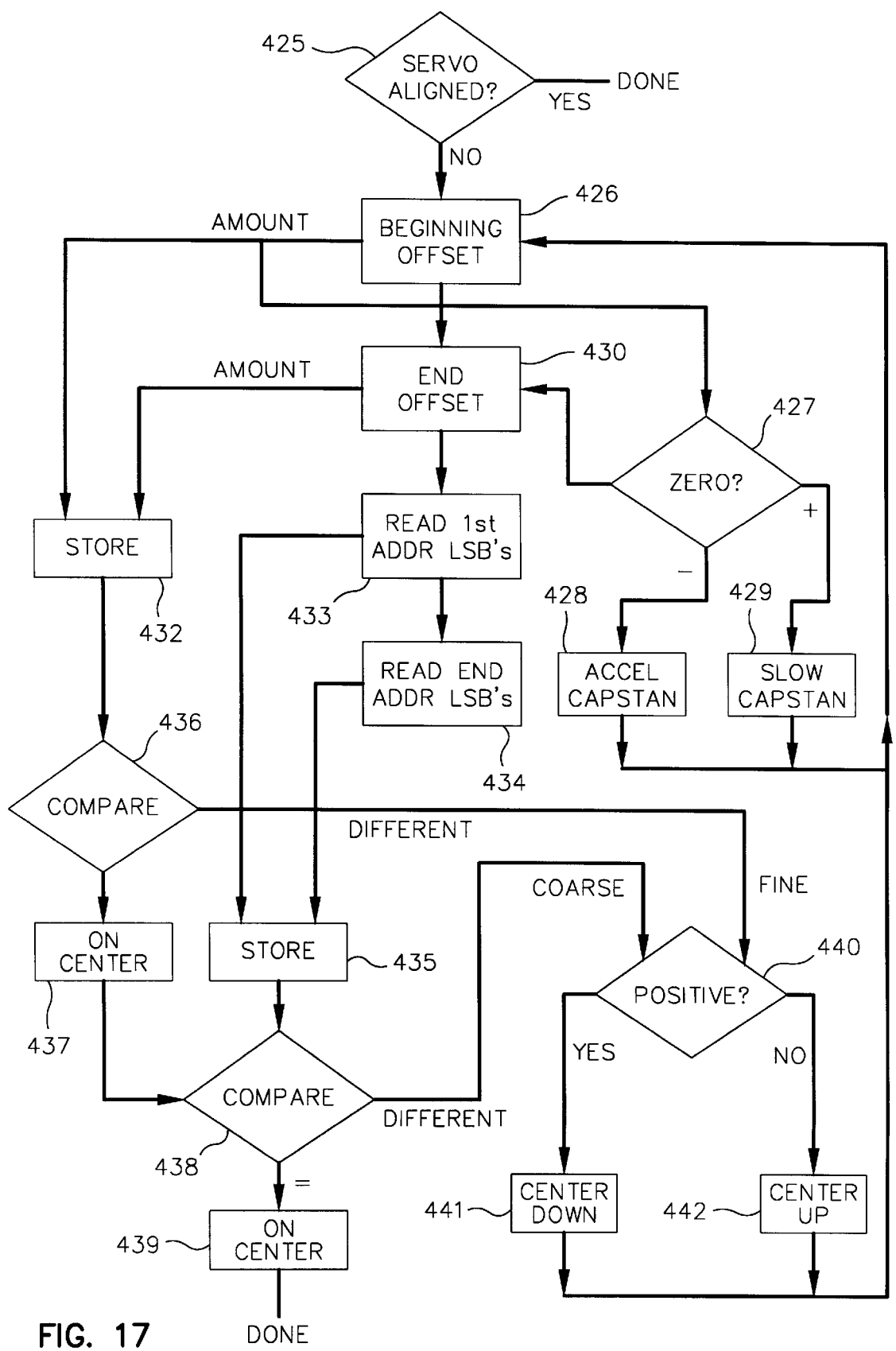
FIG. 17 is a flow diagram illustrating a servo alignment procedure according to the first embodiment of the invention.

FIG. 17 is a flow diagram illustrating the servo procedures for capstan motor speed adjustment and tilt adjustment of the first embodiment rotary head assembly. Initially, track/transducer misalignment is indicated in step 425 in response to a periodic alignment prompt. The prompt can come, for example, from a maintenance program installed in the tape drive. In response to the prompt, the negative exit is taken from step 425 and the servo transducer offset with respect to two adjoining tracks is measured by detection and subtraction of the servo bursts at the beginning of the tracks in step 426. The amount of the offset corresponds to the misalignment of the servo transducer with respect to the midpoints of the adjacent tracks. The amount results from subtracting the magnitude of the servo burst detected at the beginning of one track from that detected at the beginning of the adjacent track, and the amount is fed to decision 427. If the amount is non-zero, and positive, a slow capstan signal is generated at 429 to slow the capstan motor. If non-zero and negative, an accelerate capstan signal is generated at 428 to increase the speed of the capstan motor. If the magnitudes are equal, an offset measurement between the adjacent tracks at the end of the servo transducer scan is enabled at step 430. The beginning and end offset measurements made at steps 426 and 430 are stored at 432 to await the reading of the address LSB's at the beginning and end of the track scanned by the read head in steps 433 and 4343. The address LSB values are stored at 435. For the tilt servo procedure, fine and coarse values are developed from, respectively, the stored offset measurements and the address LSB's. In this regard, the offset measurements are compared at 436 and if equal, an on center signal is generated at 437 and fed to decision 438. Decision 438 also receives the address LSB's stored at 435 and compares those values. If the offset measurements and the address LSB's are equal, the rotary head assembly is on center, no adjustment is made to its center of scan and the procedure is exited through 439. If at least one of the comparisons 436 and 438 shows a difference between compared values, the sign and magnitude of the difference is provided to the decision 440.

If the coarse and fine signals indicate that the scan path is intercepting trailing tracks at the end of a scan, the servo mechanism tilts the rotary had assembly to move the scan center down as illustrated in FIG. 14A; otherwise, the rotary head assembly is tilted to move the scan center up as illustrated in FIG. 14B.

ARCUATE SCANNING TAPE DRIVE (SECOND EMBODIMENT)

A second embodiment of the arcuate scanning tape drive is now described. In the second embodiment, the transducer architecture and servo information still enable monitoring and adjustment of tape speed and scanner position although with forms and formats which differ from those of the first embodiment.

Figure 18:
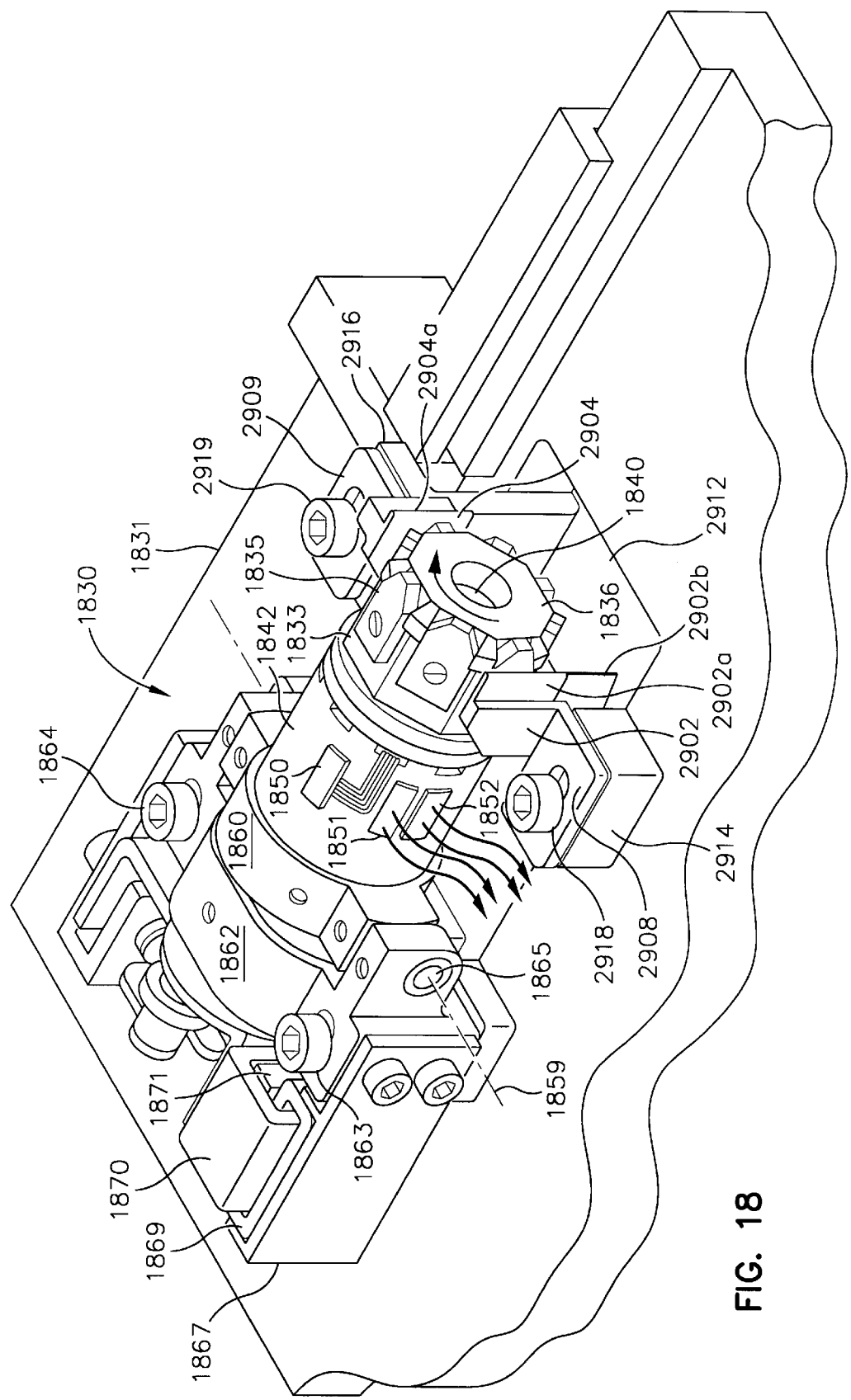
FIG. 18 is perspective view of a rotary head assembly according to a second embodiment of the invention.
Figure 19:
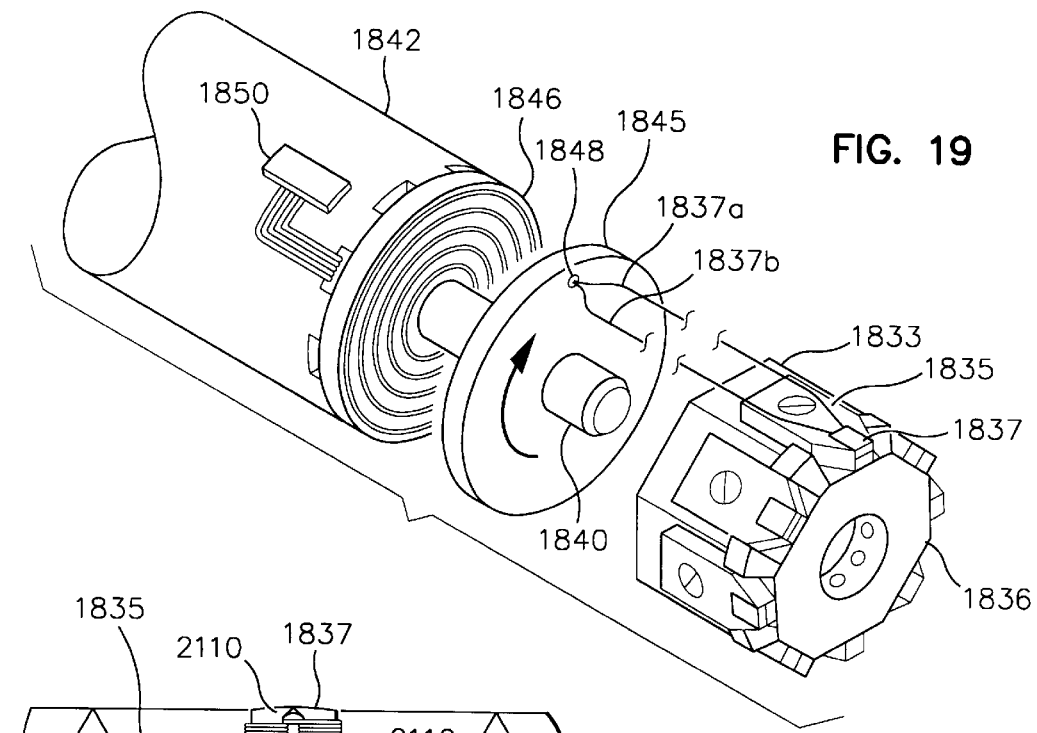
FIG. 19 is a magnified, exploded view of the end of the rotary head assembly of FIG. 18.
Figure 20:
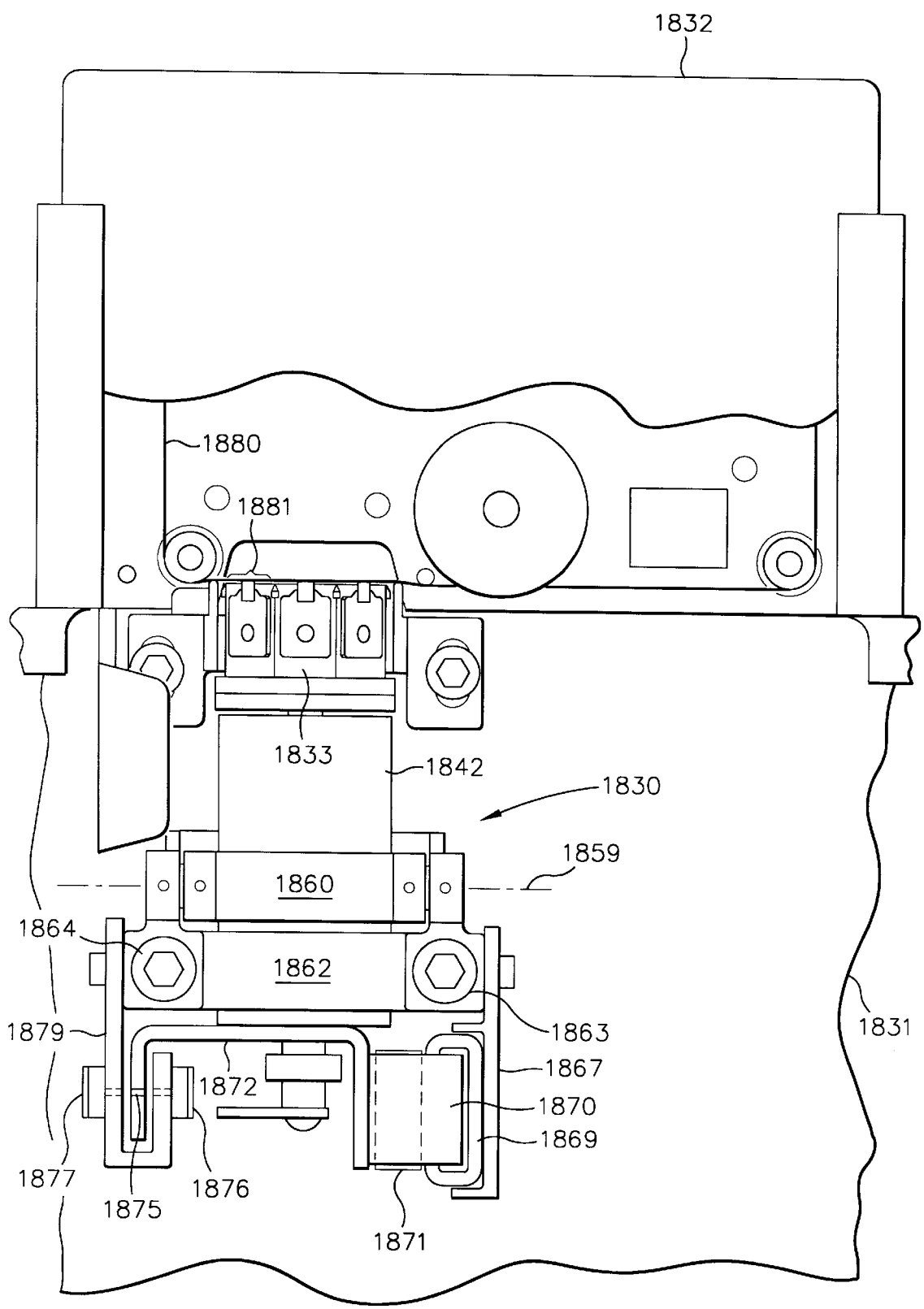
FIG. 20 is a top view of a rotary head assembly showing its engagement with a magnetic tape at a recording location in the second embodiment.

In FIGS. 18–22, the architecture of a rotary head transducer assembly which writes and reads a sequence of arcuate tracks for the second embodiment is illustrated. In the figures, dimensional relationships are exaggerated for the purpose of illustration. With reference now to FIGS. 18–20, a rotary head transducer assembly 1830 is illustrated. The rotary head transducer assembly 1830 is intended to be employed in a miniature tape drive such as that indicated by reference numeral 10 and illustrated in FIG. 1. In the description which follows, the rotary head transducer assembly 1830 is also referred to as a "scanner". The scanner 1830 is mounted on a plate 1831 which may be part of a larger assembly in the miniature tape drive. The plate 1831 provides a single planar surface for supporting the scanner 1830 and a miniature tape cartridge 1832. The scanner 1830 includes a drum 1833 with an end face 1836 at which a plurality of read and write transducers are mounted on support blocks which correspond essentially to the support blocks described above in connection with the first embodiment and illustrated, for example, in FIG. 7. One such support block is indicated in the figures by reference numeral 1835 which has mounted at its forward tip a magnetic transducer 1837. As the figures show, the drum 1833 has the general shape of an octagonal cylinder. The drum 1833 is rotated by a rotatable shaft 1840 which is mounted for rotation in a motor/bearing assembly. The motor/bearing assembly includes a housing 1842 that is essentially cylindrical and encloses a structure (not shown) for rotatably supporting and providing rotational power to the shaft 1840. Details of motor construction and bearing support may be as disclosed above for the first embodiment, or any equivalent thereof. Electrical signals are transferred to and from the transducers on the drum 1833 by a conventional rotary transformer assembly comprising a rotor piece 1845 ("rotor") and a stator piece 1846 ("stator"). The drum 1833 and the rotor 1845 are fixed concentrically to, and rotate with, the shaft 1840. The housing 1842 and stator 1846 are stationary with respect to the shaft 1840. Thus, as the shaft 1840 rotates together with the rotor 1845 and drum 1833, electrical signals are written to and read from arcuate tracks on magnetic tape by means of signal paths which include electromagnetic flux couplings between the rotor 1845 and stator 1846. For example, the transducer 1837 has a typical structure with windings which induce flux across a gap (not shown). The windings transition to signal leads 1837a and 1837b which feed through a small hole 1848 in the back of the rotor 1845 and which are laid in a circular groove (not shown) to form one-half of a winding pair therein; the other half of the winding pair is in the stator 1846. The stator 1846 includes corresponding concentric grooves which are aligned with the concentric grooves on the facing surface of the rotor 1845 and in which wires are wound to form stationary windings which electromagnetically couple with the rotating windings in the grooves of the rotor 1845. The windings in the stator 1846 are connected to wiring pads on the outer surface of the motor/bearing housing 1842 for convenient electrical connection through wiring to circuit elements. One such wiring pad is indicated by reference numeral 1850. Sensors 1851 and 1852 are also mounted to the housing 1842 to provide, respectively, an index signal each time a full rotation of the shaft 1840 is made and a shaft rotational speed signal.

The scanner 1830 is positioned adjacent a recording location where the end face 1836 of the drum 1833 faces a tape to which a sequence of arcuate tracks is to be written. The end face 1836 is adjusted with respect to the edges of the tape by pivoting the housing 1842, and with it the drum 1833 about a pivot axis 1859. For pivoting the motor/bearing assembly, a pivot ring 1860 is fixed to the outer surface of the housing 1842. The pivot ring 1860 is pivotally attached to a frame 1862 by flexible pivots that are compliant in rotation about the pivot axis but stiff in all other axes and in translation. The frame 1862 is secured to the plate 1831 by threaded screws 1863 and 1864. One flexible pivot for rotatably attaching the pivot ring 1860 to the frame 1862 is indicated by 1865 in FIG. 18. As best seen in FIGS. 18 and 20, a bracket 1867 is fixed to the stationary frame 1862 and carries on its rear portion a conventional voice coil 1869 with an open center. A U-shaped bracket 1870 is affixed to the rear end of the motor/bearing housing 1842 by another U-shaped bracket 1872. The U-shaped bracket 1870 has one leg which is received in the center of the voice coil 1869 and another leg to which a permanent magnet 1871 is attached. Current through the voice coil 1869 sets up a magnetic field in its open center which is conducted in the U-shaped bracket 1870 to the permanent magnet 1871. As will be appreciated by those skilled in the art, an electromotive force will be exerted on the U-shaped bracket 1870 and its attached magnet 1871 having a magnitude determined by the magnitude of the field induced in the coil 1869. The scanner 1830 will be pivoted on the pivot axis 1859 by an amount which depends upon the relative strengths of the voice coil 1869 field and the field of the permanent magnet 1871, thereby selectively positioning the axis of rotation on which the shaft 1840 and the drum 1833 rotate.

The amount by which the scanner 1830 has been tilted is detected by a standard LED/bicell arrangement. In this regard, the U-shaped bracket 1872 which is fixed to the rear of the motor/bearing housing 1842 has a small hole 1875 bored through one of its legs. This leg and the hole 1875 move within the two legs of a U-shaped bracket 1879 which is stationary, being fixed to the frame 1862. The LED 1876 is fixed to one leg of the U-shaped bracket 1879. A bicell 1877 is mounted to the other leg of the bracket 1879 and, when the LED 1876 is on, is illuminated through aligned holes in the legs of the bracket 1879. The hole 1875 in the bracket 1872 provides a variable light transmission path between the LED 1876 and the bicell 1877 whose variance is measured by the bicell 1877. The signal produced by the bicell 1877 therefore is indicative of an amount by which the scanner 1830 has been tilted.

The scanner 1830 is positioned so that its end face 1836 faces a tape 1880 within the a cartridge 1832 when the cartridge has been transported to the position illustrated in FIG. 20. With reference to FIG. 20, in an operating arcuate scanning tape drive, the tape 1880 moves from right to left past the recording location 1881 while the scarmer 1830 is operated to rotate the head 1833 in a counterclockwise direction as indicated by the arrows in FIGS. 18 and 19.

Figure 21:
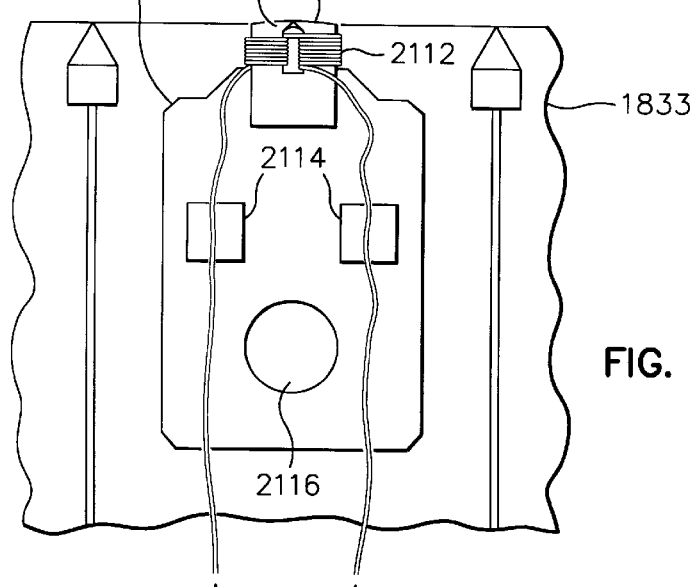
FIG. 21 is a magnified view of a portion of the rotary head assembly of the second embodiment showing a mounted transducer.
Figure 22:
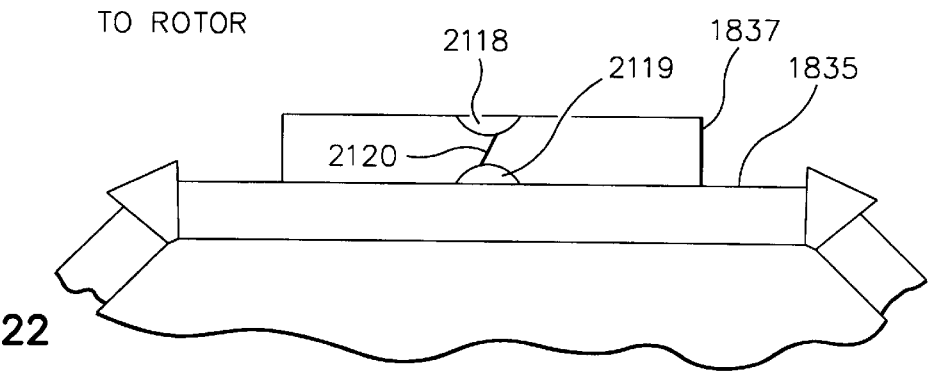
FIG. 22 is an end view of the transducer illustrated in FIG. 21.
Figure 23:
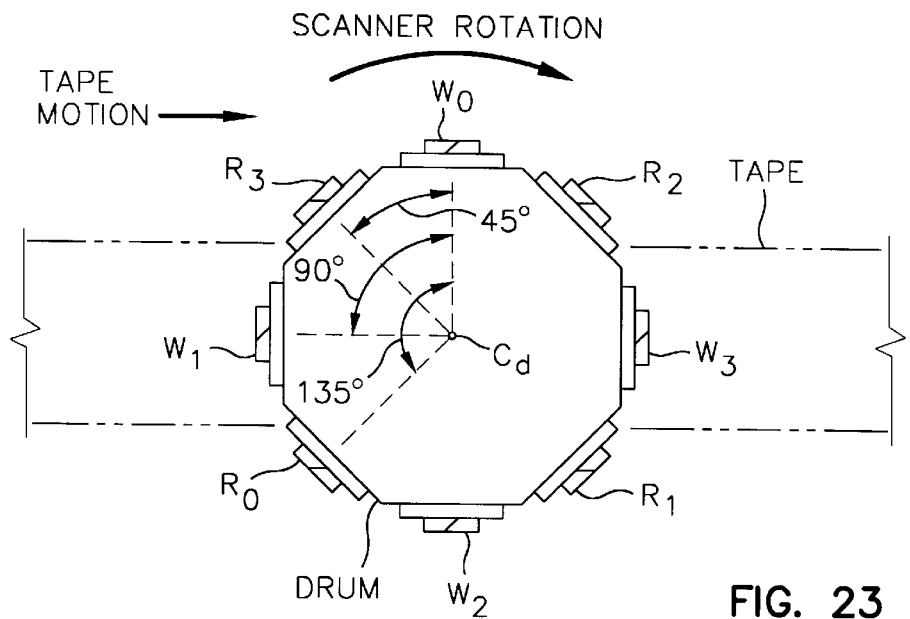
FIG. 23 is a schematic drawing representing geometric relationships of various components of the rotary head assembly of FIG. 18.

Refer now to FIGS. 21–23 for an understanding of geometrical relationships between the read and write transducers mounted on the drum 1833 of FIG. 18. FIGS. 21 and 22 are enlarged partial side elevation and end views of a portion of the drum 1833 showing how one transducer is mounted thereon with the understanding that neither the absolute dimensions nor the scale of the drawings are to scale. The transducer illustrated in FIGS. 21 and 22 is indicated by reference 1837 and corresponds to the identically-referenced transducer in FIGS. 18–20. Similarly, transducer support 1835 corresponds to the identical part in FIGS. 18–20. The transducer 1837 includes a ferrite core piece 2110 on which a conductive filament 2112 is wound and terminated at pads 2114 for connection to a rotor winding. The transducer support 1835 is fastened to the drum 1833 at 2116. As best seen in FIG. 22, the top end of the transducer 1837 has an essentially elongate rectangular profile substantially at the center of which is a gap 2120 extending between two trimming cavities 2118 and 2119.

Figure 24:
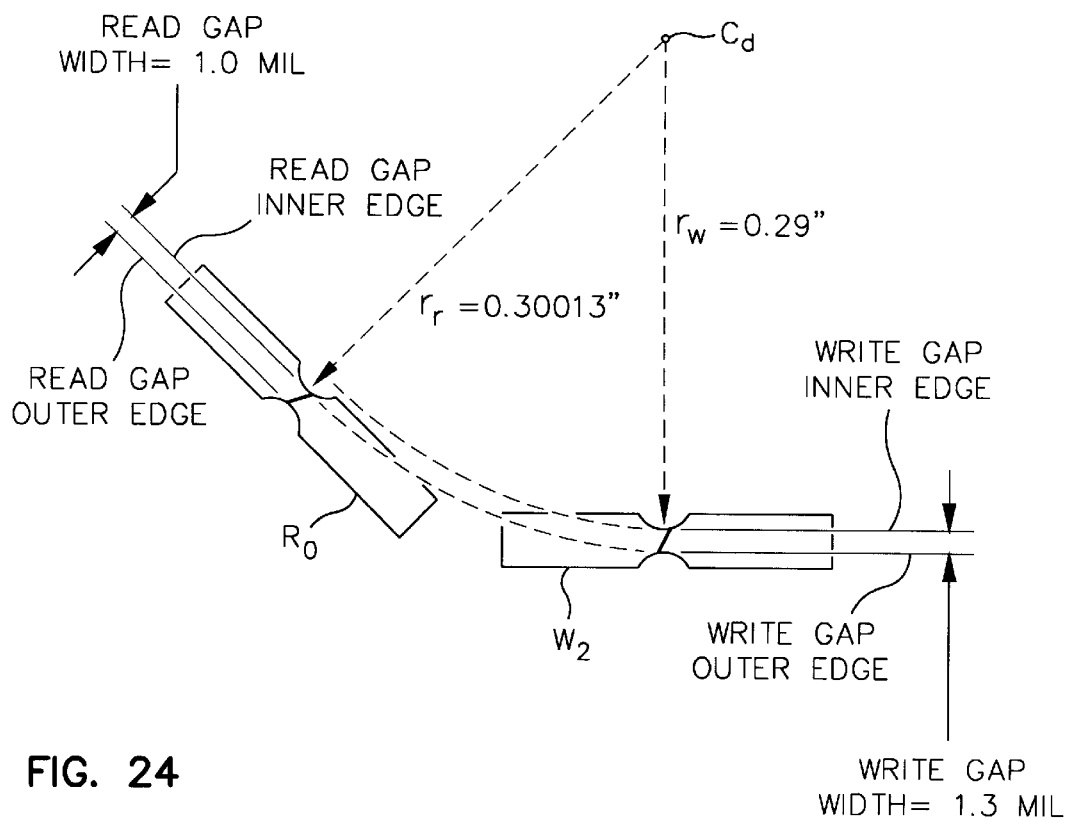
FIG. 24 is a plot showing the radial relationship of the read and write transducers on the rotary head assembly of FIG. 8.

The preferred transducing architecture for the second embodiment is illustrated in FIGS. 23 and 24. FIG. 23 is a view through a tape at the reading location to the end of the scanner drum identified by reference numeral 1833 in FIGS. 18–20. As best seen in FIG. 23, there are eight transducers mounted with their active surfaces extending slightly through a plane at the endface of the drum. Four transducers are designated as write transducers and are identified as $W_0$, $W_1$, $W_2$ and $W_3$. In addition, there are four read transducers identified as $R_0$, $R_1$, $R_2$ and $R_3$. Identical subscripts identify write/read transducer pairs in which the track written by transducer $W_1$ is later read by transducer $R_1$. Further, the write transducers are accurately spaced on the drum by 90° in the order in which they write tracks on the tape, which is $W_0$, $W_1$, $W_2$ and $W_3$. Similarly, the read transducers are spaced from each other by 90°, but are spaced from adjacent write transducers by 45°. Further, read transducer $R_1$ is displaced by 135° in the direction opposite the scanner rotation direction from write transducer $W_1$.

As the sequence of write (or read) transducers is followed, the gap orientation alternately reverses. In this regard, the gap on transducer $W_0$, indicated by the slanted stripe, has a first azimuthal orientation which, in FIG. 23, is represented as the clockwise (CW) orientation. The next adjacent write transducer $W_1$, however, has a CCW as azimuthal orientation. In fact, beginning with write transducer $W_0$, the azimuthal orientation of the write transducers alternates as follows: CW, CCW, CW, CCW. As those skilled in the art will appreciate, the alternating azimuthal orientation of the write transducers will result in alternating azimuthal orientation of written tracks. Inspection of FIG. 23 will show that the azimuthal orientation of the read transducer gaps sequences in the same manner as the write transducers.

Refer now to FIG. 24 for an understanding of an important locational relationship between the read and write transducers of FIG. 23. In this regard, with respect to a dynamic center ($C_d$) of rotation of the drum shown in the figures, the gaps in the read and write transducers are positioned so that the inner edges of all write transducer gaps are located at the same radial distance ($r_w$), while the outer edges of the write transducer gaps and the inner edges of the read transducer gaps are located on a circle of radius ($r_r$) that is greater than the radius $r_w$. In the second embodiment, the width of the gaps in the write transducers is equal to or greater than the corresponding widths in the read transducers. However, the inventors contemplate that the read transducer gaps may also be slightly wider than the write transducer gaps without affecting operation of the invention.

Assume now that the relationship shown in FIG. 23 between the interface of the scanner drum and the tape characterizes the head/tape interface in the miniature tape drive 70 of FIG. 1. In this example, quarter inch magnetic tape is used having a nominal width 0.247 inches. assume that write transducer gap width is nominally 1300 microinches, read transducer gap width is nominally 1000 microinches, the radial distance from the dynamic center of rotation of the drum to the outer edges of the write gaps and to the inner edges of the read gaps is 0.3 inches. Since the read transducers are mounted outboard of the write transducers with respect to the dynamic center of rotation of the scanner drum, the read transducers trace an arc which is precisely 0.001 inches greater than the radius of the arc traced by the write transducers. The sequence traced across the tape from edge to edge when the scanner rotates in the direction indicated in FIG. 23 is: $W_0$, $R_3$, $W_1$, $R_0$, $W_2$, $R_1$, $W_3$, $R_2$.

As thus described, when the tape speed is matched to an appropriate rotational velocity of the drum, the write transducers, when energized, will trace a sequence of contiguous recorded arcuate tracks with alternating azimuthal orientation. Preferably, for the eight-head configuration shown in FIG. 23 and the dimensions given above, the scanner rotates at 7500 rpm while the tape advances at 0.25 ips.

Figure 25A:
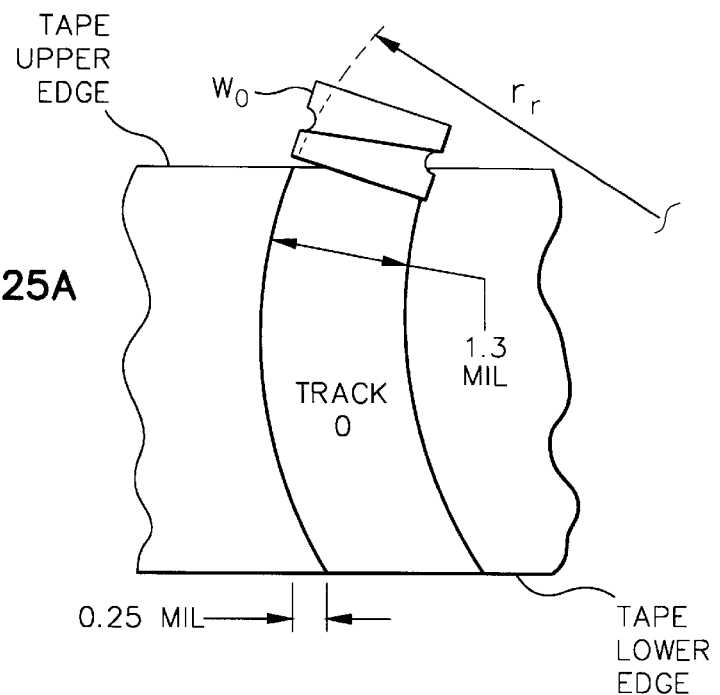
FIGS. 25A–25C are schematic diagrams illustrating how arcuate tracks are written on a tape according to the second embodiment.
Figure 25B:
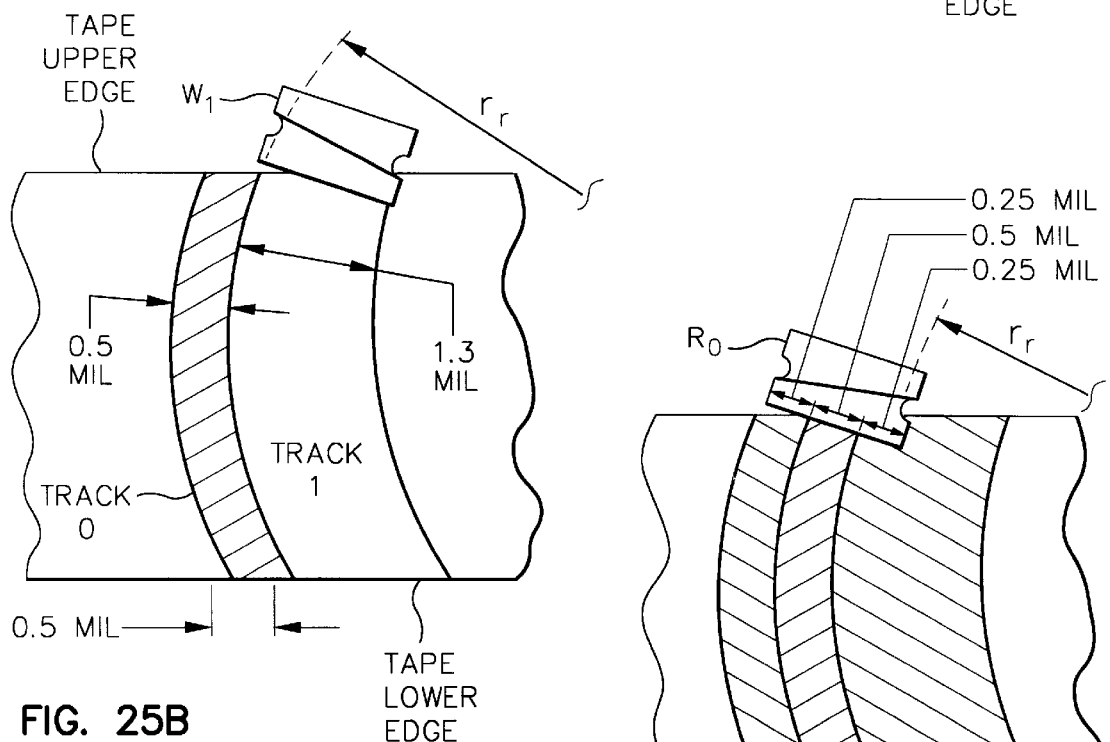
Figure 25C:
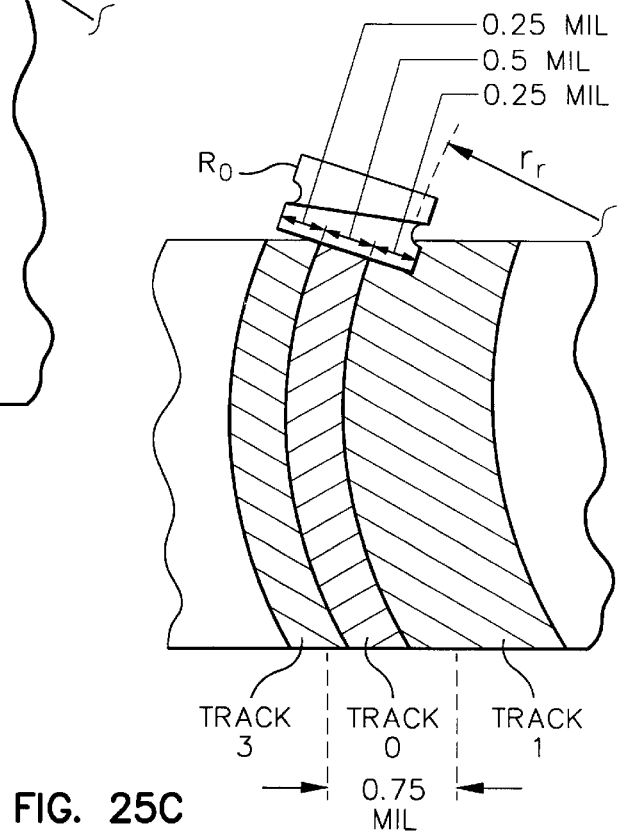

With these preconditions and with reference to FIGS. 25A–25C, the recording of information by a scanner with the head architecture illustrated in FIGS. 23 and 24 can be understood. The example only describes how data is recorded. Considerations of data validation by, for example, read-after-write are omitted only to ensure clarity of the explanation. The following sequence occurs during one rotation of the scanner:

1. As illustrated in FIG. 25A, the outer edge of the gap on write transducer $W_0$ follows an arc having the radius $r_r$. As the tape moves (right to left) and the scanner rotates (CCW) write transducer $W_0$ writes track 0 consisting of a 1.3 mil-wide band of information having a CW azimuthal orientation.
2. When write transducer $W_0$ reaches the lower edge of the tape, the scanner will have rotated by 45° and the tape will have moved 250 microinches, and read transducer $R_3$ with a CCW azimuth will engage the upper edge of the tape. The remainder of this step is ignored in this discussion.
3. As shown in FIG. 25B, when the scanner has rotated by another 45°, the tape will have moved 500 microinches, bringing the gap of write transducer $W_1$ into contact with the upper edge of tape. At this point, write transducer $W_1$ begins to write track 1 having a CCW azimuthal orientation opposite that of track 0, and overlapping track 0 by 800 microinches. This leaves no gap between track 0 and track 1 and trims track 0 to a width of 500 microinches.
4. In FIG. 25C, 750 microinches of the tape have moved from right to left past the arc of radius $r_r$ and the transducer $R_0$ engages the upper edge of the tape. As FIG. 25C illustrates, the inner edge of the gap in read transducer $R_0$ is at radial location $r_r$ with respect to the center of the scanner. Recall that the read vtransducer gap is 1.0 mil wide; thus, the center of read transducer $R_0$ lies over the center of trimmed track 0 so that the central 500 microinches of the gap lies over track 0, while 250 microinches on each end of the gap overlapping adjacent tracks. Now, as read transducer $R_0$ traces the arc of track 0, it will respond only to the azimuthal orientation of the information in that track, ignoring the oppositely-oriented information in the adjacent tracks.

With this explanation of how tracks are recorded and read according to the second embodiment, a description will now be given of how servo information is recorded in those tracks. As inspection of FIGS. 26A–26D will show, servo burst segments are recorded in servo burst regions adjacent to the tape upper edge and the tape lower edge by alternating write transducers. These are denoted, respectively, as the first and second servo regions. In the figures, the servo bursts are written by write transducers $W_0$ and $W_2$ (hereinafter "even" transducers) but not by write transducers $W_1$ and $W_3$ (hereinafter "odd" transducers). The servo bursts are written by turning on the even write transducers earlier than the odd write transducers after passing the upper tape edge and by turning off the odd write transducers earlier than the even transducers as the lower tape edge is approached. FIGS. 26A–26D illustrate an unrecorded guard band between each tape edge and an adjacent servo region; this band is optional and may be used or not as circumstances require.

Figure 26A:
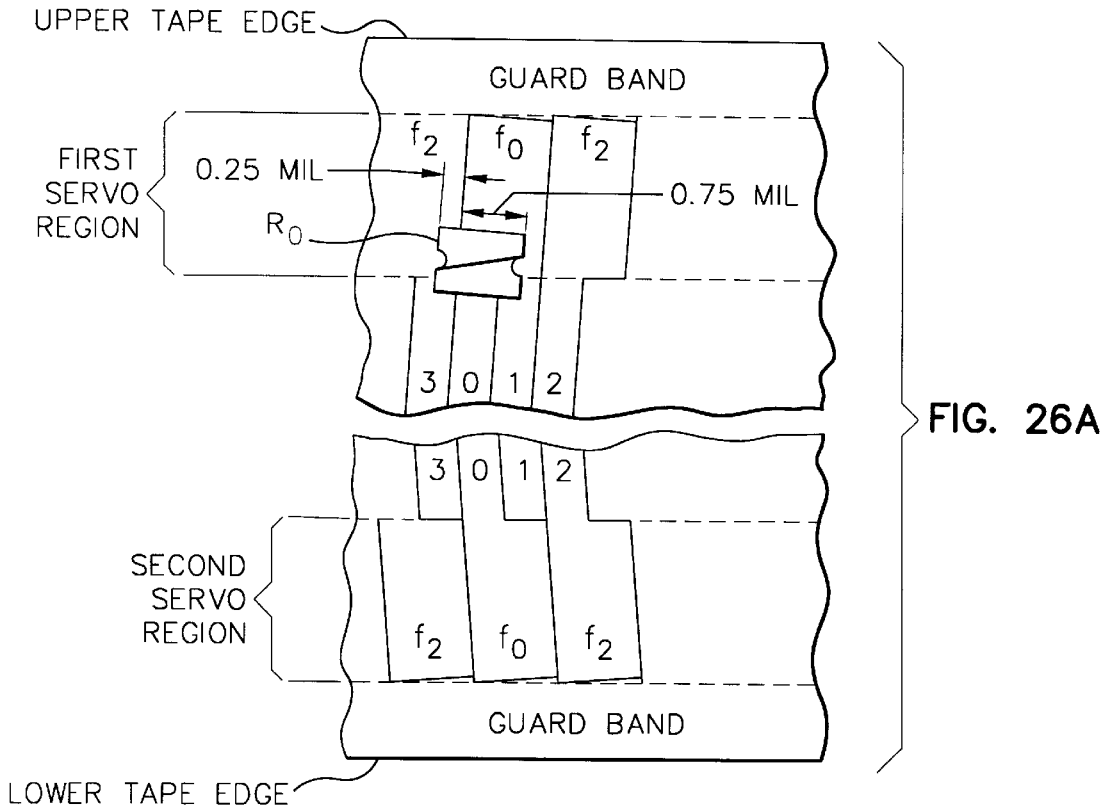
FIGS. 26A–26D are schematic diagrams illustrating how servo information is written in the arcuate tracks according to the second invention.

As shown in FIG. 26A, the servo burst regions are of substantially equal width. Thus, the servo information is written at the beginning and end of each even track and consists of a burst which is written 1.3 mils wide but only trimmed to 1.0 mil (nominal) by the following even write transducer. Preferably, the servo bursts comprise alternate frequencies which are at equal amplitudes in an unequalized channel and are generated from a system clock. Assuming a system clock of 40 MHz, a first servo frequency ($f_0$=1.6 MHz) and a second servo frequency ($f_2$=3.2 MHz) are obtained by dividing the system clock by 25 and 12.5, respectively.

These values are not intended to limit the implementation of the invention. They reflect engineering choices based upon the tape and scanner speeds discussed above and emphasize early detection of the servo signals, before equalization of the readback signal. For the dimensions of the transducers, the servo frequencies can be abstracted as ratios of wavelength to read gap width which are constant at all combinations of tape and scanner speeds and which reference either an unequalized or an equalized readback channel response.

Servo frequency $f_0$ is written by write transducer $W_0$, while servo frequency $f_2$ is written by write transducer $W_2$. Now, assume that read transducer $R_0$ has just passed the upper tape edge on its counterclockwise scan of track 0 as shown in FIG. 26A. If transducer $R_0$ is accurately positioned, substantially ¾ of its gap width (0.75 mil) will be on the servo track written by transducer $W_0$, while ¼ of its width (0.25 mil) will be on the servo burst in a track written by transducer $W_2$. Accordingly, with proper positioning, the read transducer $R_0$ while traversing the servo bursts at the beginning and end of each scan will generate a servo signal comprising the servo frequencies $f_0$ and $f_2$ in the ratio $3f_0$: $1f_2$. As disclosed below, these two frequencies are discriminated and their amplitude ratio is used to determine the magnitude of a servo error signal. Servoing on readback of $R_2$ is based upon the ratio $3f_2$: $1f_0$.

Assuming an 8-transducer scanner and a magnetic tape with the dimensional and speed values given above, an example will now be given of writing and reading a tape during one rotation of the scanner. This example corresponds to a read-after-write (RAW) procedure in which data is validated as it is being written by reading it immediately. In this operation, the scanner is caged to the tape as described later. Although read transducer detection of servo bursts is described, this is for illustration only. Scanner positioning and tape speed control in response to servo bursts would occur only when data is read from the tape during playback. In the example, the transducers are referred to by their respective reference designations, that is: $W_0$–$W_3$ and $R_0$–$R_3$.

Figure 26B:
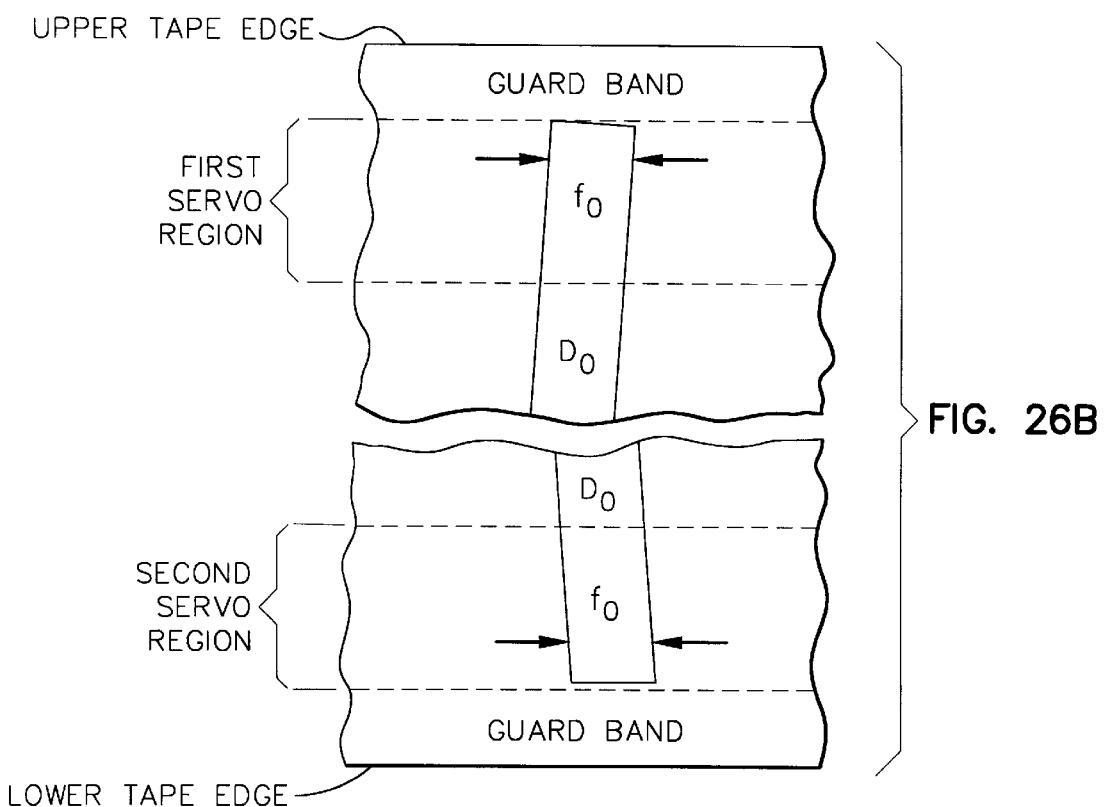

1. $W_0$, (CW azimuth) engages the tape upper edge and writes track 0 consisting of a 1.3 mil band of fo and, after delay through the first servo region, writes track 0 containing data $D_0$, after which $W_0$ writes a servo burst consisting of a 1.3 mil band of $f_0$ in the second servo region. When $W_0$ passes the lower edge of the tape, the tape will have moved 250 microinches. The result is shown in FIG. 26B.

2. Now $R_3$ with a CCW azimuth engages the tape upper edge and traverses the tape in an arcuate scan (which is ignored at this time). When $R_3$ reaches the lower tape edge, the tape will have moved 500 microinches.

Figure 26C:
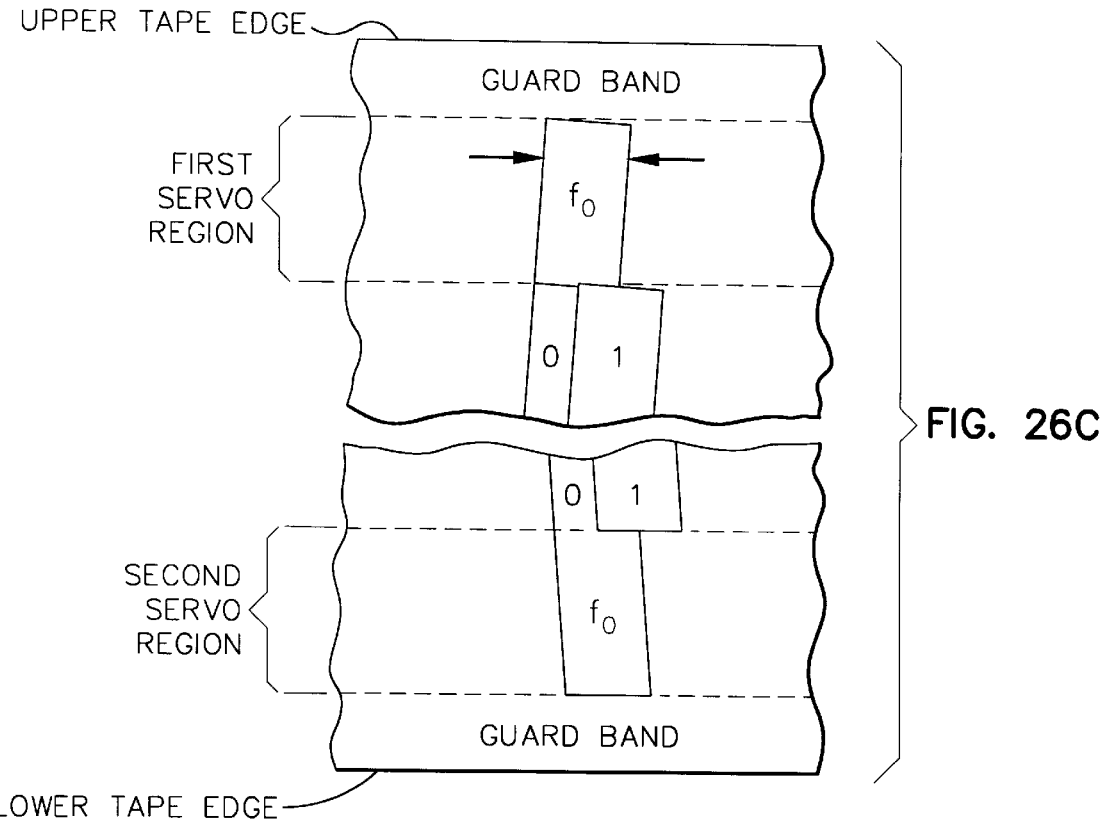

3. Now, $W_1$ with a CCW azimuth engages the upper edge of the tape. Writing with this transducer is delayed until $W_1$ has passed the first servo region, then $W_1$, which overlaps track 0 by 800 microinches, overwrites track 0 with track 1 consisting of data $D_1$ with no gap between track 0 and track 1. This leaves a trimmed track 0 with a width of 500 microinches. Track 1 has a track width of 1.3 mils and ends at the upper edge of the second servo region. At this point, data tracks 0 and 1 are bracketed between upper and lower servo bursts comprising 1.3 mils of servo frequency $f_0$. When $W_1$ reaches the lower edge of the tape, the tape will have moved 750 microinches. The result is shown in FIG. 26C.

4. $R_0$ with a CW azimuth now engages the upper edge of the tape. $R_0$ then traverses the first servo region. If properly aligned, the read gap of $R_0$ will scan adjacent servo bursts as described above for FIG. 26A. If properly aligned in the data region, $R_0$ is centered over trimmed track 0. Relatedly, the read gap is 1.0 mil wide, with its center 500 microinches positioned over the center of trimmed track 0 and 250 microinches at each edge overlapping adjacent tracks. Track 0 has a CW azimuth which energizes $R_0$, while the adjacent tracks have CCW azimuths to which $R_0$ is nonresponsive. When $R_0$ traverses the second servo region, its readback signal will include $f_0$ and $f_2$ in the ratio $3f_0: 1f_2$, if properly aligned. When $R_0$ reaches the lower edge of the tape, the tape will have moved 3000 microinches.

Figure 26D:
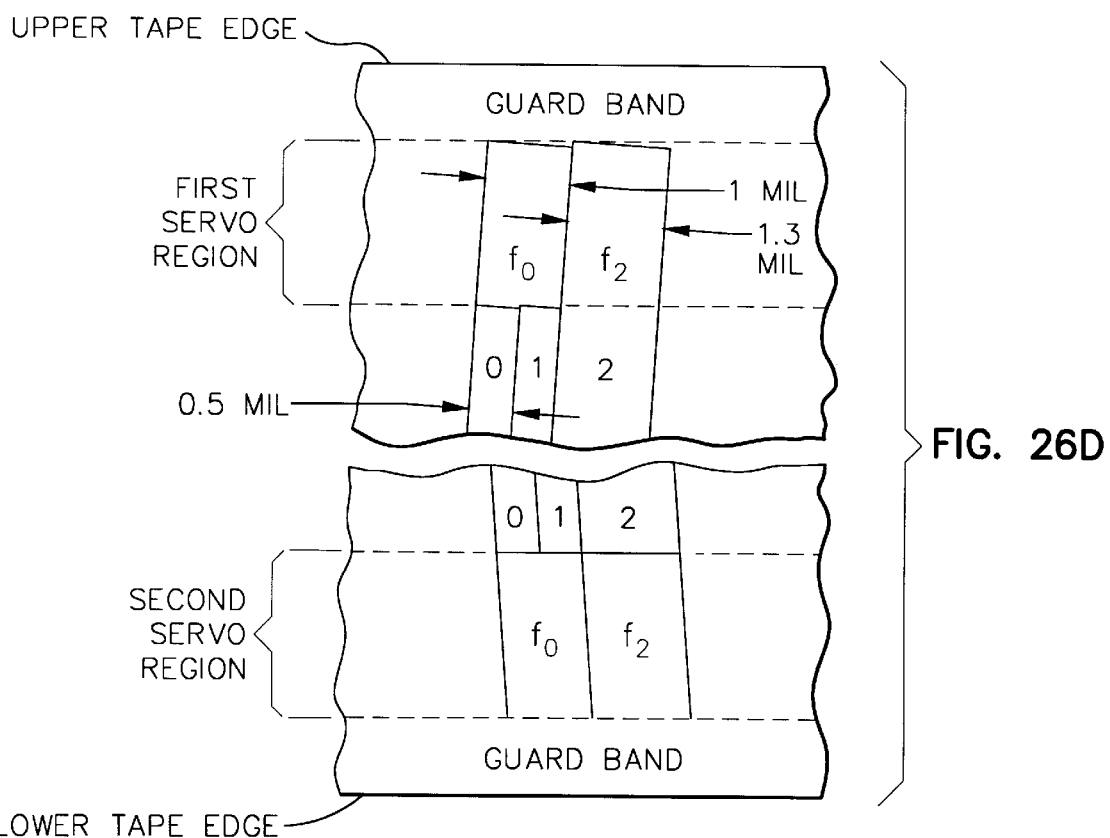

5. $W_2$ with a CW azimuth now begins tracing its arc from the upper edge of the tape to write track 2 consisting, initially, of a 1.3 mil-wide band of $f_2$ in the first servo region which overlaps the $f_0$ band by 300 microinches and then writes track 2 including data $D_2$. The outer edge of the gap in $W_2$ overlaps track 1 by 800 microinches and overwrites it, beginning in the data field, with track 2 data, ensuring no gap between track 1 and track 2. This leaves a trimmed track 1 of 500 microinches' width. $W_2$ appends a 1.3 mil-wide servo burst consisting of $f_2$ in the second servo region. At this time the tape has moved 1250 microinches. The result is shown in FIG. 26D.

6. $R_1$ with a CW azimuth now engages the tape. Readback through $R_1$ is valid only between the servo regions. $R_1$ scans the data region of trimmed track 1 with its gap centered over the track. When $R_1$ reaches the lower edge of the tape, the tape has moved 1500 microinches.

7. $W_3$ with a CW azimuth now engages the upper edge of the tape and writes as in step 3. above. When $W_3$ reaches the lower edge of the tape, the tape has moved 1750 microinches.

8. Now $R_2$ with a CW azimuth engages the upper edge of the tape and reads track 2 as described in step 4. above. At this point the tape has moved 2000 microinches.

9. When $W_0$ with CW azimuth again engages the upper edge of the tape, the cycle comprising steps 1–8 described above is repeated. Note that on this next scanner cycle, $R_3$ reads the track recorded by $W_3$ on the above-described cycle.

A tape speed servo loop operates during playback to ensure head/track alignment. This is a sampled servo which receives servo information when the even-numbered read transducers, $R_0$ and $R_2$, read the servo bursts in the leading segments of recorded tracks. In the first servo region of the tape, there are only even tracks (0 and 2) of frequency $f_0$ and $f_2$, written by write transducers $W_0$ and $W_2$, respectively. As described above, when read transducer $R_0$ is centered over track 0, the detected servo signal is in the ratio of $3f_0:1f_2$. Any other ratio is discriminated and controls the servo to change the tape speed so that the above ratio is obtained. The identical process occurs when read transducer $R_2$ is reading its tracks, in which case the ratio of the servo burst in the first servo region is $3f_2:1f_0$.

As with the first embodiment scanner, the tilt servo of the second embodiment scanner controls the location at which the scanner axis of rotation intercepts a tape moving in its longitudinal direction by positioning the axis transversely with respect to the longitudinal axis of the tape.

Preferably, the tilt servo is activated during playback of previously-recorded tapes and compensates for misalignment of the tape due to differing drive tolerances or tape dimensional changes resulting from temperature or humidity effects.

Accordingly, during recording, tilt servo bursts are recorded in the second servo region as described above. The bursts are identical in format and content to the servo bursts for the tape speed servo recorded on the first servo region. The tilt servo ensures that read transducers scanning a tape remain on the same track for the entire scan. Detection of servo error and control of the tilt position in response is as described above for the tape speed servo. Since tilting of the scanner by the tilt servo causes the transducers to move off the track location as positioned by the tape speed servo, while corrections are being made by the tilt servo, the tape speed servo may be placed into a "predict model" and the tape speed is changed in a manner to compensate for correction movements of the tilt servo so as to realign the transducers at the upper edge of the tape. After tilt servo operation at the lower edge of the tape, normal operation of the tape speed servo is resumed.

Figure 27:
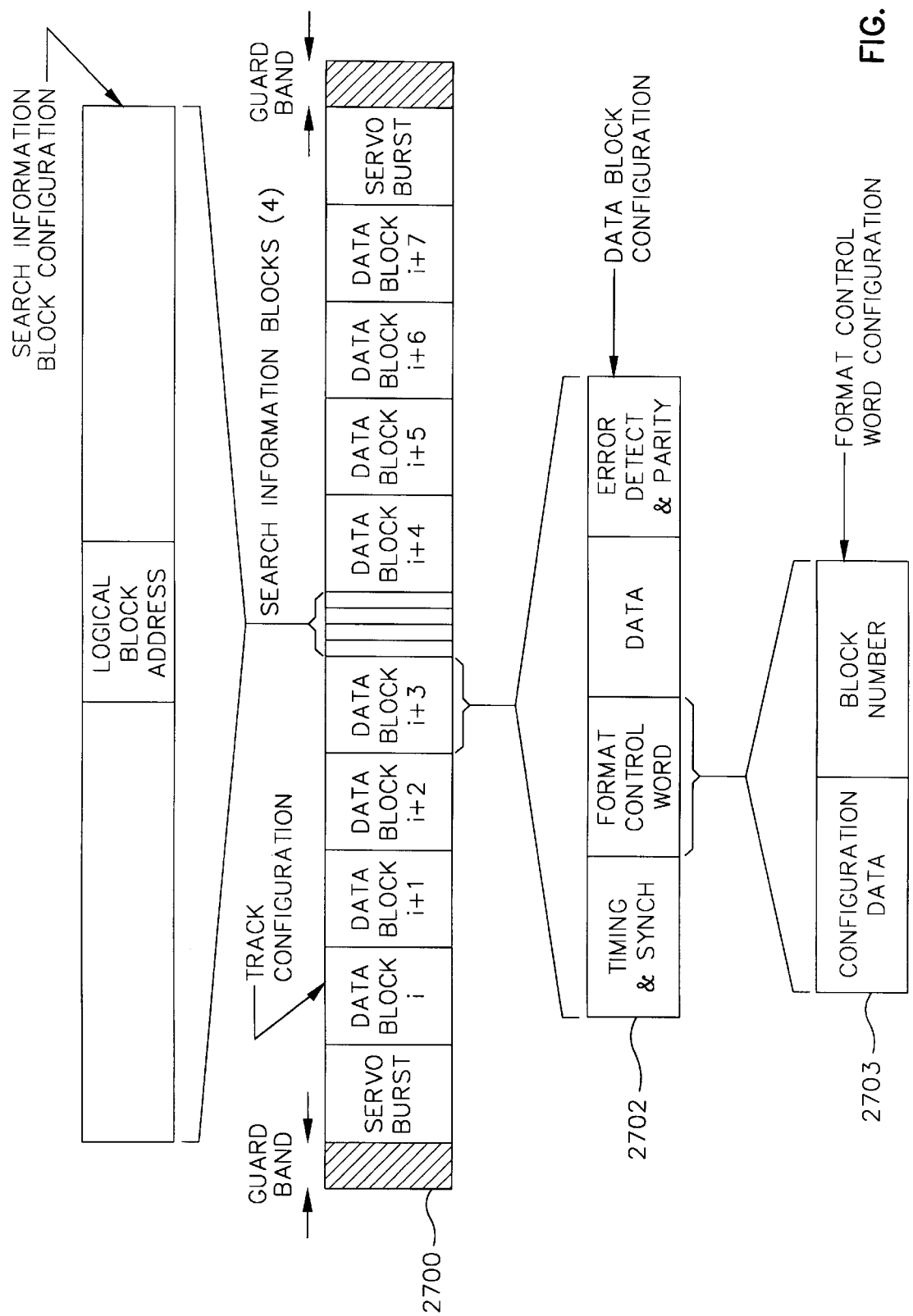
FIG. 27 is a schematic diagram illustrating the data format of an arcuate track according to the second embodiment.

The tilt servo also responds to data in each track as can be understood with reference to FIG. 27 in which track data configuration is illustrated. This configuration is oriented with respect to the left-hand edge of a data track 2700 which corresponds to the upper edge of a tape while the right-hand edge of the data track 2700 corresponds to the lower edge of the tape. From left to right, the configuration of the data track 2700 (which corresponds essentially to the configuration of every data track written by the second embodiment) includes a guard band, a servo burst in the first servo region, four consecutively-numbered blocks of data, i through i+3, and four search information blocks which are centered substantially on the longitudinal centerline of the tape. Following the search information blocks are four more consecutively-numbered data blocks i+4 through i+7, a servo burst in the lower servo region, and a guard band. Each data block has the configuration illustrated in the data structure 2702. In this regard, the data block is a multi-field structure including timing and synchronization (timing & sync) fields, a format control word, a plurality of fields for data, and error detection and parity (error detect & parity)

fields. Each format control word of a data block includes configuration data and a block number identifying the data block. Data block numbering is consecutive through a sequence of tracks so that a first track contains data blocks 0–7, the second track contains datablocks 8–15, and so on. After alignment of the tilt servo as described above, the block number of data block i+7 at the end of a data scan of a track is compared to the block number at the beginning of the scan to confirm that the transducer is positioned over the same track for the entire scan. The difference between block numbers should be consistently 7 in the example shown in FIG. 27. If the difference indicates that there is at least one full track misalignment, the tilt servo is activated to move the scanner the requisite distance up or down from the tape center line. This aspect of the tilt servo corresponds essentially with the tilt servo operation for the first embodiment in response to LSB signals.

Each track further includes four consecutive search information blocks which are centered between the tape edges on the longitudinal center line of the tape. Each search information block has a configuration that includes a logical block address. The logical block address for the second embodiment assumes the partitioning of data into frames in which each frame spans a group of consecutive tracks. There are a plurality of consecutively-numbered data blocks in the frame. The data blocks are numbered consecutively by block number as described above and also logically by block address. The logical block address in the search information block of a track is the logical block address of the first block in the frame including the track, divided by 256.

Figure 28:
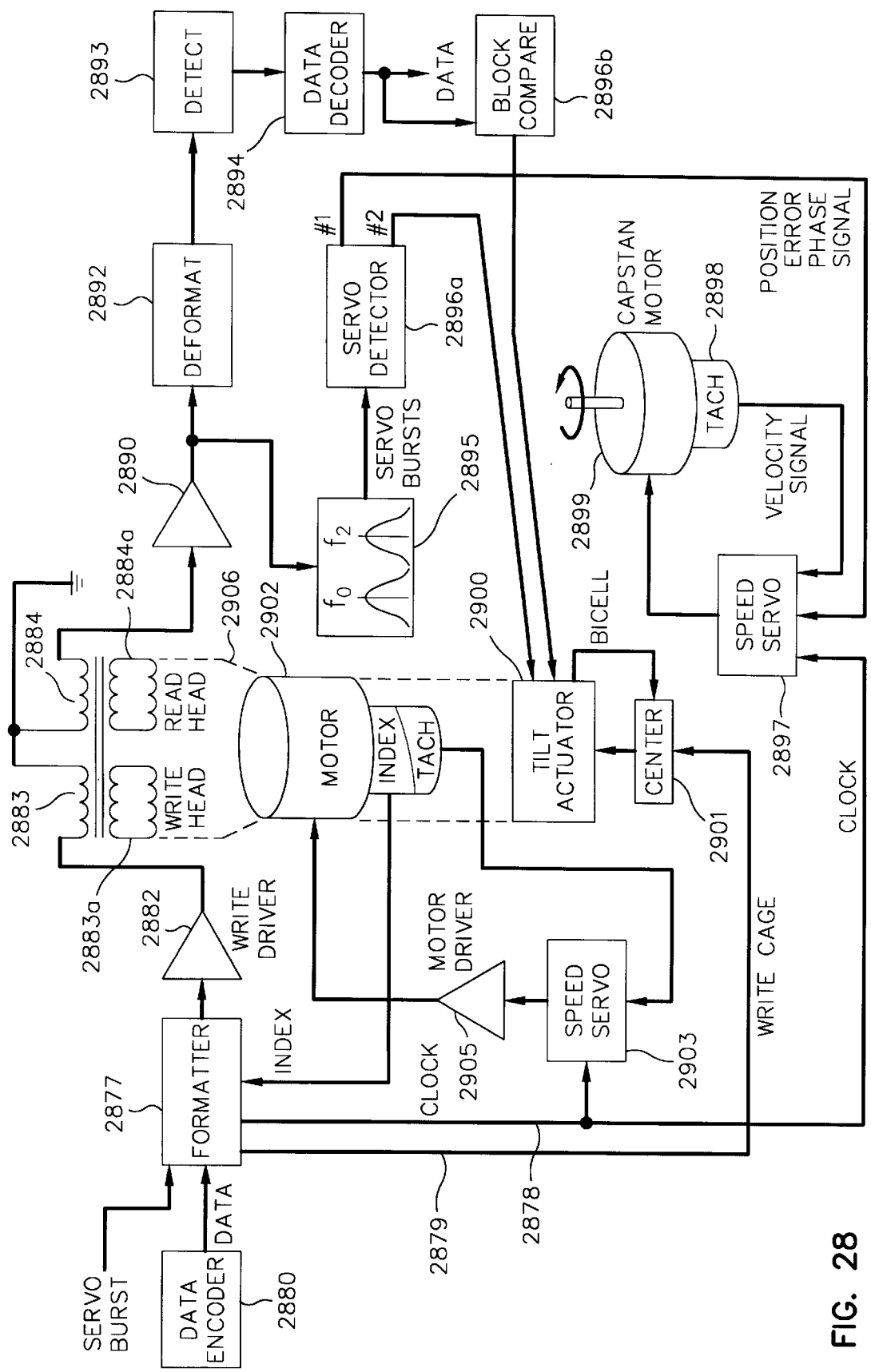
FIG. 28 is a block diagram illustrating channel and servo components of a tape drive according to the second embodiment of the invention.

FIG. 28 is a block diagram of the electronics necessary to operate the second embodiment of the tape drive. An information formatter 2877 receives servo information, data, and data format information and creates a track format for each track illustrated above in FIG. 27. The formatter 2877 produces a CLOCK signal output on signal line 2878 and a CAGE signal on signal line 2879. For each track, a data encoder 2880 encodes data blocks and search information blocks according to the configuration illustrated in FIG. 27. Formatted track information is provided to a write driver 2882 from the formatter 2877 and therefrom to a write stator winding 2883. Track information is coupled from the write stator winding 2883 to a write transducer 2883a as described above. Data is read from written track by a read transducer 2884a and coupled to a read stator winding 2884. The read stator winding 2884 is connected through a preamp 2890 to a data deformatter 2892. The data channel includes a detector 2893 receiving the output of the deformatter 2892 and feeding the input of a data decoder 2894. Decoded data are provided at the output of the data decoder 2894.

The servo burst information is obtained from the output of the preamp 2890 by a filter circuit 2895 and provided to a servo burst detector 2896a. The servo burst detector 2896a includes conventional servo circuitry and programming for generating at output #1 a position error signal for fine adjustment of capstan motor speed through speed servo unit 2897. The speed servo unit 2897 sets the speed of a capstan motor 2899 that imparts motion to a tape as described above. A tachometer 2898 detects the speed of the capstan motor 2899 and provides a velocity signal to the servo detector 2897. The speed servo unit 2897 also receives the CLOCK signal output by the data formatter 2877. During write mode, the tachometer signal and CLOCK signal are input to the speed servo unit 2897 to synchronize the speed of the tape with the rate at which data is written to it by the scanner. During playback mode, the speed servo unit locks the velocity signal produced by the tachometer 2898 to the position error phase signal produced by the servo burst detector 2896a in response to the servo bursts in the first servo region of the tape. Thus, fine adjustment of alignment between the rotary transducer assembly and the arcuate tracks on a tape is provided by adjustment of the tape speed through the capstan motor 2899.

The servo detector 2896a includes the appropriate logic to determine the ratios $f_0/f_2$ and $f_2/f_0$ in the second servo region when $R_0$ and $R_2$, respectively, are reading in playback mode. The detector uses each ratio to generate and provide a position error signal at output #2 to a tilt actuator 2900 which pivots the rotary transducer assembly as required for fine track alignment. Coarse adjustment of the scanner location is provided by a magnitude and difference signal generated by a block compare circuit 2896b. The block compare circuit receives the DATA signal to detect block numbers, subtracts the block numbers, and, if the difference deviates from the prescribed amount (7, in the second embodiment) produces a signal with a magnitude and difference sufficient to pivot the scanner as required to stay within the trace of a track. The magnitude and difference signal is fed to the tilt actuator 2900. The tilt actuator in the second embodiment comprises, preferably, the voice coil actuator shown and discussed above with respect to FIGS. 18–20.

During write mode, the tilt actuator bicell signal is provided to a centering circuit 2901 which receives the CAGE signal from the formatter 2877 denoting that the rotary transducer assembly is to be caged whenever a track is written. In response to the CAGE signal, the centering circuit 2901 operates the tilt actuator voice coil until the bicell signal reaches a preset reference value, indicating centering of the scanner with respect to a tape.

The head motor 2902 which rotates the scanner is operated at a rotational speed appropriate for a selected data format as indicated by the repetition rate of the CLOCK signal output by the formatter 2877 on signal line 2878. The CLOCK signal is counted down by a speed servo 2903 which provides a speed signal through motor driver 2905 that locks the rotational speed and phase of the scanner motor 2902 to the CLOCK signal. Thus, for a particular tape speed, the motor 2902 is given a velocity which ensures that the data transfer rate and linear data density conform to predetermined values. At the same time the capstan motor 2899 is driven at a speed to ensure that the tape moves a distance equal to four track widths per revolution of the scanner drum for the transducer geometry shown in FIG. 23. The speed servo unit 2903 phase locks the speed of the motor 2902 in response to the output of the tachometer 2904. The INDEX signal is output from the rotary transducer assembly to the formatter 2877, which enables the formatter to synchronize data writing with scanner rotation.

Finally, to ensure uniformity of the positions of arcuate tracks written on a tape, during write mode, the capstan motor 2899 is phase-locked to the system clock. This ensures that if tape speed decreases, scanning speed will proportionally decrease and vice versa.

The processing flow for the capstan motor speed adjustment and tilt adjustment of the rotary head assembly are essentially as described and illustrated above in connection with the first embodiment. The exceptions are that block numbers are read in steps 433 and 434, stored in step 435, and compared in step 438. In addition, the offsets measured in steps 426 and 430 are obtained by the ratios between $f_0$ and $f_2$ described above.

Figure 29A:
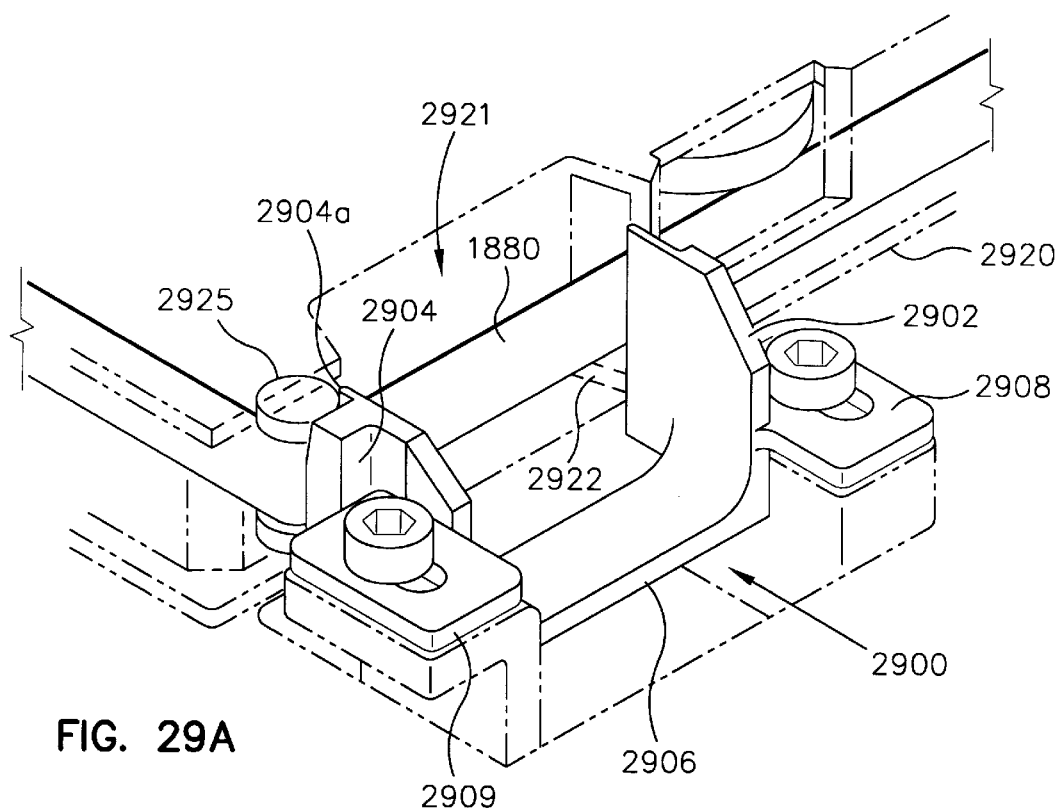
FIGS. 29A and 29B illustrate a front guide in the second embodiment.
Figure 29B:
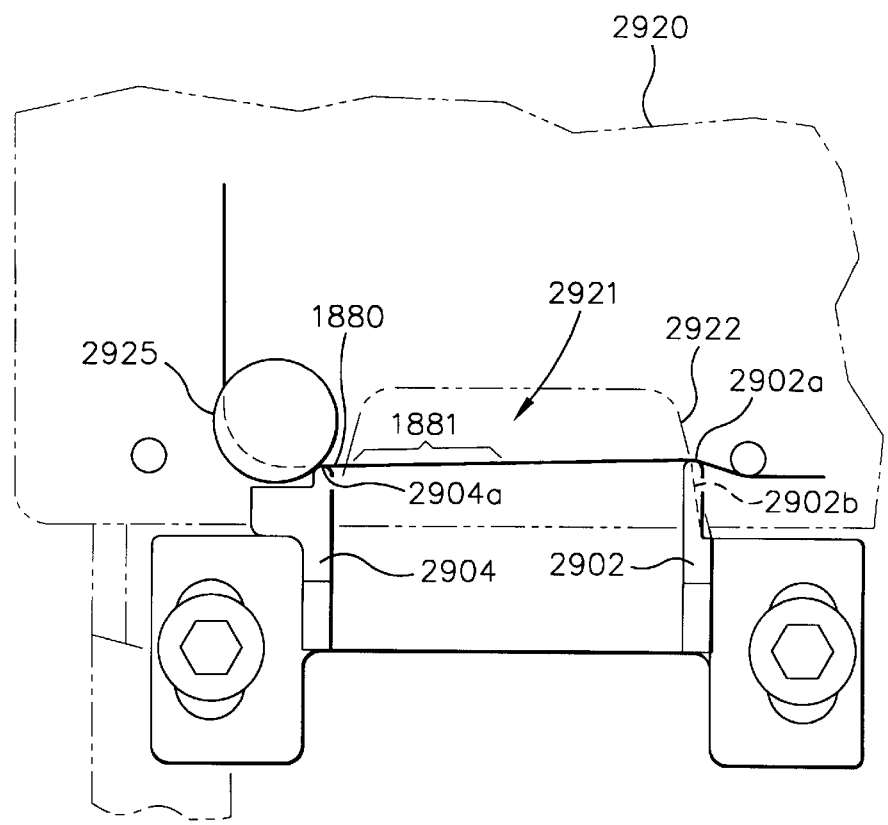

Refer now to FIGS. 18, 20, 29A and 29B for an understanding of how the scanner in the second embodiment is aligned with a tape at the recording location. The front face 1836 of the scanner drum 1833 is bracketed between the legs of a U-shaped positioning guide 2900. The positioning guide 2900 has a first leg 2902, a second leg 2904, and a cross piece 2906 joining the two legs. The positioning guide is a single piece with flanges 2908 and 2909 for adjustably fastening it to the plate 1831. As best seen in FIG. 18, the leg 2902 of the positioning guide 2900 has an upper portion 2902a which is essentially aligned with the leg 2904. A lower portion 2902b of the positioning guide leg 2902 extends beneath the portion 2902a into a recess 2912 into plate 1831. The positioning guide is supported on spacers 2914 and 2916. The spacer 2914 is fixedly attached to the plate 1831 by brazing or soldering, as is the L-shaped spacer 2916. The positioning guide is adjustably fastened to the spacers 2914 and 2916 by threaded screws 2918 and 2919, respectively. As is best seen in FIG. 18, the scanner 1830 is fastened to the plate 1831 over the recess 2912. The recess 2912 extends from the positioning guide 2900 rearwardly to the back of the scanner, affording space underneath the scanner to pivot through the plane of the upper surface of the plate 1831. The scanner is adjustably fastened to the plate 1831 by the threaded screws 1863 and 1864 so that the position of the end face 1836 of the drum 1833 can be centered between the positioning guide legs 2902 and 2904 at the recording location 1881. The positioning guide 2900 can be located so that the rounded forward edge 2904a of the positioning guide leg 2904 is essentially coplanar with the end face 1836 of the drum 1833. As best seen in FIG. 29B, the forward edge of the positioning guide leg 2902 extends forwardly of the forward edge of leg 2904. This imposes a slight positive angle between the tape 1880 and the end face 1836 of the drum 1833. When the drum 1833 rotates, creating the low ambient pressure between the end face 1836 and the tape 1830, the slight positive angle between the tape 1880 and the end face 1836 limits the contact between the tape and end face only in the region of the recording location 1881, thereby reducing friction between the tape and the end face.

The positioning guide 2900 engages a tape cartridge as illustrated in FIGS. 29A and 29B where the lower metal plate 2920 of the cartridge 1832 is notched at 2921 to expose the tape 1880 for recording and playback. A guide pin 2924 is fixed to the metal plate 2920 at one side of the notch 2921. Both sides of the notch 2921 are defined by angled edges which transition from the front edge of the plate 2920 to the back of the notch 2921. Of these angled edges, the angled edge 2922 is on the opposite side of the notch 2921 from the guide pin 2924. The positioning guide 2900 engages the guide pin 2924 and the angled recess edge 2922 to position the end face 1836 of the drum 1833 within the notch 2921 at the recording location 1881. In this regard, as shown in FIGS. 29A and 29B, the rounded forward edge 2904a of the positioning guide leg 2904 engages the upper disk 2925 of the guide pin 2924, while the lower portion 2902b of the positioning guide leg 2902 engages the angled edge 2922 on the cartridge lower plate 2920. As best seen in FIGS. 18 and 29B, the lower portion 2902b of the positioning guide leg 2902 has a surface with an angle whose value is complementary to the angle of the angled recess edge 2922.

The positioning guide 2900, therefore, indexes the cartridge 1832 with respect to the scanner 1830 so that the plane of the tape 1880 is precisely positioned at the recording location 1881 with respect to the end face 1836 of the scanner 1830. The cartridge 1832 is transported into a tape drive until the rounded edge forward edge 2904a engages the upper disk 2925 and the angled edge 2922 engages the complementarily angled surface on the lower portion 2902b of the positioning guide leg 2902.

ALTERNATIVE TRANSDUCER DRUM EMBODIMENT

Figure 30:
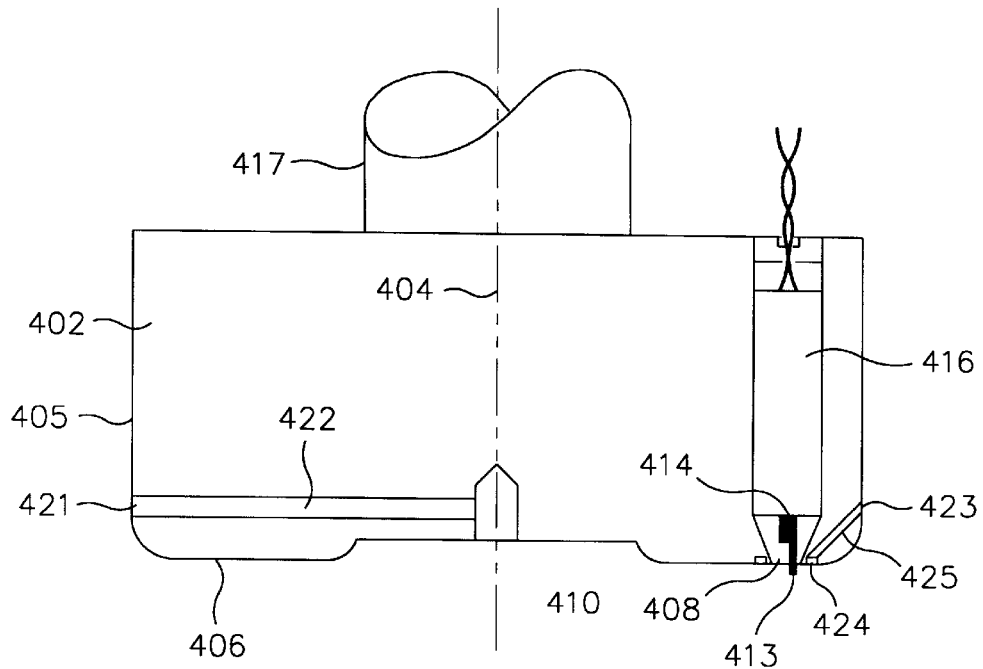
FIG. 30 is a side sectional view of an alternate embodiment of a transducer drum.
Figure 31:
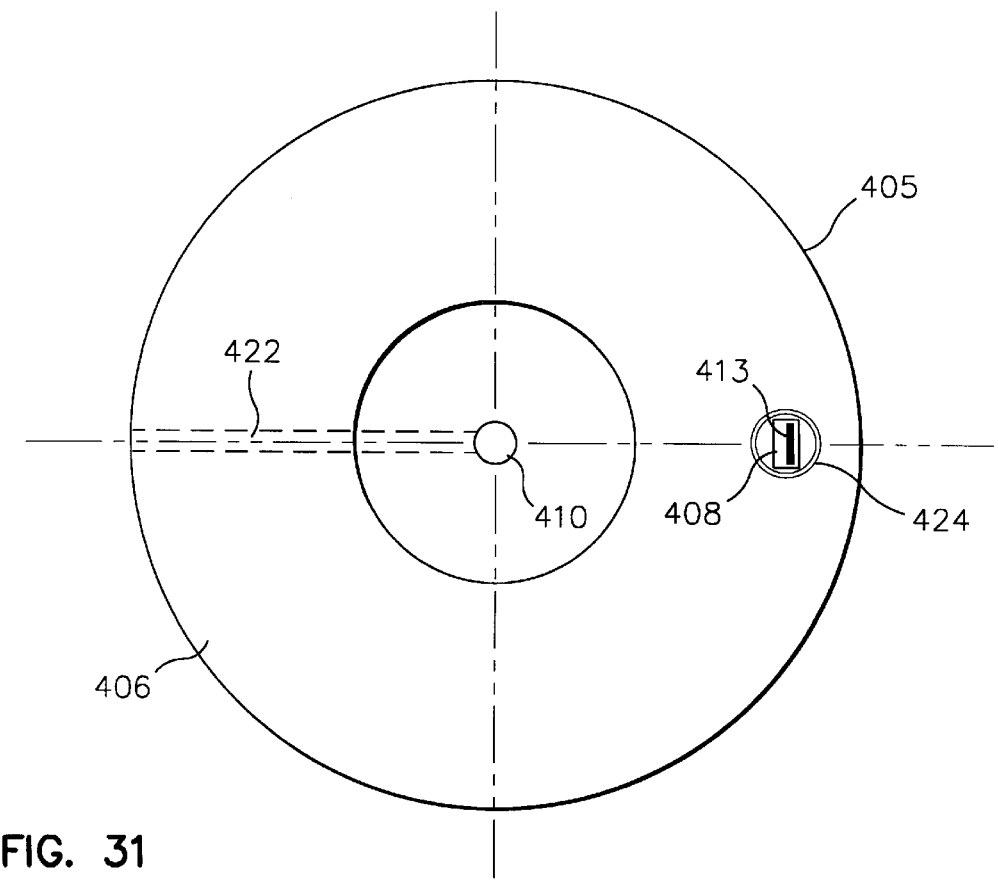
FIG. 31 is an end view of the alternative embodiment shown in FIG. 18.
Figure 32:
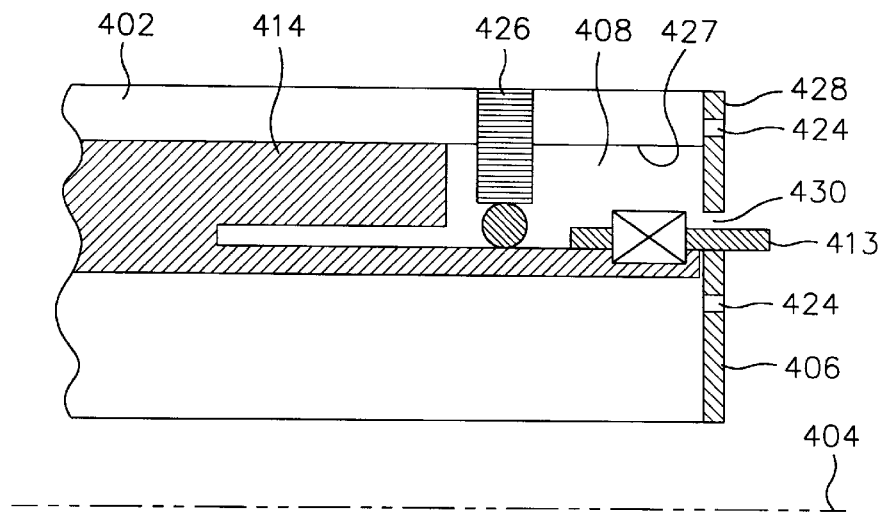
FIG. 32 is an enlarged side sectional view of a portion of the alternative embodiment showing the structure of a read head.

An alternative embodiment of a transducer drum is illustrated in FIGS. 30–32, where a transducer drum 402 with a circular end face 406 is attached to a drive shaft 417 at its center to rotate around a scanning axis 404 running through the center of the drive shaft 417. On the circular end face 406 of the transducer drum 402, cavities 408 and 410 are formed. Disposed within the cavity 408 is a magnetic head assembly consisting of a transducer core 413, a head mounting shoe 414, and a connector 416 for carrying signals between the transducer core 413 and the rotary transformer as described above.

The cavity 410 is located at the center of the end face 406 and is connected to a bleed hole 421 in the peripheral side 405 of the transducer drum 402 by a channel 422. A shallow ring 424 is formed in the end face 406 surrounding the cavity 408 which is connected by way of the channel 425 to a bleed hold 423 and a peripheral side 405 of the transducer drum 402.

FIG. 32 provides a detailed magnified view of a magnetic head assembly. The magnetic head assembly includes a head mounting shoe 414 retained within the cavity 408 so that it contacts a connector 416 (shown in FIG. 30) at its lower end and attaches to the transducer core 413 at its upper end. The head mounting shoe 414 is a thin cantilever beam which is sufficiently flexible that its upper end can be displaced within the cavity 408 in response to centrifugal force when the transducer drum 402 rotates. A spring 426 is affixed between the wall 427 of the cavity 408 at its outermost radial location and the head mounting shoe 414. The spring 426 biases the head mounting shoe 414 toward the center of rotation (that is, opposite the centrifugal force) at the axis 404.

As the drum 402 rotates around the axis 404, centrifugal force is generated. The tension on the spring 426 is such as to allow the head mounting shoe 414 to remain in its original biased position at the minimum anticipated drum speed. As the rotational speed of the drum 402 increases, the head mounting shoe 414 and, resultantly, the transducer core 413, are deflected radially outward with respect to the drum 402 so that an arc with a larger radius is traversed.

An increase or decrease in centrifugal force is driven by a servo mechanism that responds to the track addresses in the center portion of the tracks which are substantially aligned with the centerline of the tape on which the tracks are written. Assume, for the following discussion, that all bits of a track address are written in the address field which is at the midpoint of the track. Assume also a servo loop to vary the speed of the rotary head motor in response to track address information.

During rotation of the transducer drum 402, the head core scans arcuate tracks recorded on the tape, presumably at the correct time to read the data contained in the tracks. Assuming a constant rotational speed of the transducer drum 402, a tape that is stretched or otherwise expanded will cause the head core 413 to scan tracks at a shorter displacement from a reference point. In other words, stretching of the tape causes the tracks to advance toward the transducer drum, causing them to be read sooner than expected. In this regard, consider a read head scanning a track from the upper edge to the lower edge of the tape on which the track is written. The track addresses are substantially centered in the track and substantially aligned with the centerline of the tape. Assume the track address to be located at the 0° position of the circular scanning path followed by the read head. When the read head rotates to the 180° position, it would expect to encounter the track address of a previously-read track which is displaced from the track read at the 0° position by a constant amount. For example, at 2000 tracks per inch, a read head following a circular scanning path of 0.6 inches in diameter would expect an address displacement of 1200 tracks, assuming error-free tracking. If the address displacement is less than 1200 tracks, the tape is stretched, causing the track spacing to be greater so that fewer tracks are traversed in each half rotation.

In the alternative embodiment, compensation for tape stretch is provided by increasing the rotational speed of the transducer drum 402. The increased centrifugal force on the magnetic head mounting shoe 414 causes the head core 413 to move radially outward against the bias 426, thereby increasing the effect of radius of the drum face by increasing the distance between the head core 413 and the axis of rotation 404. The increased diameter increases the radius of the arc covered by the head core 413 during scanning to permit the head core to read at the 180° position the track which is displaced 1200 tracks from the track read at the 0° position. The rotational speed of the transducer drum 402 has no effect on its ability to rad the tape during playback. This speed is only an internal rate for loading a data buffer.

Continuing with the example, if the displacement between the 0° and the 180° positions is greater than 120° tracks,the tape has contracted. Rotational speed of the transducer drum 402 is then reduced, decreasing centrifugal force and moving the head core 413 radially inward under the force of the bias spring 426, thereby reducing the radius of the arc traversed by the head core. Correct tracking is achieved when the 1200 track displacement is obtained.

Preferably, the potential deflection of the magnetic head is on the order of a few mils in response to centrifugal force. As the servo mechanism controlling the speed of rotation of the transducer drum commands a speed change in response to a detected error, the head core 413 deflects to an appropriate radius to drive the error to zero. The error signal is derived from the track address information written in the center portion of each track.

Figure 33:
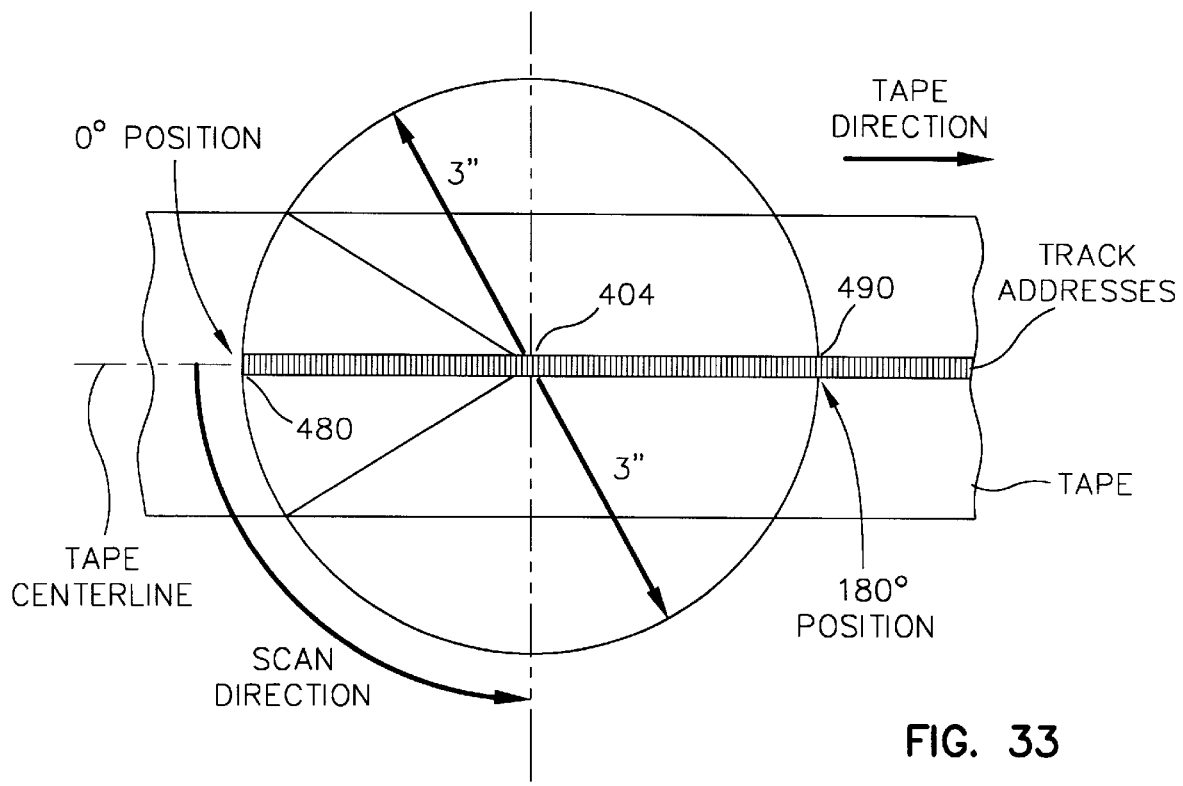
FIGS. 33 show use of track address fields for servoing transducer scanning and rotary head assembly alignment.

Preferably, during the write operation, the track address is written in the center portion of a track in a code which is self-clocking, easily filtered, and readily searched. The track address is used in this alternative embodiment to measure tracking error. Referring to FIG. 33, at a track density 2000 tracks per inch, the read head should read the current track address 480 at the 0° position of the scan and the address of a track 490 at the 180° scan position having an address displacement of 1200 tracks, when the system is error-free.

It should also be appreciated that placement of the entire track address in the center of each track can also be used to assure alignment of the rotational axis 404 with the center line of a tape. The timed intervals between the two track addresses at the 0° and 180° positions during drum rotation are measured. In this regard, the timed interval from 0° to 180° and then from 180° back to 0° are measured. When the intervals are equal, the rotational axis 404 of the drum 402 is correctly aligned with the center of a tape. If the interval from 0° to 180° is shorter than the interval from 180° to 0°, the rotational axis 404 of the drum 402 is above the center of the tape. Similarly, a shorter second half interval indicates offset below the tape center.

HIGH SPEED SEARCHING

An important advantage of both embodiments of the invention is that different drive functions can be performed at significantly different tape speeds. Since the contact pressure between the rotary transducer assembly and tape is independent of tape speed, a tape can be searched, for example, at a much higher speed than it is written or read. The increased speed will not increase the transducer/tape contact pressure, thus avoiding wear and tape distortion as would occur, for example, in helical scanning.

In fact, the inventors contemplate that searching by track identification will be done at a very high tape speed. During search, scanning is limited to the centerline of the tape where fields with track identification information fields are located. Track identification information can be read from these fields at virtually any longitudinal tape speed, since the azimuth of a read transducer and the centerline fields of a previously-recorded tape are essentially aligned longitudinally along the tape at any speed. Furthermore, this alignment occurs twice for each read transducer during each complete revolution of a rotary transducer drum, for example, at the 0° and 180° positions in FIG. 33. The track identification information can have any form which is convenient to identifying or locating a track or a group of tracks. Examples are the track address information illustrated in FIG. 10 and the logic block address information illustrated in FIG. 27.

CENTRIFUGAL PUMP EMBODIMENTS

Alternate embodiments of the centrifugal pump are shown in FIGS. 34A–34E. The embodiment of FIG. 34A includes a circular array of spiralled grooves etched on the end face of the transducer drum, with each groove G extending from the center to the periphery of the end face. As the transducer drum rotates, air is thrown out of the spiraled grooves G at the periphery of the drum face, creating a low ambient pressure acting substantially between the center of the transducer drum end face and the tape.

Figure 34A:
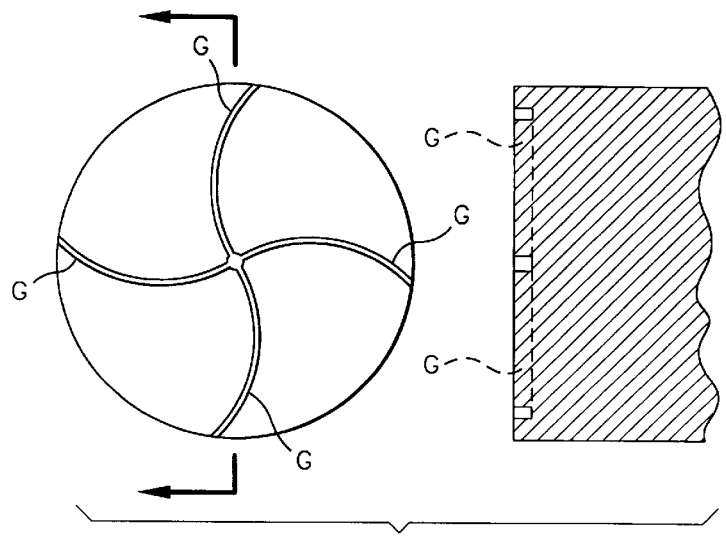
FIGS. 34A–34E show alternate embodiments of a centrifugal pump on the transducer drum.
Figure 34B:
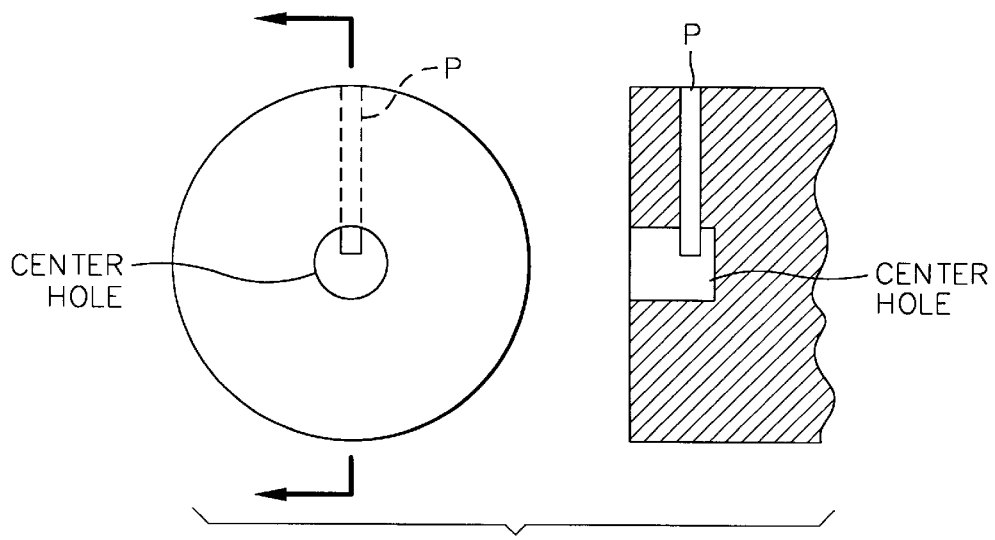

In the embodiment of FIG. 34B, a small pipe section P penetrates to the center of a center hole S for enhanced centrifugal pumping.

Figure 34C:
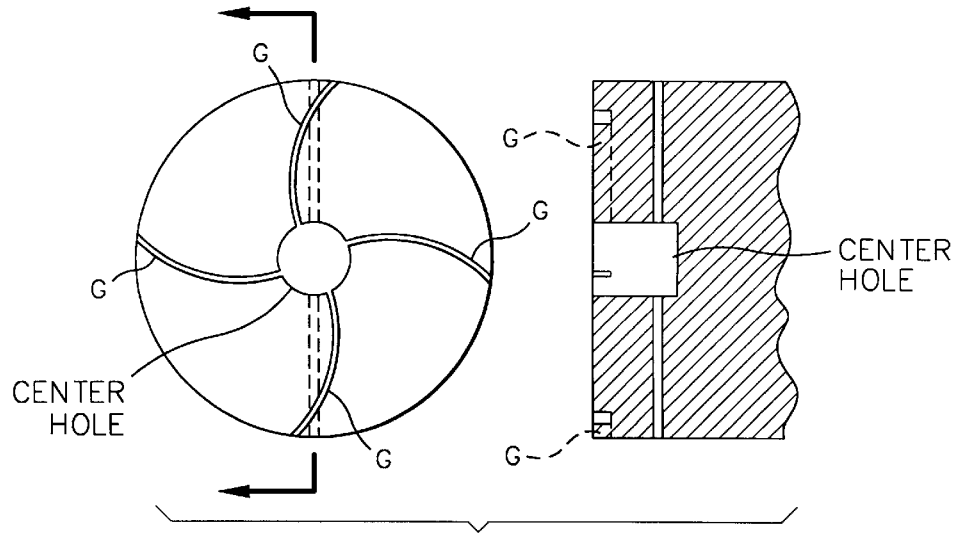

In the embodiment of FIG. 34C, the center hole disclosed above in FIGS. 4A–4C is combined with the etched grooves of FIG. 22A.

Figure 34D:
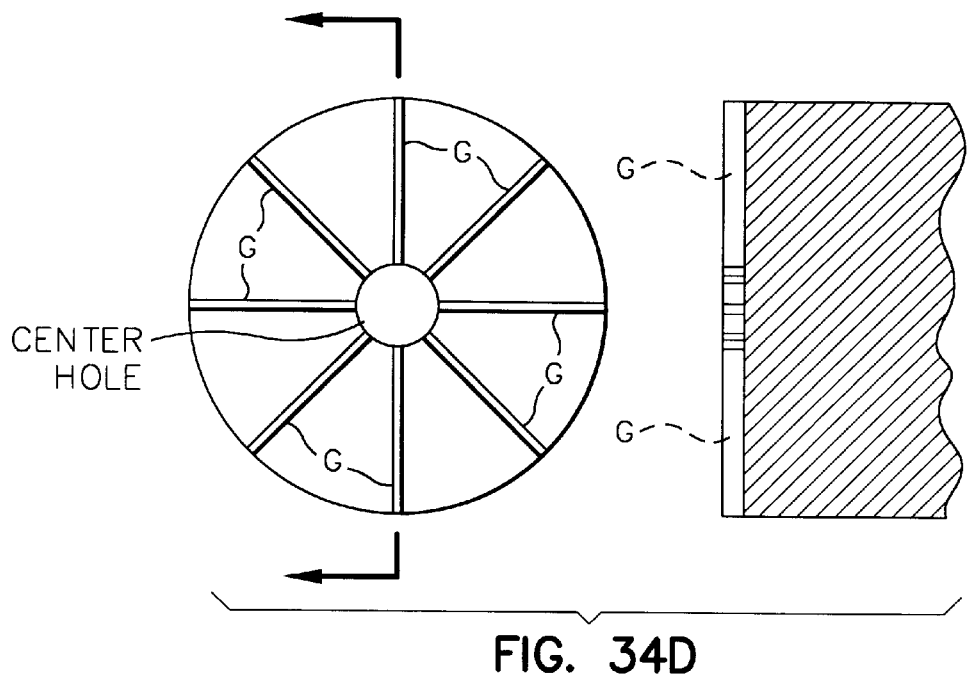
Figure 34E:
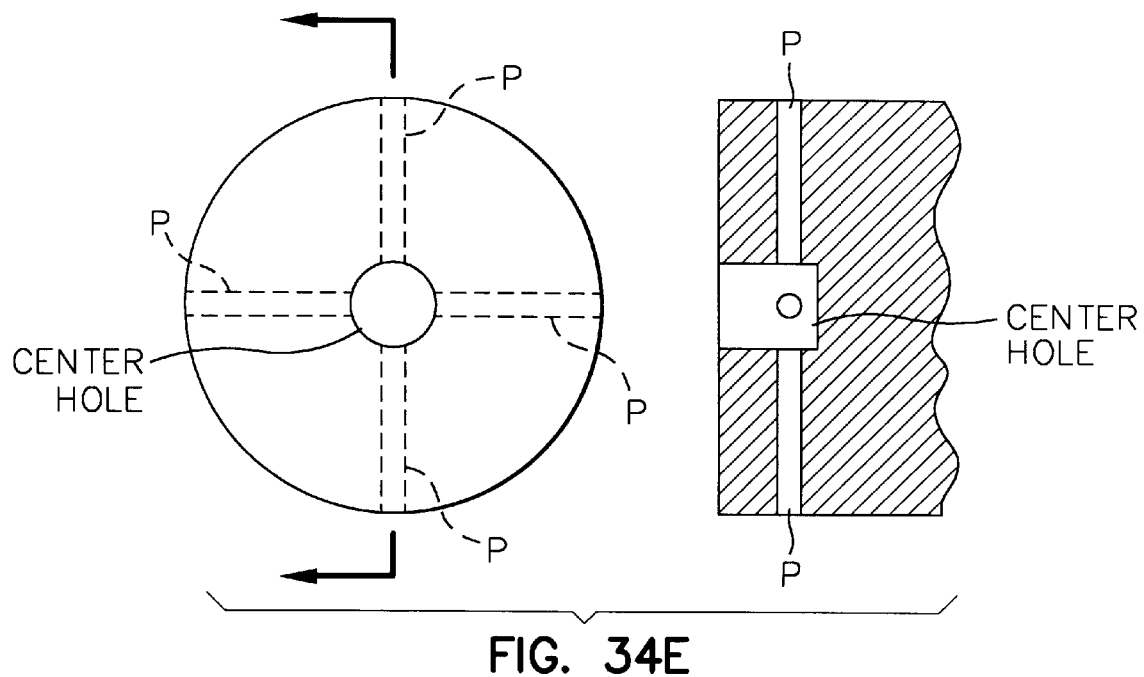

FIG. 34D shows a centrifugal pump with a series of radial channels on the end face of a scanner which radiate on the end face from its center. FIG. 34E shows a central cavity at the end of a scanner drum with a series of bleed holes at the outer peripheral surface of the drum connecting to the central cavity.

While we have described several preferred embodiments of our invention, it should be understood that modifications and adaptations thereof will occur to persons skilled in the art. Therefore, the protection afforded my invention should only be limited in accordance with the scope of the following claims.

We claim:

1. An apparatus for reading information on a magnetic tape, including:

a frame;

means in the frame for receiving a container holding a magnetic tape and for positioning the magnetic tape at a reading location;

transport means in the frame for engaging the magnetic tape and for advancing the magnetic tape longitudinally past the reading location;

a rotating transducer carrier;

transducer means on the transducer carrier for reading information on the magnetic tape;

means for positioning the rotating transducer carrier adjacent the reading location to rotate on an axis of rotation which passes through the magnetic tape near the reading location, said axis of rotation corresponding substantially to the center of a circular transducing path followed by the transducer means when the transducer carrier rotates;

means for rotating the transducer carrier to read a sequence of arcuate information tracks on the magnetic tape; and control means connected to the transducer means, to the transport means, and to the means for positioning and responsive to servo information in the arcuate information tracks for aligning the transducer means with the arcuate information tracks by adjusting:
the speed of advancement of the magnetic tape; and
the location of the transducer carrier with respect to the magnetic tape at the reading location.

2. The apparatus of claim 1, wherein the means for positioning adjusts the position of the transducer carrier in response to the servo information to change the location at which the axis of rotation passes through the magnetic tape.

3. The apparatus of claim 1, further including means on the transducer carrier for engaging the rotating transducer carrier with the tape at the recording location in response to rotation of the transducer carrier.

4. The apparatus of claim 3, wherein the means for engaging includes a means on the transducer carrier responsive to rotation of the transducer carrier for producing a low ambient pressure acting between the transducer carrier and the tape which draws the tape against the transducer carrier.

5. The apparatus of claim 1, wherein the rotating transducer carrier includes:
a transducer drum with a first and a second end face;
the transducer means being mounted on the transducer drum at the first end face;
a drive shaft concentrically mounted to the transducer drum and extending away from the second end face of the transducer drum;
support means for receiving the drive shaft and for supporting rotation of the drive shaft and transducer drum on the axis of rotation;
means for mounting the support means to the frame and for pivoting the support means about an axis which is transverse to the axis of rotation; and
the control means including means for adjusting the location of the transducer carrier with respect to the magnetic tape at the reading location by pivoting the support means.

6. The apparatus of claim 3, wherein the means for engaging includes means at the first end face and responsive to rotation of the transducer drum for producing a low ambient pressure acting between the first end face and the tape which draws the tape against the first end face.

7. The apparatus of claim 1, wherein the transducer means include a write transducer, the apparatus further including write channel means connected to the write transducer for recording a sequence of arcuate information tracks on a magnetic tape, each track having an information format including servo information, track identification information, and data.

8. The apparatus of claim 7, wherein the information format includes an initial field for containing servo information, the initial field substantially coinciding with the beginning of a track, one or more second fields following the initial field for containing data, a third field substantially centered on the midline of the tape and containing track search information, one or more fourth fields following the third field for containing data information, and a final field for containing servo information, the final field substantially coinciding with the end of the track.

9. The apparatus of claim 8, wherein the transducer means further include a number (n) of write transducers, and an equal number (n) of read transducers, the write transducers and read transducers being arranged in an arcuate sequence substantially at the periphery of the first end face in which the sequential position of a write transducer (W) or a read transducer (R) is denoted by i, $0 \leq i \leq n-1$, the arcuate distance between successive write transducers and between successive read transducers being substantially equal to $(360/n)°$ and the arcuate sequence of write transducers being offset from the arcuate sequence of read transducers such that $R_i$ is positioned substantially at the periphery between $W_{i+1}$ and $W_{i+2}$.

10. The apparatus of claim 9, wherein each write transducer includes a write gap substantially at the periphery and having inner and outer edges, the inner edge of each write transducer gap being located substantially at a first radius $r_w$, and the outer edge of each write gap being located substantially at a second radius $r_r$, wherein $r_w$ and $r_r$ define respective circular transducing paths centered substantially to the axis of rotation and $r_r < r_w$, each read transducer having a read gap with inner and outer edges, each read gap inner edge being located substantially at $r_r$.

11. The apparatus of claim 10, Wherein the read transducer gaps have a width which is less than or equal to a width of the write transducer gaps.

12. A tape format for recording information on a magnetic tape in a tape drive including means for advancing the magnetic tape longitudinally, at least one electromagnetic transducer mounted for rotary scanning of the magnetic tape, the format comprising:
at least one sequence of arcuate information tracks recorded transversely across a longitudinal center line of the magnetic tape; and
track identification fields in the arcuate tracks, substantially aligned with the longitudinal center line, each track identification field containing a plurality of bits which indicate a respective identification of the track.

13. The tape format of claim 12, further including, in each arcuate track, data fields disposed on each side of a track identification field.

14. The tape format of claim 12, wherein each arcuate track includes at least two servo fields, each servo field of the at least two servo fields disposed at a respective end of the arcuate track and including servo formation.

15. The tape format of claim 14, further including at least two track address LSB fields, each track address LSB field disposed on a respective side of a track address field and adjacent to a servo field, each track address LSB field containing least significant bits (LSB's) of the address of the arcuate track.

16. The tape format of claim 12, further including, in each arcuate track, data block fields disposed on each side of a track identification field.

17. The tape format of claim 16, wherein each data block field includes a respective data block number identifying a data block.

18. A combination for transduction of information on a magnetic tape, wherein the magnetic tape includes a compliant material having a first side for magnetically storing information and a second side, the combination comprising:
at least one electromagnetic transducer;
a rotary mounting having an axis of rotation, a periphery, and a surface of rotation centered on the axis of rotation at which the at least one electromagnetic transducer is retained at a predetermined radial distance from the axis of rotation;

a tape drive for longitudinally advancing the magnetic tape past the surface of rotation;

means for rotating the rotary mounting so that the at least one electromagnetic transducer reads a series of arcuate magnetically recorded tracks on the first side of the magnetic tape; and control means connected to the at least one electromagnetic transducer, and to the tape drive and responsive to information in the arcuate tracks for aligning the at least one electromagnetic transducer with the arcuate tracks by adjusting:

the speed of advancement of magnetic tape; and the location of the rotary mounting with respect to the magnetic tape.

19. The combination of claim 18 including means for pivoting the rotary mounting about a pivot axis which is transverse to the axis of rotation, wherein the control means pivotally adjusts the position of the rotary mounting in response to the information to change a location at which the axis of rotation passes through the magnetic tape.

20. The combination of claim 19, wherein the rotary mounting includes:

a transducer drum with a first and a second end face;

the at least one transducer being mounted on the transducer drum at the first end face;

a drive shaft concentrically connected to the transducer drum and extending away from the second end face of the transducer drum;

support means for receiving the drive shaft and for supporting rotation of the drive shaft and transducer about the axis of rotation;

means for mounting the support means to the tape drive and for pivoting the support means about an axis which is transverse to the axis of rotation; and the control means including means for adjusting the location of the rotary mounting with respect to the magnetic tape by pivoting the support means.

21. The combination of claim 20, wherein the information includes servo information.

22. The combination of claim 20, wherein the information includes track identification information.

23. The combination of claim 20, wherein the information includes servo information and track identification information.

24. A combination for electromagnetic storage of information, comprising:

a tape cartridge;

an elongate electromagnetic tape movably contained in the cartridge, the tape including a longitudinal center-line; and a sequence of magnetization regions on a surface of the electromagnetic tape for storing information, the magnetization regions being in the form of substantially arcuately-shaped tracks which extend transversely across the longitudinal center-line from a first edge to a second edge of the tape;

each track including;

a track identification field substantially aligned with the longitudinal center-line of the magnetic tape, each track identification field containing a plurality of bits which identify the track.

25. The combination of claim 14, further including, in each arcuate track, data fields disposed on each side of a track identification field.

26. The combination of claim 14, further including, for each arcuate track, at least two servo fields, each servo field of the at least two servo fields disposed adjacent a respective end of the arcuate track.

27. The combination of claim 24, further including, in each arcuate track, data block fields disposed on each side of a track identification field.

28. The combination of claim 27, wherein each data block field includes a respective data block number identifying a data block.

29. In an information storage apparatus, including:

a magnetic tape cartridge containing a magnetic tape with a longitudinal center-line and first and second edges;

at least one electromagnetic transducer;

a rotary mounting having an axis of rotation and a surface of rotation centered on the axis of rotation at which the at least one electromagnetic transducer is retained at a predetermined radial distance from the axis of rotation; and means for rotating the rotary mounting so that the at least one electromagnetic transducer reads information on the magnetic tape;

a method for servoing the position of the at least one electromagnetic transducer with respect to the magnetic tape, the method comprising the steps of:

advancing the magnetic tape along the longitudinal center-line;

recording a sequence of arcuate information tracks on the magnetic tape, the arcuate information tracks extending substantially across the longitudinal center-line, from the first edge to the second edge of the tape;

the recording step including, for each track of a plurality of tracks:

recording at least one field including servo information;

rewinding and then advancing the magnetic tape along its longitudinal center-line;

reading the arcuate tracks; and in response to readback of servo information during the reading step, aligning the at least one electromagnetic transducer with an arcuate track containing the servo information by adjusting the speed of tape.

30. In an information storage apparatus, including:

a magnetic tape cartridge containing a magnetic tape with a longitudinal center-line and first and second edges;

at least one electromagnetic transducer;

a rotary mounting having an axis of rotation and a surface of rotation centered on the axis of rotation at which the at least one electro-magnetic transducer is retained; and means for rotating the rotary mounting so that the at least one electro-magnetic transducer reads information on the magnetic tape;

a method for servoing the position of the at least one electro-magnetic transducer with respect to the magnetic tape, the method comprising the steps of:

advancing the magnetic tape along the longitudinal center-line;

recording a sequence of arcuate information tracks on the magnetic tape, the arcuate information tracks extending substantially across the longitudinal center-line from the first edge to the second edge of the tape;

the recording step including, for each track of a plurality of tracks:

recording at least one field including servo information;

rewinding and advancing the magnetic tape along its longitudinal center-line;

reading the arcuate information tracks with the at least one electro-magnetic transducer; and in response to readback of servo information during the reading step, aligning the at least one electro-magnetic transducer with an arcuate track by repositioning the rotary mounting so that the axis of rotation passes through the tape at another position on the locus.

31. The method of claim 30, further including the step of:

in response to readback of servo information during the reading step, aligning the at least one electro-magnetic transducer with an arcuate track by adjusting the speed of the tape.

32. In a tape drive, a method of writing information on a magnetic tape in a sequence of arcuate tracks, each track in the sequence of arcuate tracks following a curved path extending from a first edge to a second edge of the tape across a longitudinal center line of the tape, the method including the steps of:

inserting a tape container containing the tape into the tape drive;

activating the tape drive to write the sequence of arcuate tracks; and for a track in the sequence of arcuate tracks:
(a) writing track servo information in a first track servo region following the first edge of the tape;
(b) writing one or more data fields between the first track servo region and the longitudinal center line;
(c) writing information identifying the track substantially at the longitudinal center line;
(d) writing one or more data fields between the longitudinal centerline and a second track servo region preceding the second edge of the tape; and
(e) writing track servo information in the second track servo region.

33. The method of claim 32, wherein the sequence of arcuate tracks includes a first group of tracks and a second group of tracks, the tracks of the first and second groups being interleaved in the sequence of arcuate tracks, and steps (a)–(e) are performed for each track of the first groups of tracks.

34. The method of claim 33, further including, for each track of the second group of tracks:
(f) writing one or more data fields between the first track servo region and the longitudinal center line;
(g) writing information identifying the track substantially at the longitudinal centerline; and
(h) writing one or more data fields between the longitudinal centerline and the second track servo region.

35. The method of claim 34, further including:

writing a first track having a nominal width by performing steps (a)–(e);

writing a second track having the nominal width by performing steps (f)–(h), the second track overlapping the portion of the first track written by steps (b), (c), and (d);

writing a third track having the nominal width by performing steps (a)–(e), the portions of the third track written by steps (a) and (e) overlapping the portions of the first track written by steps (a) and (e) and the portion of the third track written by steps (b), (c), and (d) overlapping the second track; and writing a fourth track having the nominal width by performing steps (f)–(h), the fourth track overlapping the portion of the third track written by steps (b), (c), and (d).

36. The method of claim 32 wherein the first track servo region is located substantially adjacent the first edge of the tape and the second track servo region is located substantially adjacent the second edge of the tape.

37. An apparatus for reading information on a magnetic tape, including:

a frame;

a transport means in the frame for engaging and advancing a magnetic tape past a reading location;

a rotating transducer carrier;

transducer means on the transducer carrier for reading information on a magnetic tape;

means in the frame for positioning the rotating transducer carrier adjacent the reading location to rotate on an axis of rotation which passes through the magnetic tape, said axis of rotation corresponding substantially to the center of a circular transducing path followed by the transducer means when the transducer carrier rotates;

means for rotating the transducer carrier to cause the transducer means to read information in arcuate information tracks; and servo means responsive to information in arcuate information tracks of a magnetic tape for aligning the transducer means with the arcuate information tracks.

38. The apparatus of claim 37, wherein the servo means is connected to the transport means and is further for aligning the transducer means with the arcuate information tracks by adjusting the speed of advancement of the magnetic tape.

39. The apparatus of claim 37, wherein the servo means is connected to the means for positioning and is further for aligning the transducer means with the arcuate information tracks by adjusting the location of the transducer carrier with respect to the magnetic tape at the reading location.

40. The apparatus of claim 39, wherein the servo means is further connected to the transport means and is further for aligning the transducer means with the arcuate information tracks by adjusting the speed of advancement of the magnetic tape.

41. The apparatus of claim 39, further including means for pivotally mounting the transducer carrier to the frame to be pivoted about a pivot axis which is substantially transverse to the axis of rotation, wherein the means for positioning pivotally adjusts the position of the transducer carrier in response to information in the arcuate information tracks by changing the location at which the axis of rotation passes through the recording location.

42. The apparatus of claim 37, wherein the rotating transducer carrier includes:

a substantially cylindrical member with first and second ends;

the transducer means being mounted to the member at the first end;

a drive shaft concentrically connected to the member and extending away from the second end of the member; and support means for receiving the drive shaft and for supporting rotation of the drive shaft and member on the axis of rotation;

the means for positioning includes:

means for mounting the support means to the frame and for pivoting the support means about an axis which is transverse to the axis of rotation;

and the servo means includes:

means for adjusting the location of the transducer carrier at the recording location by applying a pivoting force to the support means.

43. An apparatus for recording information on a magnetic tape, including:

a frame;

means in the frame for receiving and positioning a magnetic tape at a recording location;

transport means in the frame for engaging and advancing the magnetic tape longitudinally past the recording location;

a rotating transducer carrier;

transducer means on the transducer carrier for recording information on the magnetic tape; and channel means connected to the transducer means for causing the transducer means to write a sequence of arcuate information tracks containing servo signals on the magnetic tape.

44. The apparatus of claim 43, wherein at least one arcuate information track includes a first servo information field following a first edge of the magnetic tape and a second servo information field preceding a second edge of the magnetic tape and displaced from the first servo information field.

45. The apparatus of claim 44, wherein the at least one arcuate information track further includes servo information substantially at the center line of the magnetic tape.

46. The apparatus of claim 43, wherein at least one arcuate track includes servo information substantially at a center line of the magnetic tape.

47. A magnetic tape for storing data for access by an arcuately scanning tape drive, comprising:

a magnetic tape with two edges and a longitudinal center line; and data stored in a plurality of arcuate tracks on said magnetic tape, each arcuate track of the plurality of arcuate tracks extending in an arc from a first edge to a second edge of said magnetic tape, across the center line, said data including servo signals for causing alignment of an arcuately-scanning tape drive transducer with arcuate tracks on said magnetic tape.

48. The magnetic tape of claim 47, wherein at least one arcuate track includes first servo signals between at least the first edge of the magnetic tape and the center line.

49. The magnetic tape of claim 48, wherein the at least one arcuate track further includes second servo signals substantially at the center line.

50. The magnetic tape of claim 47, wherein at least one arcuate track includes servo signals substantially at the center line.

51. The magnetic tape of claim 47, wherein at least one arcuate track includes track address information substantially at the center line.

52. The magnetic tape of claim 48, wherein the at least one arcuate track further includes one or more first data fields between the first servo signals and the center line.

53. The magnetic tape of claim 52, wherein the at least one arcuate track further includes second servo signals substantially at the center line.

54. The magnetic tape of claim 53, wherein the at least one arcuate track further includes one or more second data fields between the center line and the second edge.

55. The magnetic tape of claim 54, wherein the at least one arcuate track further includes third servo signals between the one or more second data fields and the second edge.

56. The magnetic tape of claim 47, wherein the at least one arcuate track includes a first servo information field following the first edge and a second servo information field preceding the second edge and spaced apart from the first servo information field.

* * * * *